(12) United States Patent
Amano

(10) Patent No.: US 7,032,454 B2
(45) Date of Patent: Apr. 25, 2006

(54) PIEZOELECTRIC CANTILEVER PRESSURE SENSOR ARRAY

(75) Inventor: Jun Amano, Hillsborough, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 82 days.

(21) Appl. No.: 10/792,891

(22) Filed: Mar. 5, 2004

(65) Prior Publication Data

US 2005/0193823 A1    Sep. 8, 2005

(51) Int. Cl.
    *G01L 11/00*    (2006.01)
(52) U.S. Cl. .............................. 73/704; 73/702; 73/717
(58) Field of Classification Search ........... 73/700–756
    See application file for complete search history.

(56) References Cited

U.S. PATENT DOCUMENTS

| | | | |
|---|---|---|---|
| 4,594,898 A * | 6/1986 | Kirman et al. ................. | 73/778 |
| 4,764,244 A * | 8/1988 | Chitty et al. .................... | 216/20 |
| 5,279,162 A * | 1/1994 | Takebe et al. ................. | 73/726 |
| 5,293,095 A * | 3/1994 | Tamura et al. ............... | 310/338 |
| 5,421,213 A * | 6/1995 | Okada .................... | 73/862.043 |
| 6,453,748 B1 * | 9/2002 | Pryor ........................... | 73/727 |

OTHER PUBLICATIONS

Parrin, F. et. Al., "A CMOS Comptible Micromachined Tactile Fingerprint Sensor", Proceeding of the SPIE, vol. 4755, May 6, 2002, pp. 568-575.

Charlot, B. et al., "A Sweeping Mode Integrated Tactile Fingerprint Sensor", Transducer '03, Jun. 8-12, 2003, vol. 2, pp. 1031-1034.

Atkinson G. M. et al., "Piezoelectric Polyimide Tactile Sensors" Proceeding of the 15th Biennial University/Government/Industry Microelectronics, Jun. 30, 2003, pp. 308-311.

Liqun, Du et al., "Optimal Configuration of Micro Touch Sensor Array Structure", 2002 Int'l Symposium of Micromechatronics and Human Science, Oct. 20, 2002, pp. 153-158.

Henderson, N. J. et al., "Low-Cost Planar PTF Senosrs for the Identity Verification of Smartcard Holders", Proceedings of IEEE Sensors 2002, Jun. 12-14, 2002, vol. 1 of 2, pp. 1614-1619.

* cited by examiner

*Primary Examiner*—Max Noori
*Assistant Examiner*—Jermaine Jenkins

(57) ABSTRACT

A piezoelectric cantilever pressure sensor array is disclosed. The piezoelectric cantilever pressure sensor array contains a substrate, a readout circuit, and piezoelectric cantilever pressure sensors electrically connected to the readout circuit. Each piezoelectric cantilever pressure sensor contains an elongate piezoelectric cantilever mounted at one end on the substrate and extending over a cavity. The piezoelectric cantilever contains a piezoelectric layer sandwiched between two electrodes and generates a measurable voltage when deformed under pressure. The piezoelectric cantilever pressure sensor array can be manufactured at low cost and used in various applications including fingerprint identification devices.

20 Claims, 39 Drawing Sheets

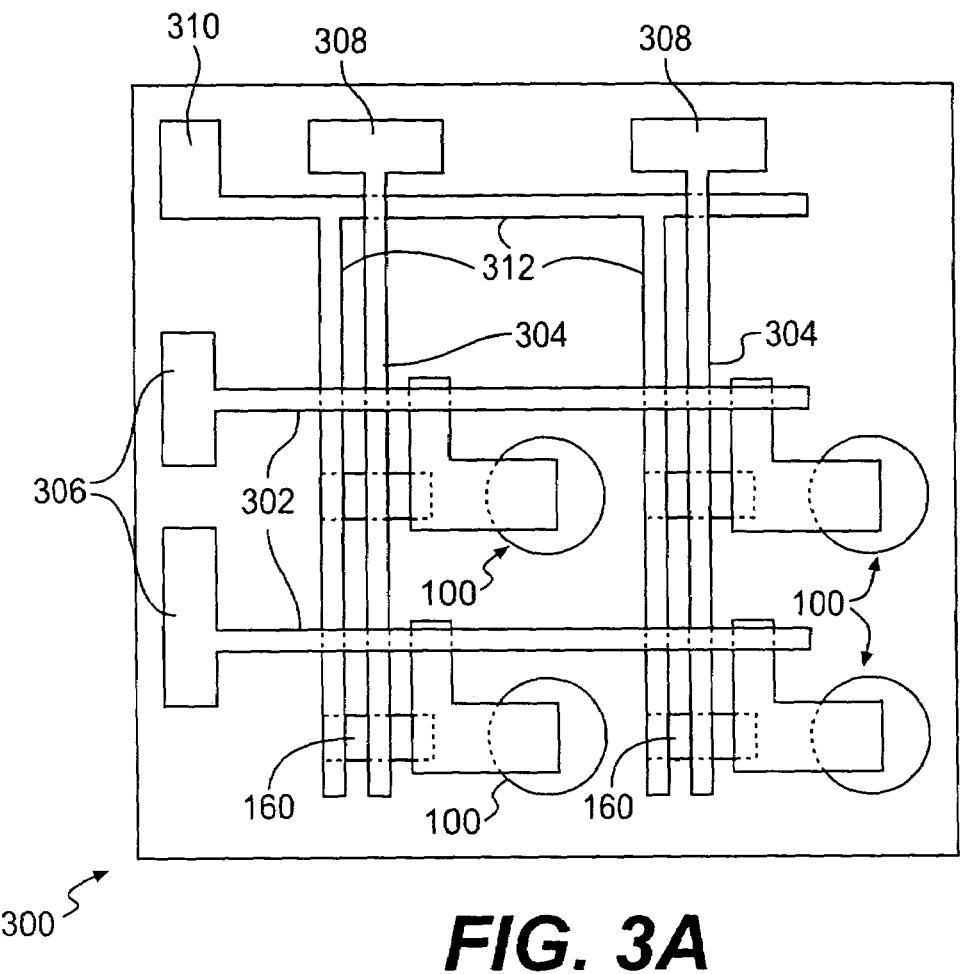
FIG. 3A
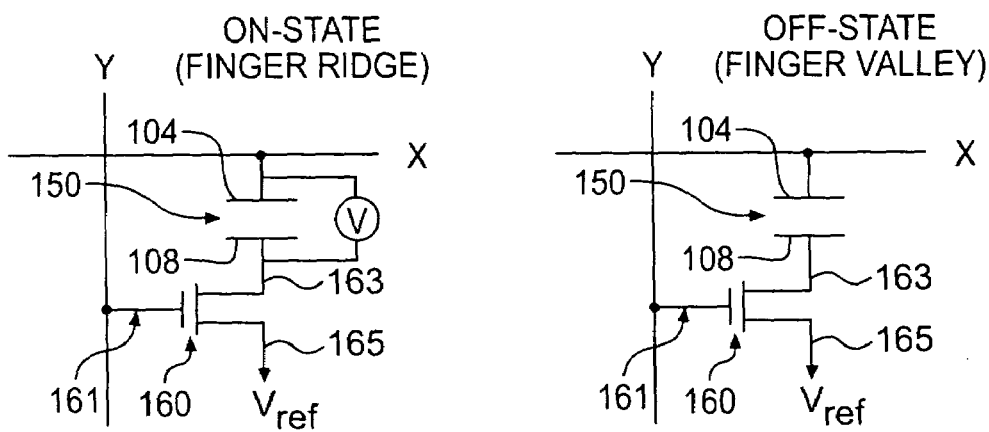
FIG. 3B  FIG. 3C

PIEZOELECTRIC CANTILEVER PRESSURE SENSOR ARRAY

CROSS REFERENCE TO RELATED APPLICATIONS

This application is related to U.S. patent application Ser. No. 10/792,777, entitled "PIEZOELECTRIC CANTILEVER PRESSURE SENSOR" to Jun AMANO, et al.; and U.S. patent application Ser. No. 10/792,778, entitled "METHOD OF MAKING PIEZOELECTRIC CANTILEVER PRESSURE SENSOR ARRAY" to Jun AMANO, et al., both applications of which are concurrently herewith being filed under separate covers, the subject matters of which are herein incorporated by reference in their entireties.

TECHNICAL FIELD

The technical field is pressure sensors and, in particular, piezoelectric cantilever pressure sensors.

BACKGROUND

Fingerprint identification involves the recognition of a pattern of ridges and valleys on the fingertips of a human hand. Fingerprint images can be captured by several types of methods. The oldest method is optical scanning. Most optical scanners use a charge coupled device (CCD) to capture the image of a fingertip that is placed on an illuminated plastic or glass platen. The CCD then converts the image into a digital signal. Optical fingerprint scanners are reliable and inexpensive, but they are fairly large and cannot be easily integrated into small devices.

In recent years, new approaches using non-optical technologies have been developed. One approach uses capacitance, or an object's ability to hold an electric charge, to capture fingerprint images. In this approach, the finger skin is one of the capacitor plates and a microelectrode is the other capacitor plate. The value of the capacitance is a function of the distance between the finger skin and the microelectrode. When the finger is placed on a microelectrode array, the capacitance variation pattern measured from electrode to electrode gives a mapping of the distance between the finger skin and the various microelectrodes underneath. The mapping corresponds to the ridge and valley structure on the finger tip. The capacitance is read using a integrated circuit fabricated on the same substrate as the microelectrode array.

A slightly different approach uses an active capacitive sensor array to capture the fingerprint image. The surface of each sensor is composed of two adjacent sensor plates. These sensor plates create a fringing capacitance between them whose field lines extend beyond the surface of the sensor. When live skin is brought in close proximity to the sensor plates, the skin interferes with field lines between the two plates and generate a "feedback" capacitance that is different from the original fringing capacitance. Because the fingerprint ridge and fingerprint valley generate different feedback capacitance, the entire fingerprint image may be captured by the array based on the feedback capacitance from each sensor. The capacitance sensors, however, are vulnerable to electric field and electrostatic discharge (ESD). The capacitance sensors also do not work with wet fingers. Moreover, the silicon-based sensor chip requires high power input (about 20 mA) and is expensive to manufacture.

Another approach employs thermal scanners to measure the differences in temperature between the ridges and the air caught in the valleys. The scanners typically use an array of thermal-electric sensors to capture the temperature difference. As the electrical charge generated within a sensor depends on the temperature change experienced by this sensor, a representation of the temperature field on the sensor array is obtained. This temperature field is directly related to the fingerprint structure. When a finger is initially placed on a thermal scanner, the temperature difference between the finger and the sensors in the array is usually large enough to be measurable and an image is created. However, it takes less than one-tenth of a second for the finger and the sensors to reach an equal temperature and the charge pattern representing the fingerprint will quickly fade away if the temperature change is not regularly refreshed.

Yet another approach is to use pressure sensors to detect the ridges and valleys of a fingerprint. The sensors typically include a compressible dielectric layer sandwiched between two electrodes. When pressure is applied to the top electrode, the inter-electrode distance changes, which modifies the capacitance associated with this structure. The higher the pressure applied, the larger the sensor capacitance gets. Arrays of such sensors combined with a read-out integrated circuit can be used for fingerprint acquisition. The pressure sensors may also be made of piezoelectric material. U.S. Patent Application Publication No. 20020053857 describes a piezoelectric film fingerprint scanner that contains an array of rod-like piezoelectric pressure sensors covered by a protective film. When a finger is brought into contact with such an array, the impedance of the pressure sensor changes under pressure. Fingerprint ridges correspond to the highest pressure point, while little pressure is applied at points associated with the fingerprint valleys. A range of intermediate pressures can be read for the transition zone between fingerprint ridge and valleys. The pattern of impedance changes, which is recorded by an impedance detector circuit, provides a representation of the fingerprint structure. The pressure sensing methods provide good recognition for wet fingers and are not susceptible to ESD. However, the major problem with the pressure based-detection method is the low sensor sensitivity. A certain amount of pressure is required for a sensor to generate a signal that is above the background noise. In order to reach this threshold pressure, the finger often needs to be pressed hard against the scanner to a point that the ridges and valleys are flattened under pressure, which may result in inaccurate fingerprint representation.

Thus, a need still exists for a fingerprint identification device that is accurate and sensitive, has a compact size, requires low power input, and can be manufactured at low cost.

SUMMARY

A piezoelectric cantilever pressure sensor array is disclosed. The piezoelectric cantilever pressure sensor array contains a substrate, a readout circuit, and piezoelectric cantilever pressure sensors electrically connected to the readout circuit. Each piezoelectric cantilever pressure sensor contains an elongate piezoelectric cantilever mounted at one end on the substrate and extending over a cavity. The piezoelectric cantilever contains a first electrode, a second electrode, and a piezoelectric element between the first electrode and the second electrode and electrically connected thereto.

The piezoelectric cantilever pressure sensor array can be manufactured at low cost and used in various applications including fingerprint identification devices.

BRIEF DESCRIPTION OF THE DRAWINGS

The detailed description will refer to the following drawings, in which like numerals refer to like elements, and in which:

FIG. 3A is a schematic representation of a piezoelectric cantilever pressure sensor array.

FIGS. 3B and 3C are schematic representations of a piezoelectric cantilever pressure sensor in on-state and off-state, respectively.

DETAILED DESCRIPTION

Figure 1A:
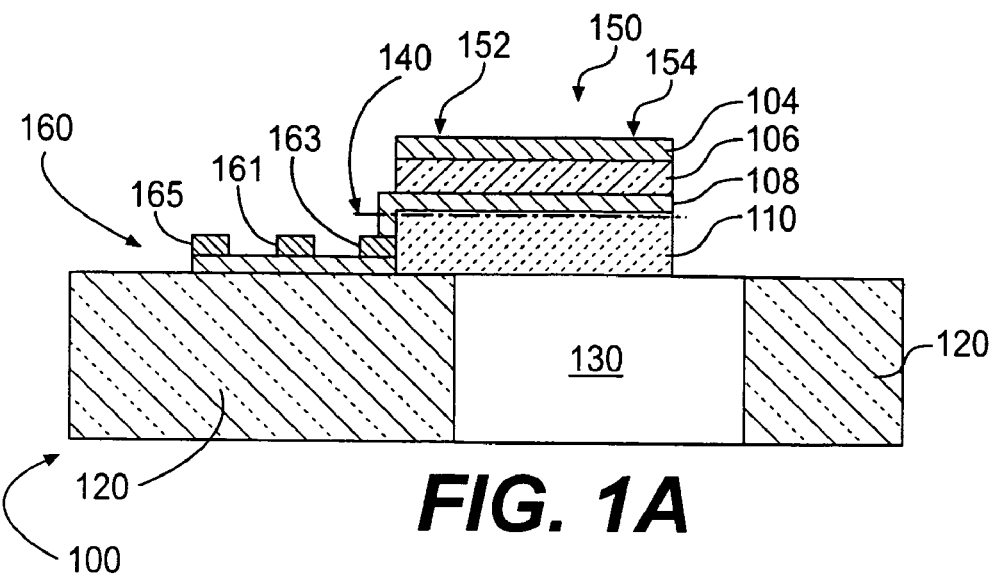
FIGS. 1A and 1B are schematic cross-sectional views depicting a first embodiment of a piezoelectric cantilever pressure sensor in quiescent state and stressed state, respectively.

FIG. 1 shows a first embodiment of a piezoelectric cantilever pressure sensor 100 in its quiescent state. The piezoelectric cantilever pressure sensor 100 includes a piezoelectric cantilever 150 having a base portion 152 and a beam portion 154, and an access transistor 160 having a gate contact 161, a drain contact 163, and a source contact 165. The piezoelectric cantilever 150 further includes, from top to bottom, a top electrode 104, a piezoelectric element 106, a bottom electrode 108, and an elastic element 110. The electrodes 104 and 108 are electrically coupled to the piezoelectric element 106. The bottom electrode 108 is also connected to the drain contact 163 of the access transistor 160. The base portion 152 of the piezoelectric cantilever 150 is supported by a substrate 120, while the beam portion 154 of the piezoelectric cantilever 150 is suspended above a cavity 130.

In this first embodiment, the piezoelectric element 106 and the elastic element 110 form a asymmetrical piezoelectric bimorph, i.e., a two-layered structure having a piezoelectric element and a non-piezoelectric element. When the bimorph is bent, one element elongates and is under tensile stress while the other element contracts and is under compressive stress. In the quiescent, zero stress state of the piezoelectric cantilever pressure sensor 100, there is no voltage difference between the electrodes 104 and 108. When a finger touches the piezoelectric cantilever pressure sensor 100, direct contact between a finger ridge and the beam portion 154 of the piezoelectric cantilever 150 (shown as arrow A in FIG. 1B) will deflect the beam portion 154 of the piezoelectric cantilever 150. This causes tensile stress in the piezoelectric element 106 and compressive stress in the elastic element 110. The stress in the piezoelectric element 106 produces a proportional output voltage V between the electrodes 104 and 108. The elastic element 110 offsets the neutral axis 140 of stress in the piezoelectric cantilever 150 so that strain produced by piezoelectric effect is translated into an output voltage in the piezoelectric element 106. Typically, the piezoelectric cantilever pressure sensor 100 is capable of generating a voltage in the range of 100 mV to 1.0 V with a typical finger touch. A detailed description on the mathematical modeling of the piezoelectric cantilever 150 can be found, for example, in "Modeling and Optimal Design of Piezoelectric Cantilever Microactuators" (DeVoe and Pisano, IEEE J. Microelectromech. Syst., 6:266–270, 1997), which is incorporated herein by reference.

The material of substrate 120 is any etchable material. The material of substrate 120 is additionally selected based on its thermal stability, chemical inertness, specific coefficients of thermal expansion, and cost. In one embodiment, the material of the substrate is glass. Examples of glasses include, but are not limited to, borosilicate glasses, ceramic glasses, quartz and fused silica glasses, and soda lime glasses. The thickness of the substrate 120 may vary depending on the substrate material and the manufacturing process. In an embodiment, the material of the substrate 120 is a borosilicate glass and the substrate has a thickness of about 0.5 mm to about 1 mm. In this disclosure, the major surface of the substrate 120 on which the piezoelectric cantilever 150 is located will be called the top surface of the substrate and the major surface of the substrate opposite the top surface will be called the bottom surface.

The material of the piezoelectric element 106 is a piezoelectric material. Examples of the piezoelectric material include, but are not limited to, lead zirconate titanate (PZT), lead magnesium niobate-lead zirconate titanate (PMN-PZT), lead zirconate niobate-lead zirconate titanate (PZN-PZT), aluminum nitride (AlN), and zinc oxide (ZnO). The thickness of the piezoelectric element 106 depends on the piezoelectric material and the specific requirement of a particular application. In an embodiment, the piezoelectric element 106 has a thickness of about 0.5 μm to about 1 μm and is composed of PZT with a zirconium/titanium molar ratio of about 0.4 to about 0.6.

The electrodes 104, 108, and 112 are typically composed of one or more thin layers of a conducting material. The thickness of the electrodes is typically in the range of 20–200 nm. In one embodiment, at least one of the electrodes 104, 108, and 112 is composed of one or more layers of metal such as gold, silver, platinum, palladium, copper, aluminum or an alloy comprising one or more of such metals. In another embodiment, the top electrode 104 is composed of platinum and the bottom electrode 108 is composed of a layer of platinum and a layer of titanium or titanium oxide ($TiO_x$).

The elastic element 110 is typically composed of a silicon-based material. Examples include, but are not limited to, silicon, polycrystalline silicon (polysilicon), and silicon nitride ($SiN_x$). The thickness of the elastic element 110 is typically in the range of 0.2–1 μm. In an embodiment, the elastic element 110 is composed of silicon or silicon nitride and has a thickness of about 0.3–0.7 μm.

In all the embodiments described herein, the beam portion of the piezoelectric cantilever, e.g., the beam portion 154 of the piezoelectric cantilever 150, is designed to have a rigidity that would allow a deflection large enough to generate a measurable voltage under the pressure from a finger. Typically, the load applied by an individual's finger on a fingerprint sensor surface is in the range of 100–500 g. A fingerprint sensor surface is approximately 15 mm×15 mm in dimensions. Assuming the fingerprint sensor has an array of piezoelectric cantilever pressure sensors with a standard pitch (i.e., distance between two neighboring sensors) of 50 μm, which corresponds to at least 500 dot per inch (dpi) specified by the Federal Bureau of Investigation, there will be a total of 90,000 sensors in the fingerprint area. As a first order approximation, one can assume that the area of the fingerprint ridges is equal to that of the fingerprint valleys. Accordingly, approximately 45,000 sensors will bear the applied load from the fingerprint. If one conservatively assumes an applied load of 90 grams from the fingerprint, then each beam portion 154 of the piezoelectric cantilever 150 bears a load of about 2 mg. Since the beam needs to fit within the array pitch dimensions of a maximum of 50 µm×50 µm, the length and width of the beam portion 154 of the piezoelectric cantilever 150 need to be less than the array pitch. Based on the length, width, thickness, and Young's Modulus for the beam material, the possible deflection of the beam portion 154 of the piezoelectric cantilever 150 under a given load and the voltage generated by the deflection can be determined. In an embodiment, the piezoelectric cantilever 150 is capable of producing a maximum voltage in the range of 500–1,000 mV under normal pressure from a finger.

The cavity 130 under the piezoelectric cantilever 150 is deep enough to allow maximum deflection of the cantilever 150. In the first embodiment shown in FIGS. 1A and 1B, the cavity 130 extends through the thickness of the substrate 120 and is formed by etching from the bottom surface of the substrate 120.

Figure 1B:
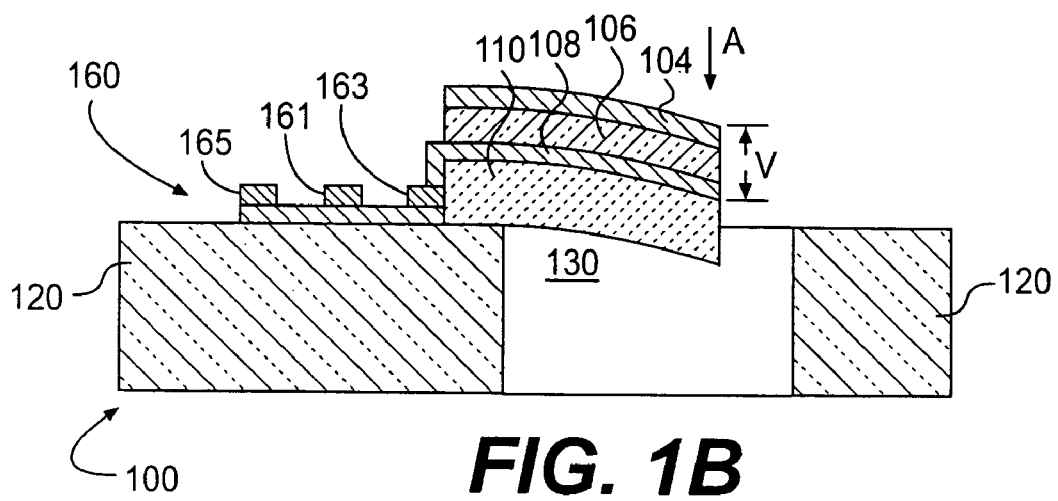
Figure 1C:
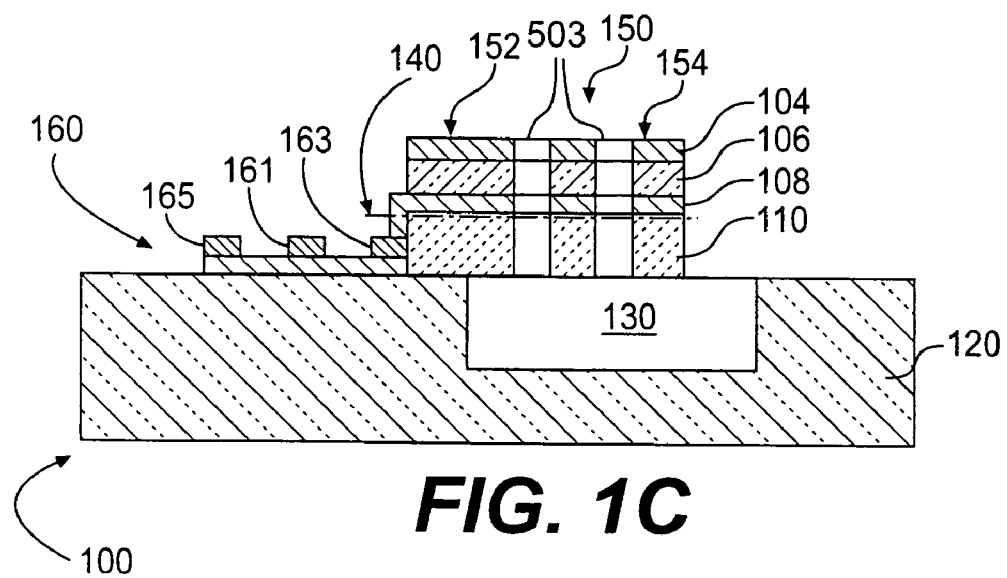
FIGS. 1C and 1D are schematic cross-sectional views depicting a second embodiment and a third embodiment, respectively, of a piezoelectric cantilever pressure sensor.

FIG. 1C shows a second embodiment of piezoelectric cantilever pressure sensor 100 in which the cavity 130 extends into the substrate 120 from the top surface of the substrate. Typically, the cavity 130 does not extend all the way to the bottom surface of the substrate 120 in this embodiment. In this embodiment, releasing holes 503 extend through the thickness of the beam portion 154 of the piezoelectric cantilever. The releasing holes permit etching of the cavity 130 from the top surface of the substrate to release the beam portion 154 of the piezoelectric cantilever from the substrate.

Figure 1D:
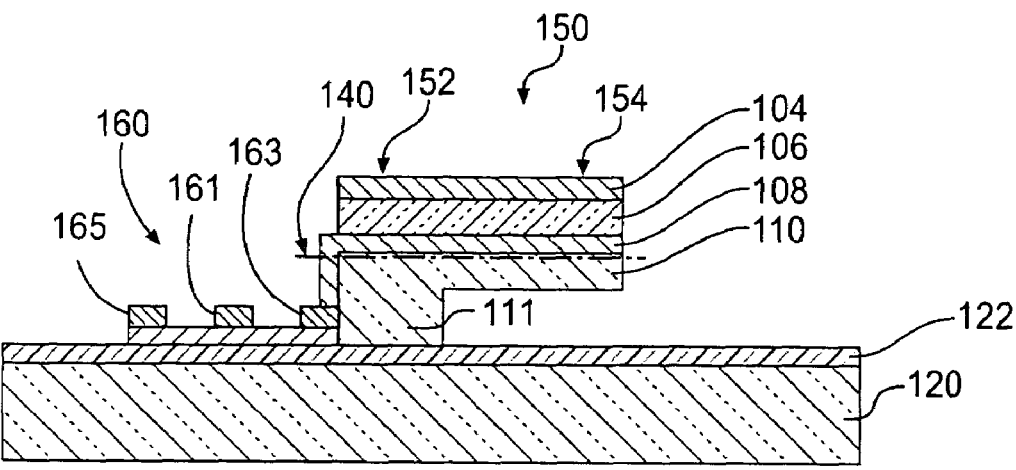

FIG. 1D shows a third embodiment of piezoelectric cantilever pressure sensor 100 in which the elastic element 110 is shaped to define a pedestal 111 that spaces the substrate-facing surface of the beam portion 154 of the piezoelectric cantilever 150 from the major surface of the substrate 120. In this embodiment, the cavity 130 is located between the substrate-facing surface of the beam portion 154 and the top surface of the substrate 120. The elastic element is shaped with the aid of a sacrificial mesa, as will be described in detail below.

The second and third embodiments shown in FIGS. 1C and 1D are otherwise similar to the first embodiment shown in FIGS. 1A and 1B, and will not be described further here. Exemplary methods that can be used to fabricate all three embodiments will be described below.

Figure 2:
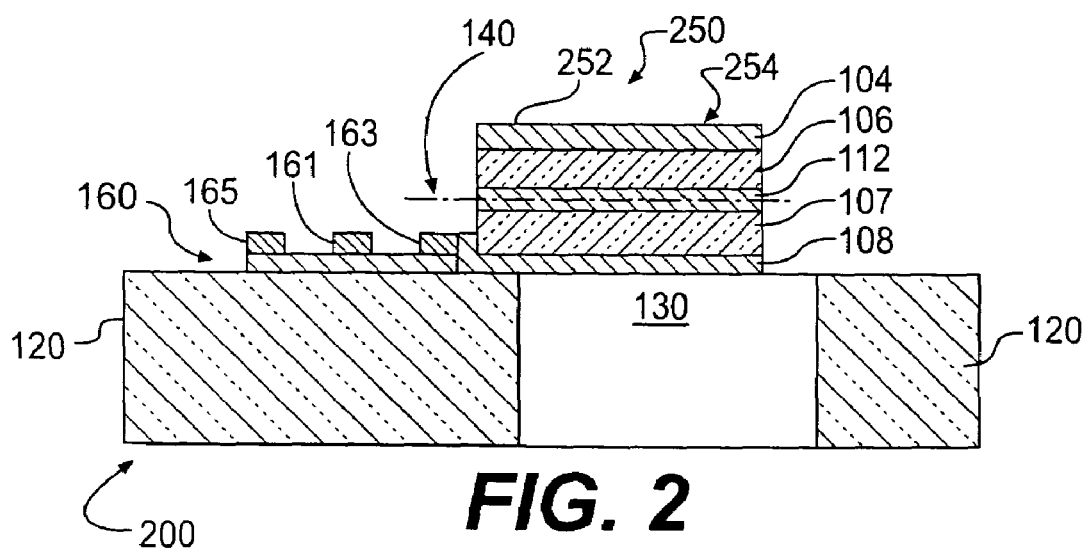
FIG. 2 is a cross-sectional view depicting a fourth embodiment of a piezoelectric cantilever pressure sensor.

FIG. 2 shows a fourth embodiment of a piezoelectric cantilever pressure sensor 200 in which the piezoelectric cantilever incorporates a symmetrical piezoelectric bimorph. Piezoelectric cantilever pressure sensor 200 is based on the first embodiment of the piezoelectric cantilever pressure sensor described above with reference to FIGS. 1A and 1B. The second and third embodiments of the piezoelectric cantilever pressure sensor described above with reference to FIGS. 1C and 1D, respectively, may be similarly modified to incorporate a symmetrical piezoelectric bimorph.

The piezoelectric cantilever pressure sensor 200 includes a piezoelectric cantilever 250 having a base portion 252 and a beam portion 254, and the access transistor 160 having the gate contact 161, the drain contact 163, and the source contact 165. The piezoelectric cantilever 250 incorporates a symmetrical piezoelectric bimorph composed of, from top to bottom, the top electrode 104, the piezoelectric element 106, a middle electrode 112, an additional piezoelectric element 107, and the bottom electrode 108, all of which are supported by the substrate 120. The electrodes 104 and 112 are electrically coupled to the piezoelectric element 106. The electrodes 112 and 104 are electrically coupled to the piezoelectric element 107. The bottom electrode 108 is connected to the drain contact 163 of the access transistor 160.

In this fourth embodiment, the piezoelectric elements 106 and 107 and their respective electrodes form a symmetrical piezoelectric bimorph that generates a measurable output voltage in response to finger pressure. When the bimorph structure is bent, the piezoelectric element 106 elongates and is under tensile stress while the piezoelectric element 107 contracts and is under compressive stress.

FIG. 3A shows a highly simplified example of a piezoelectric cantilever pressure sensor array 300 composed of four piezoelectric cantilever pressure sensors in a two-by-two matrix. In the example shown, the piezoelectric cantilever pressure sensors are the first embodiment of the piezoelectric cantilever pressure sensors 100 described above with reference to FIGS. 1A and 1B. However, the piezoelectric cantilever pressure sensor array 300 can incorporate any of the above-described piezoelectric cantilever pressure sensor embodiments. The piezoelectric cantilever pressure sensors 100 are connected to a grid of X-axis contact lines (X-lines) 302 and Y-axis contact lines (Y-lines) 304. Each line 302 or 304 is connected to an exposed X-contact pad 306 (X-pad) or Y-contact pad (Y-pad) 308, respectively. Specifically, the top electrodes of the piezoelectric cantilever pressure sensors 100 in each row of the array are connected to a respective X-line and the gates of the access transistors 160 of the piezoelectric cantilever pressure sensors 100 in each column of the array are connected to a respective Y-line. Additionally, the sources of the access transistors 160 of the piezoelectric cantilever pressure sensors 100 in each column of the array are connected to a respective reference voltage contact line (reference line) 312. The reference lines 312 are connected to an exposed reference voltage contact pad (reference pad) 310. Typically, the piezoelectric cantilever pressure sensor array 300 has a pitch of 50 µm and an array size of 300×300 or 256×360.

The state of each piezoelectric cantilever pressure sensor 100 in the piezoelectric cantilever pressure sensor array 300 is read out by the access transistor 160 connected to the piezoelectric cantilever 150 and typically located adjacent the base portion 152 of each piezoelectric cantilever 150 as shown in FIG. 1A. As shown in FIGS. 3B and 3C, the gate contact 161 of the access transistor 160 is connected to the Y-line, the drain contact 163 of the access transistor 160 is connected to the bottom electrode 108 of the piezoelectric cantilever 150, and the source contact 165 of the access transistor 160 is connected to a reference voltage $V_{ref}$ by the reference line 312 shown in FIG. 3A. The piezoelectric cantilever 150 is accessed through the access transistor 160 by providing an activation signal on the Y-line and detecting the voltage signal output by the piezoelectric cantilever 150 on the X-line. The access signal causes the access transistor 160 to connect the bottom electrode 108 to the reference voltage, typically ground, applied to the reference pad 310. The piezoelectric cantilever 150 bent by a fingerprint ridge will be said to be in an on state. A piezoelectric cantilever 150 in the on state delivers the output signal, typically in the range of 500–1000 mV, to the X-line (FIG. 3B), when the piezoelectric cantilever pressure sensor 100 is accessed through its access transistor 160 by the activation signal. On the other hand, the piezoelectric cantilever 150 under a fingerprint valley is not bent and will be said to be in an off state. A piezoelectric cantilever 150 in the off state generates no voltage difference between the electrodes 104 and 108. Accordingly, when the piezoelectric cantilever pressure sensor 100 is accessed through its access transistor 160 by the activation signal, no output signal is generated on the X-line (FIG. 3C). A typical capacitance of the piezoelectric cantilever pressure sensor 100 is from 0.5 to 2 pF. The parasitic capacitance of the X-line is typically in the range of 1 to 5 pF and the sensing current in the X-line is in the order of 1–10 μA. The resistance of the X-line is in the order of few hundred Ohms, which results in a very fast operation of the piezoelectric cantilever pressure sensor 100.

Figure 3D:
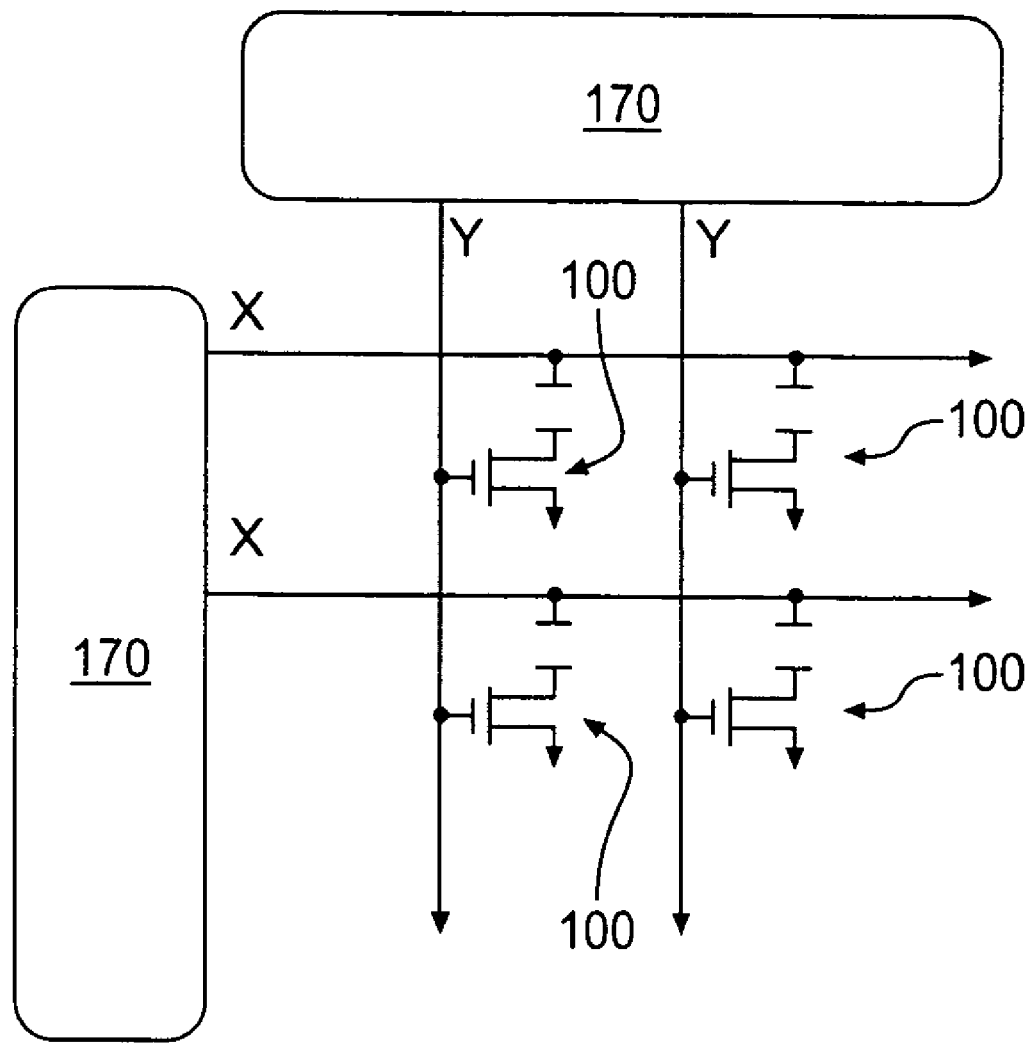
FIG. 3D is a schematic representation of a detection circuit for a piezoelectric cantilever sensor array.

FIG. 3D shows a circuit 400 that serves to record the status of the sensors of the piezoelectric cantilever pressure sensor array 300. Each piezoelectric cantilever pressure sensor 100 in the circuit 400 has a unique X-Y address based on its position in the X-line/Y-line matrix. The read-out circuits 170 scan the matrix by sequentially sending out activation signals to Y-lines. The status of each piezoelectric cantilever pressure sensor 100 is determined on the X-line to which it is connected based on its response to the activation signal. Typically, to distinguish between a real signal and an aberrant voltage fluctuation, the scan is repeated hundreds of times each second. Only signals detected for two or more scans are acted upon by the read-out circuits 170. Such read-out circuits and the scanning mechanism are known in the art.

In addition to fingerprint detection, the piezoelectric cantilever pressure sensor array 300 has utility in many other applications. The piezoelectric cantilever pressure sensor array 300 may be used for tactile imaging of lumps in soft tissue in medical devices. For example, the piezoelectric cantilever pressure sensor array 300 can be used in ultrasound imaging devices to provide a three-dimensional image of breast cancer or as an electric "fingertip" in remote surgery. The piezoelectric cantilever pressure sensor array 300 may also be used to detect nano- or micro-movement. For example, the piezoelectric cantilever pressure sensor array 300 can be used in automobile electronics as a tire pressure sensor or an impact sensor and in microphones and micro-speakers as an acoustic sensor. The piezoelectric cantilever sensors can also be used as microactuators or nanopositioners by applying a drive voltage to them.

FIGS. 4A–4F, 5A–5C, 6A, 6B, 7A–7C, 8A–8C, 9A–9C, 10A, 10B, 11A, 11B, and 12 illustrate a first embodiment of a method of making an array of piezoelectric cantilever pressure sensors that incorporates piezoelectric cantilever pressure sensors 100 in accordance with the first embodiment described above with reference to FIGS. 1A and 1B. The piezoelectric cantilever sensor array made by the method is otherwise similar to the array 300 described above with reference to FIGS. 3A and 3D.

The first embodiment of the method starts with the fabrication of a layer structure that can also be used in a second embodiment of the method, to be described below. The second embodiment of the method is for making an array of piezoelectric cantilever pressure sensors that incorporates piezoelectric cantilever pressure sensors 100 in accordance with the second embodiment shown in FIG. 1C.

Figure 4A:
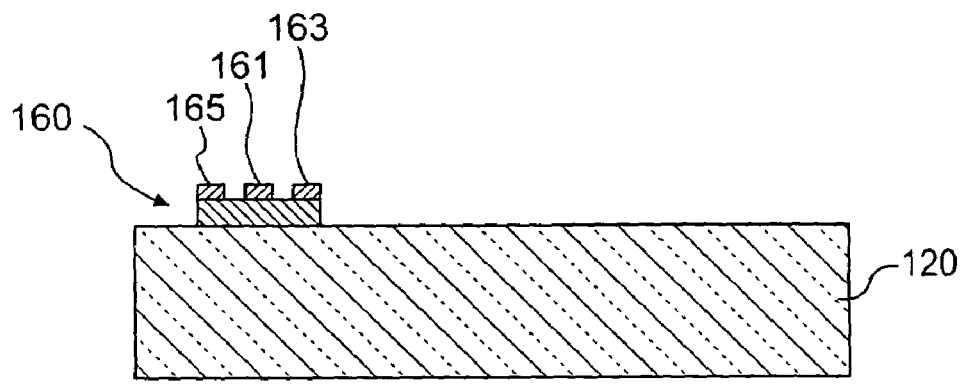
FIGS. 4A–4F are schematic cross-sectional views depicting a first layer structure from which the first and second embodiments of the piezoelectric cantilever pressure sensor are fabricated at different stages of its manufacture.
Figure 4B:
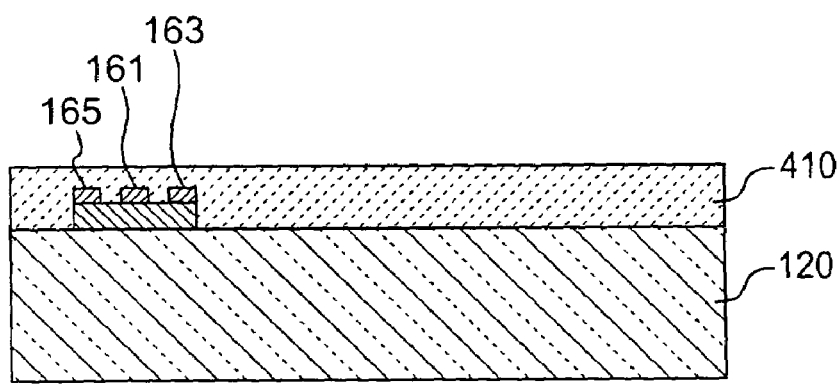
Figure 4C:
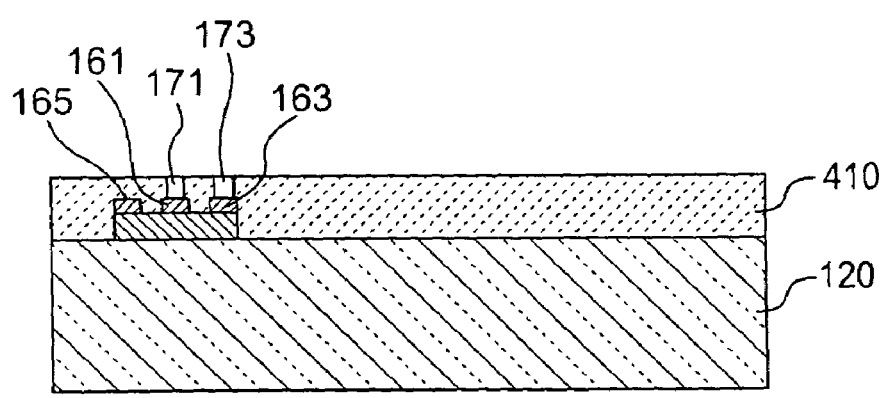
Figure 4D:
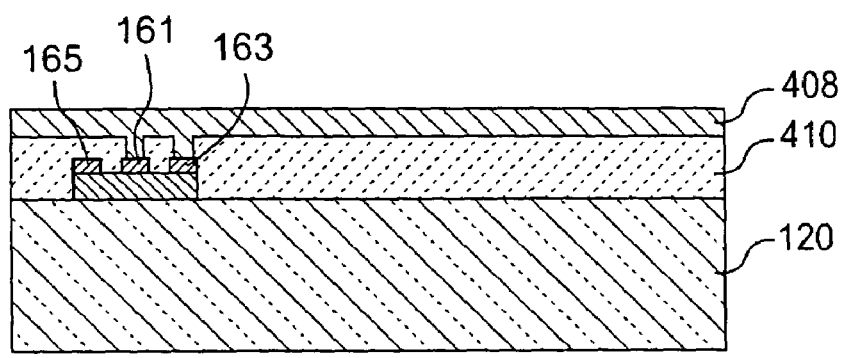
Figure 4E:
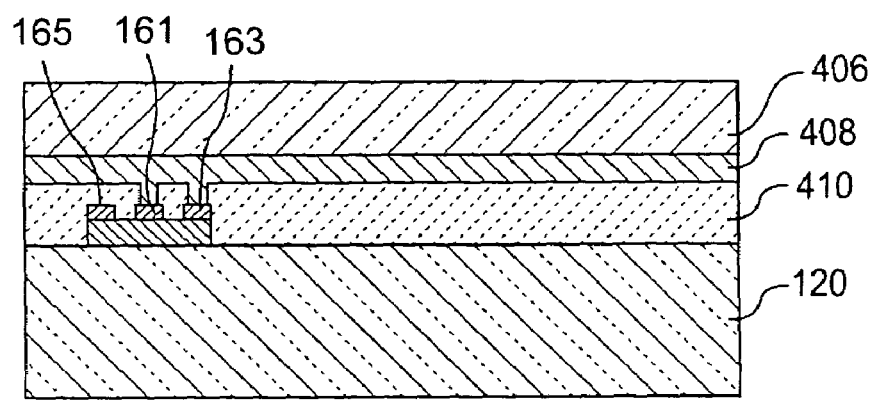
Figure 4F:
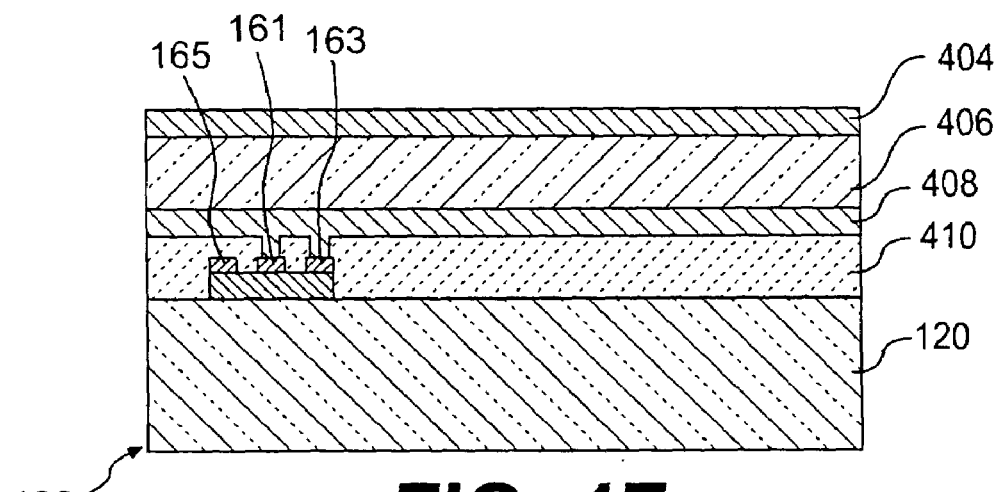

FIGS. 4A–4F show the fabrication of a layer structure 180 by mounting prefabricated access transistors 160 on the top surface of the substrate 120 (FIG. 4A); forming the reference pad 310 (FIG. 3A) and reference lines 312 (FIG. 3A) connecting the reference pad (not shown in FIG. 4A) to the source contacts 165 of the access transistors; depositing the elastic layer 410 on the substrate 120 (FIG. 4B); forming contact holes 171 and 173 extending through the elastic layer 410 to the gate contact 161 and drain contact 163, respectively, of each access transistor 160 (FIG. 4C); depositing a bottom electrode layer 408 on the elastic layer 410 (FIG. 4D); depositing a piezoelectric layer 406 on the bottom electrode-layer 408 (FIG. 4E); and depositing a top electrode layer 404 on the piezoelectric layer 106 (FIG. 4F).

The elastic layer 410, the electrode layers 408 and 404, and the piezoelectric layer 406 are deposited by a process such as sputtering, chemical vapor deposition (CVD), plasma CVD, physical vapor deposition (PVD) or the like. The contact holes 171 and 173 are formed by a first etching process that uses a first mask. The layer structure 180 fabricated as just described is shown in FIG. 4F. The layer structure 180 is then subject to additional processing to form the array of piezoelectric cantilever pressure sensors.

As described above, the thickness of each layer of the layer structure 180 depends on the specific requirements of a particular application. Either or both of the electrode layers 404 and 408 may also be a layer structure. In one embodiment, the substrate 120 is composed of borosilicate glass with a thickness of about 0.5 mm; the elastic layer 410 is composed of silicon nitride with a thickness of about 500 nm; the bottom electrode layer 408 has a two-layered structure composed of a platinum layer with a thickness of about 100 nm and a titanium oxide layer with a thickness of about 50 nm; the piezoelectric layer 406 has a thickness of about 500 nm to about 1,000 nm and is composed of PZT with a zirconium/titanium ratio of 0.4 to 0.6; the top electrode layer 404 has a thickness of about 100 nm and is composed of platinum.

Figure 5A:
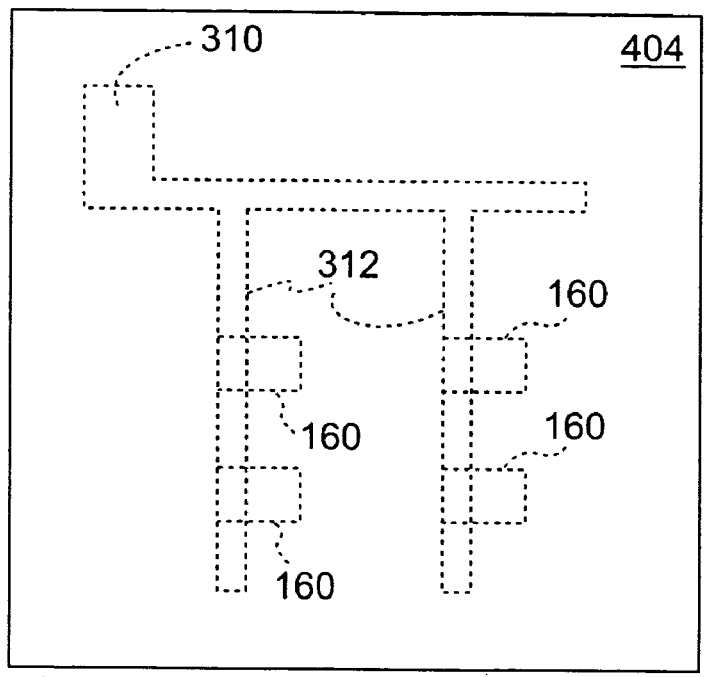
FIGS. 5A and 5B are schematic top views of the layer structure before and after, respectively, the second etching in fabricating the first embodiment.
Figure 5B:
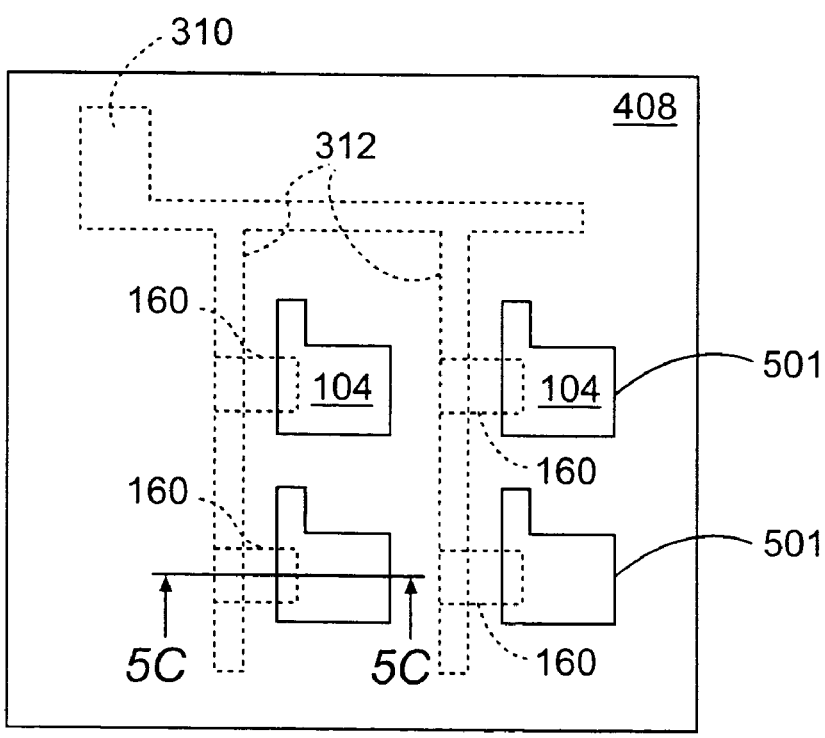
Figure 5C:
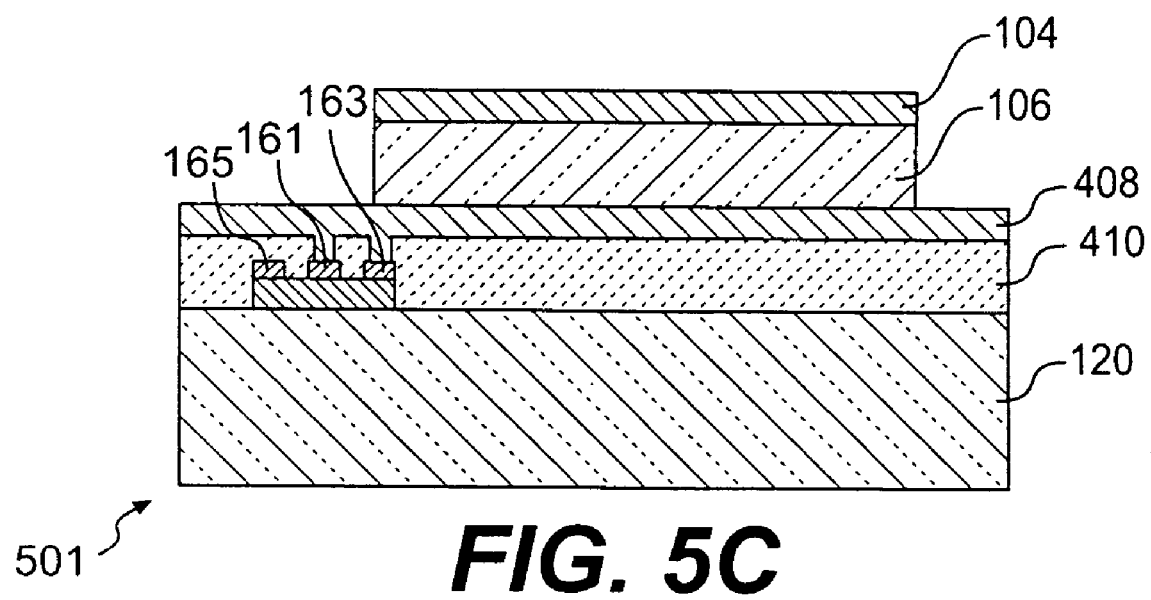
FIG. 5C shows a cross-sectional view of the partially completed piezoelectric cantilever along the line 5C—5C in FIG. 5B.

Next, as shown in FIGS. 5A–5C, the layer structure 180 is subject to a second etching process that uses a second mask. FIG. 5A shows the layer structure 180 before the second etching process is performed. The locations on the surface of the substrate of the access transistors 160, the reference lines 312 and the reference pad 310 are shown by broken lines. The second etching process defines partially completed piezoelectric cantilevers 501 in the top electrode layer 404 and the piezoelectric layer 406. In an embodiment, the partially completed piezoelectric cantilever 501 has dimensions of 25 μm×10 μm (top view) to conform to the standard sensor pitch of 50 μm. As shown in FIGS. 5B and 5C, the second etching process removes part of the top electrode layer 404 and the piezoelectric layer 406 to define the top electrode 104 and the piezoelectric element 106 of the partially completed piezoelectric cantilevers in these layers, and additionally exposes part of the bottom electrode layer 408 for the next etching process.

Figure 6A:
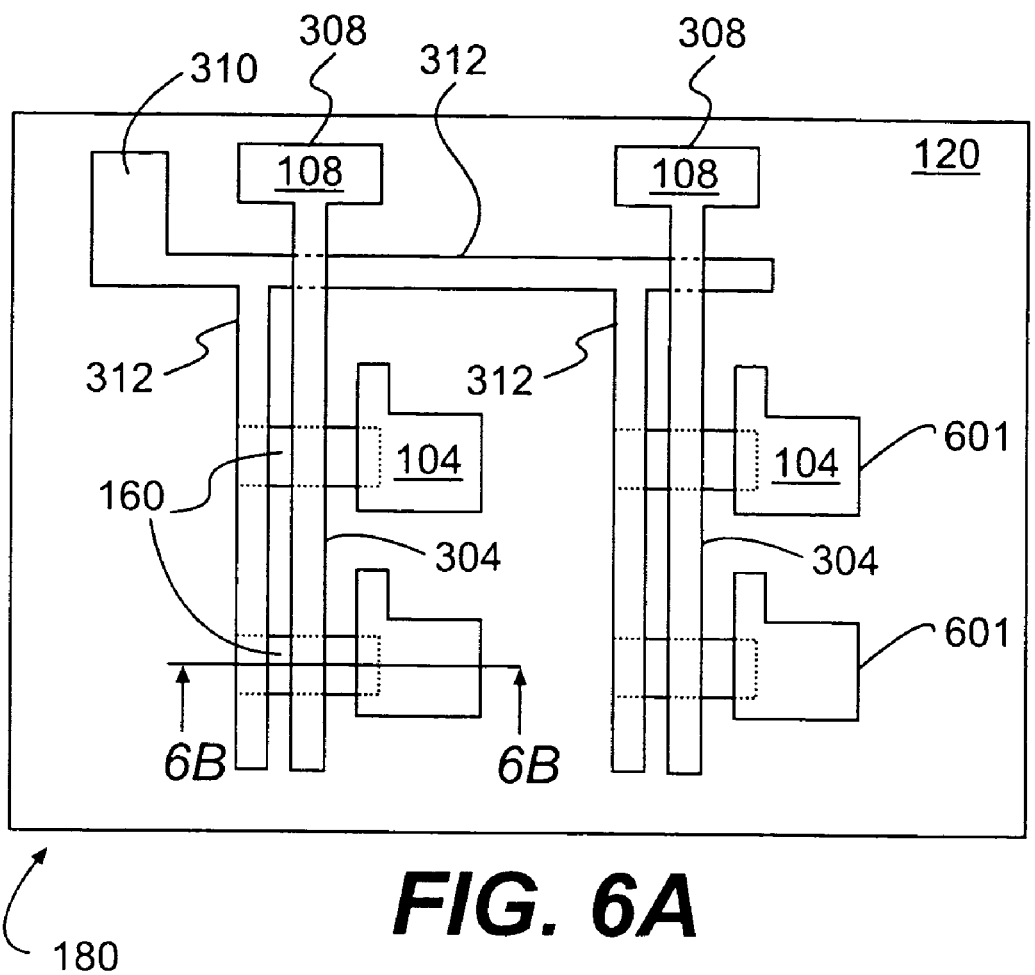
FIG. 6A is a schematic top view of the layer structure after the third etching in fabricating the first embodiment.
Figure 6B:
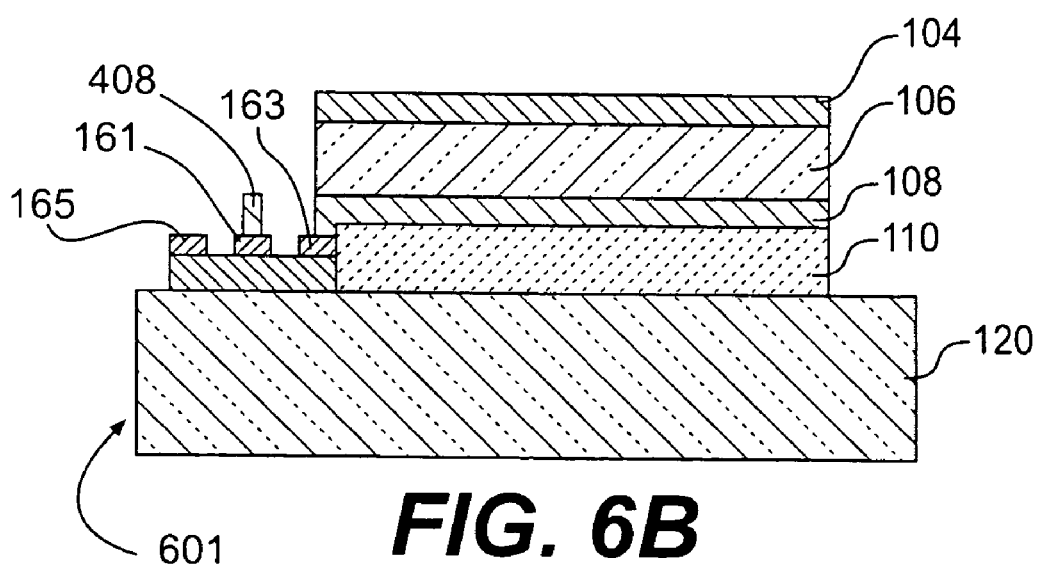
FIG. 6B shows a cross-sectional view of the partially completed piezoelectric cantilever along the line 6B—6B in FIG. 6A.

After the second etching process, the layer structure 180 is subject to a third etching process that uses a third mask. As shown in FIGS. 6A and 6B, the third etching process removes the unmasked portion of the bottom electrode layer 408 to define the bottom electrodes 108, the Y-lines 304 and Y-pads 308, and the electrical connection between the bottom electrodes and the drains of the respective access transistors 160. The third etching process additionally removes the unmasked portion of the elastic layer 410 to define the elastic element 110 and to expose the access transistors 160, the prefabricated reference pad 310 and the reference lines 312, which are connected to the source contacts 165 of the access transistors 160. The Y-lines 304 are connected to the gate contacts 161 of the access transistors 160. One of the Y-lines is shown as part of the bottom metal layer 408 on the gate contact 161 in FIG. 6B. The third etching process forms partially completed piezoelectric cantilevers 601.

Figure 7A:
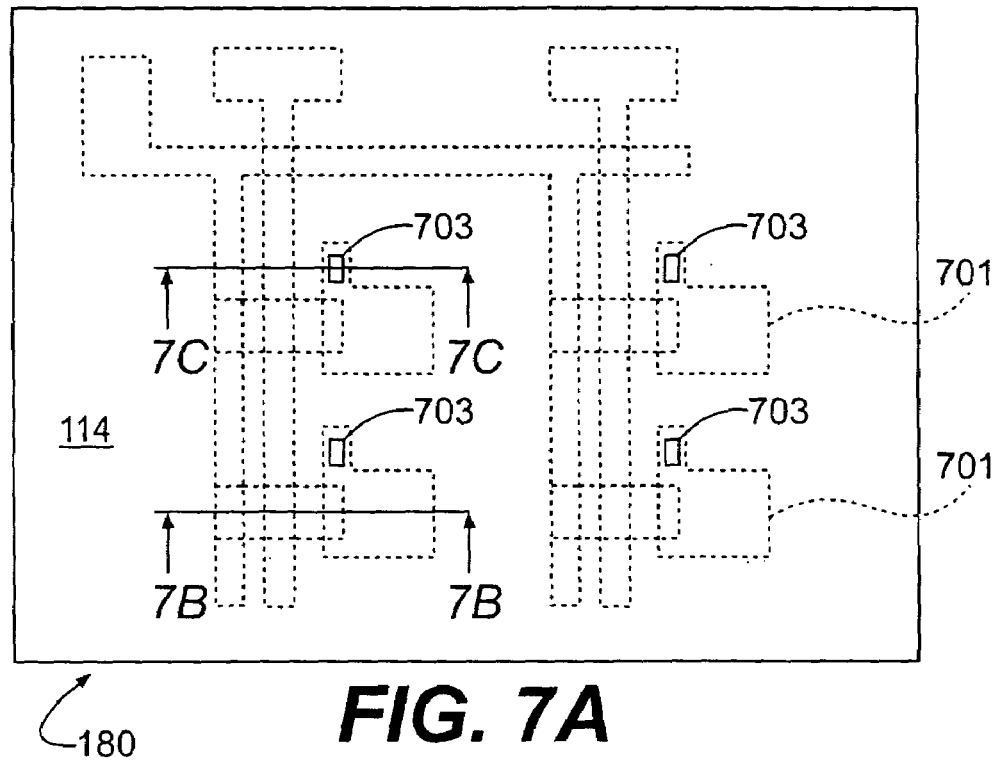
FIG. 7A is a schematic top view of the layer structure after the fourth etching in fabricating the first embodiment.
Figure 7B:
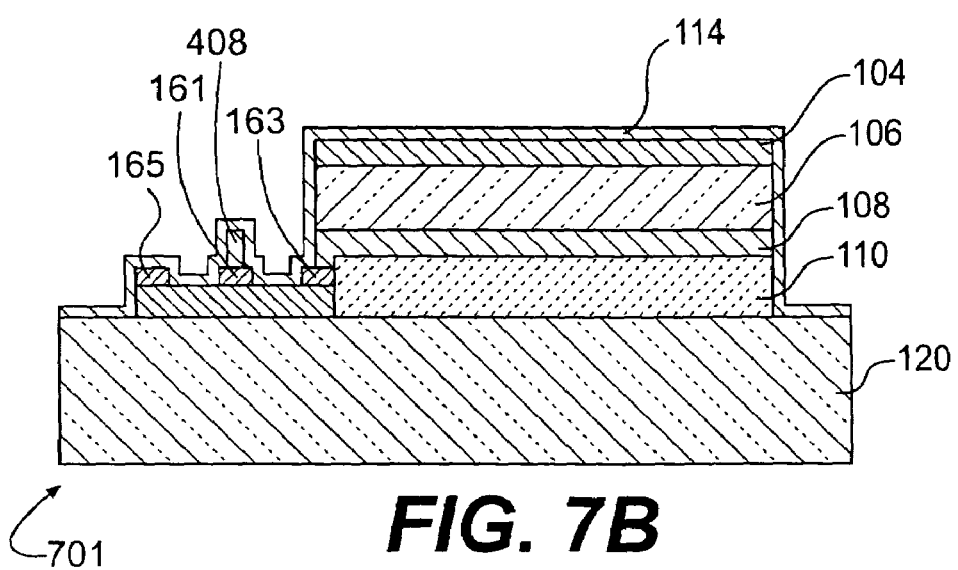
FIGS. 7B and 7C show cross-sectional views of the partially completed piezoelectric cantilever along the lines 7B—7B and 7C—7C in FIG. 7A.
Figure 7C:
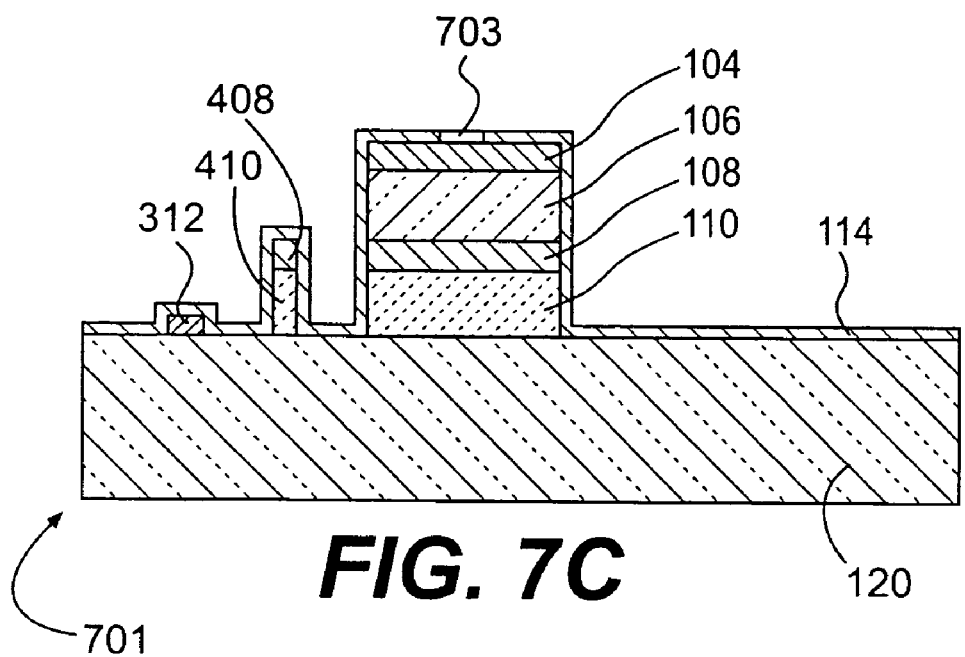

Next, the layer structure 180 is coated with a first protective layer 114, as shown in FIGS. 7A and 7B, followed by a fourth etching process that uses a fourth mask. The protective layer 114 prevents hydrogen or water penetration. The protective layer 114 is composed of aluminum oxide or any other suitable material. The protective layer 114 is deposited by a process such as sputtering, CVD, plasma CVD, PVD or the like. The fourth etching process forms contact openings 703 in the protective layer 114. As shown in FIGS. 7A and 7C, the contact openings expose part of the top electrodes 104 of the partially completed piezoelectric cantilevers 601.

Figure 8A:
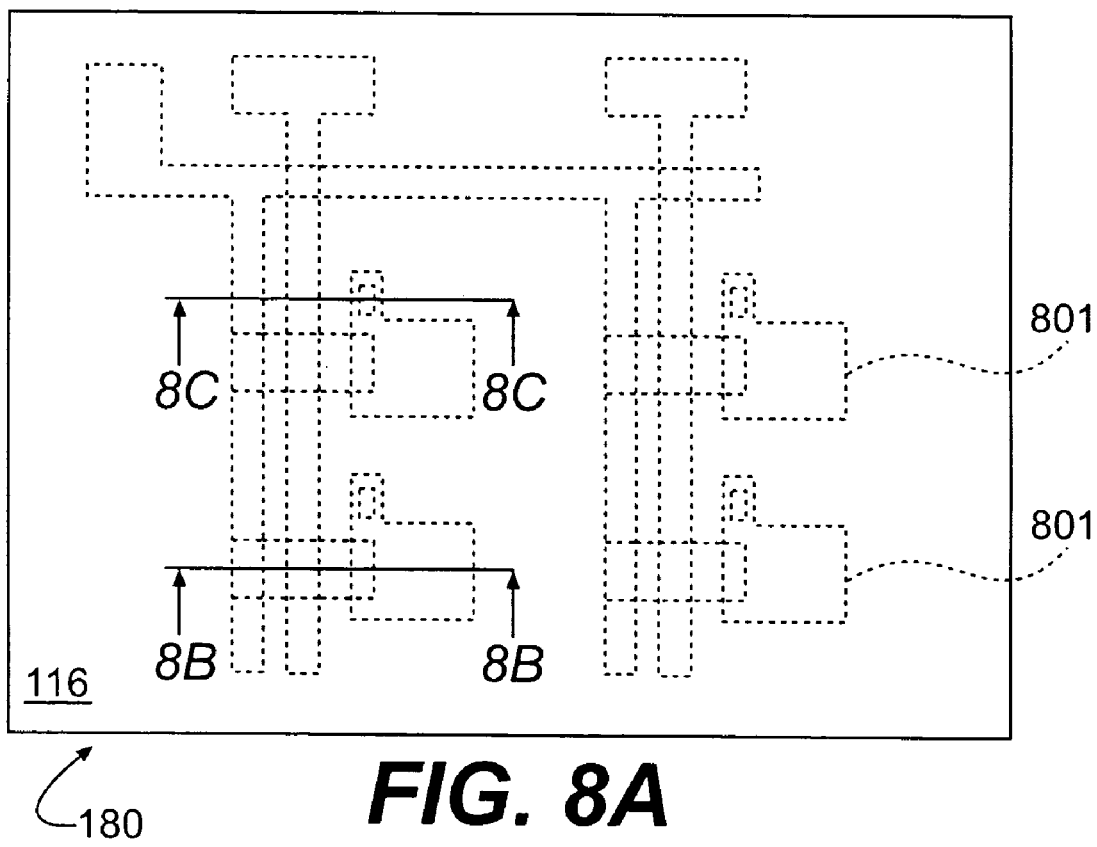
FIG. 8A is a schematic top view of the layer structure after depositing the X-line metal layer in fabricating the first embodiment.
Figure 8B:
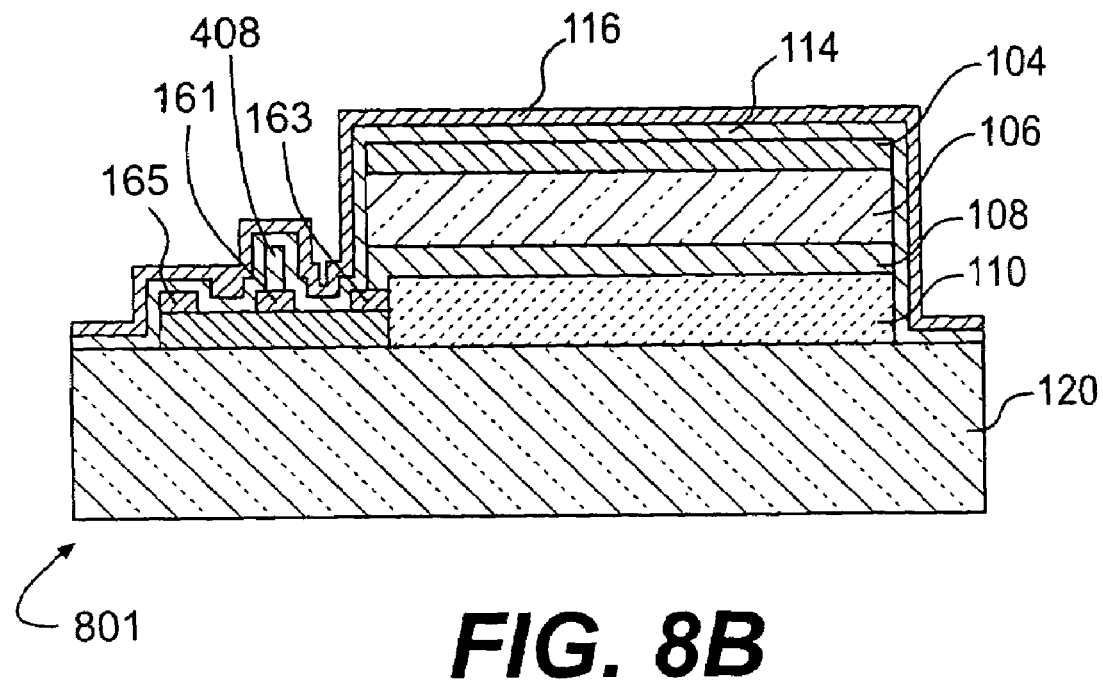
FIGS. 8B and 8C show cross-sectional views of the partially completed piezoelectric cantilever along the lines 8B—8B and 8C—8C in FIG. 8A.
Figure 8C:
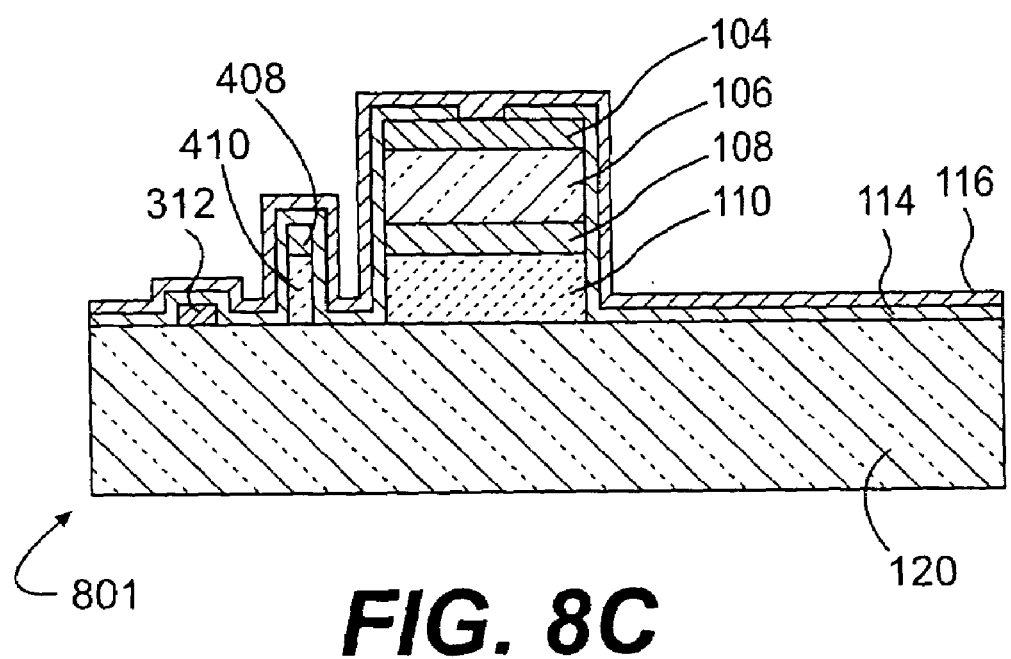

After the fourth etching process, an X-line metal layer 116 is deposited on the first protective layer 114, as shown in FIGS. 8A and 8B. The X-line metal layer 116 is deposited by a process such as sputtering, CVD, plasma CVD, PVD or the like. The X-line metal layer 116 is typically composed of aluminum or an aluminum alloy. As shown in FIG. 8C, the X-line metal layer 116 fills the contact opening 703 in the first protective layer 114 and is thus electrically connected to the top electrode 104 of the partially completed piezoelectric cantilever 801.

Figure 9A:
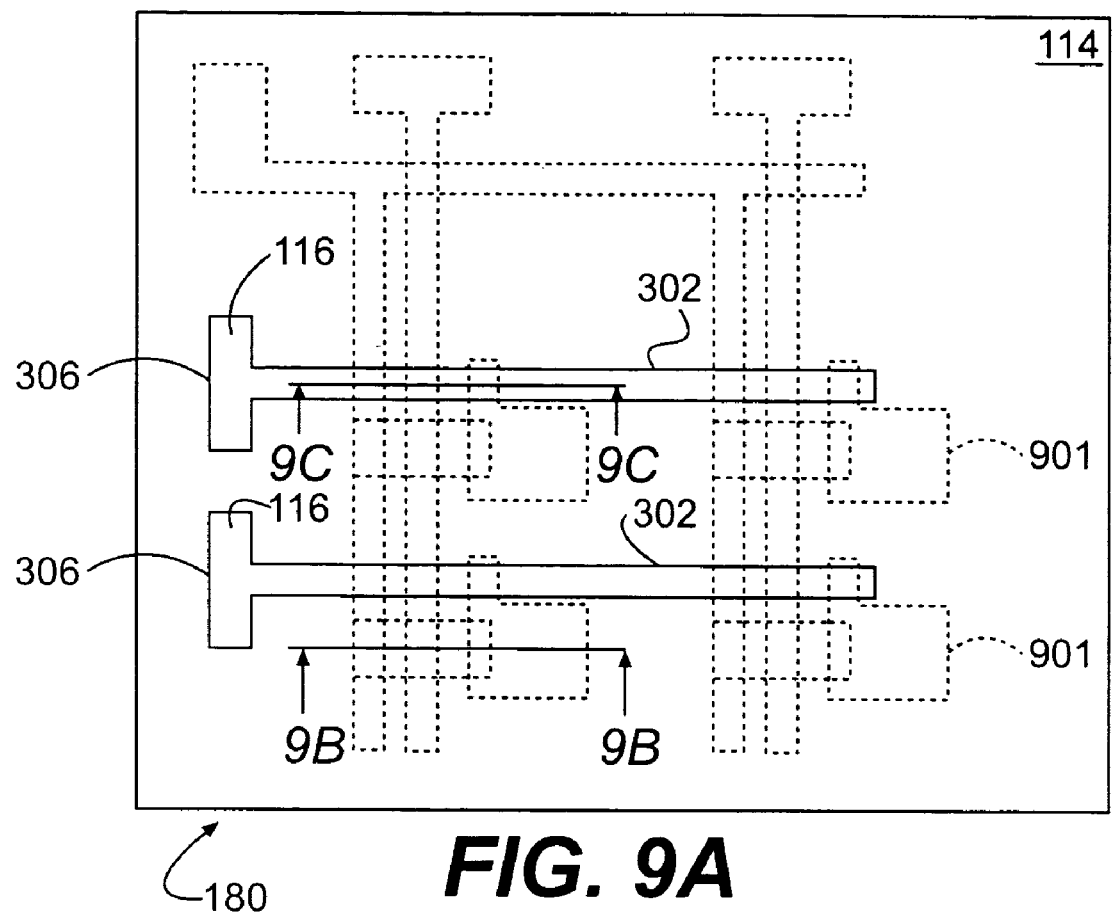
FIG. 9A is a schematic top view of the layer structure after the fifth etching in fabricating the first embodiment.
Figure 9B:
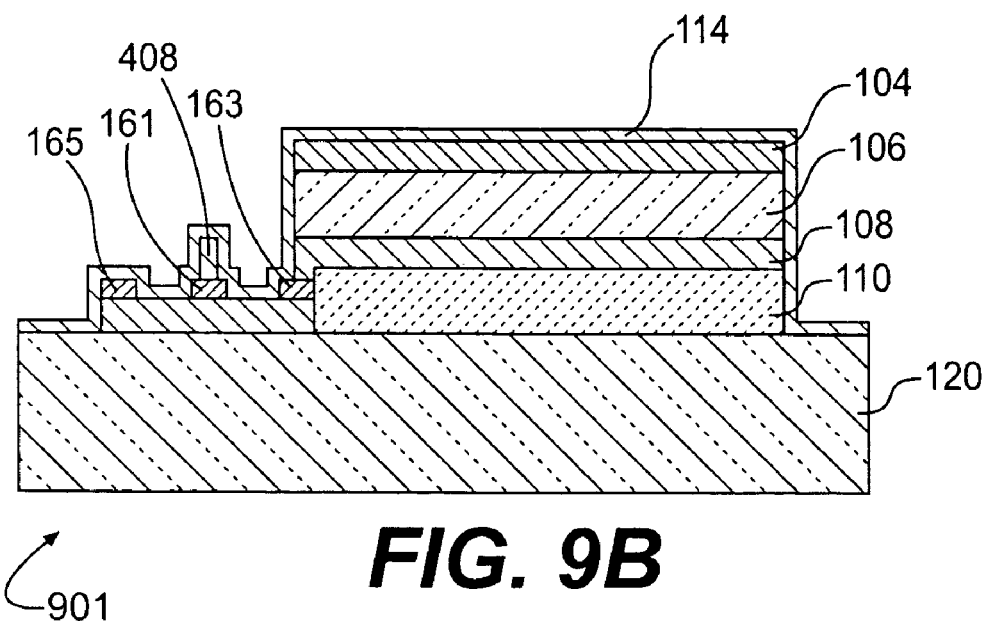
FIGS. 9B and 9C are cross-sectional views of the partially completed piezoelectric cantilever along the lines 9B—9B and 9C—9C in FIG. 9A.
Figure 9C:
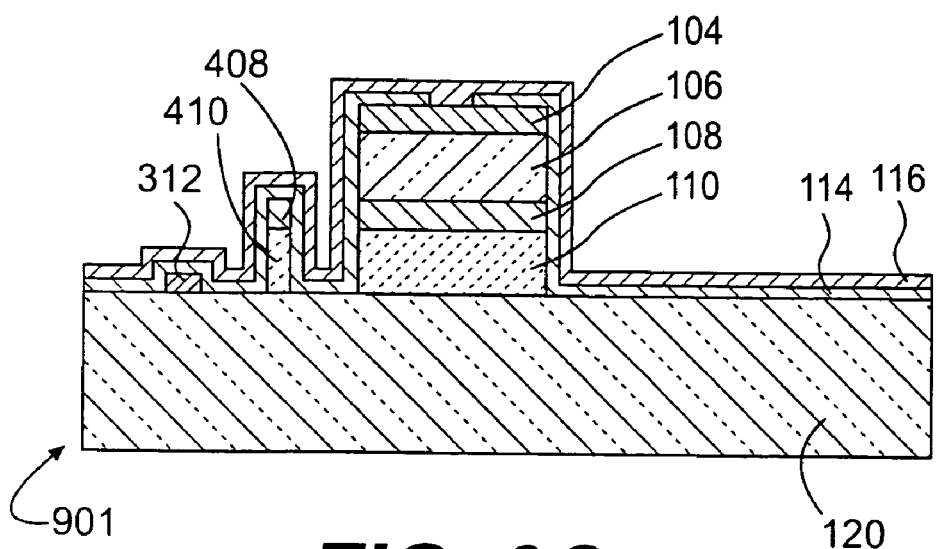

Next, a fifth etching process that uses a fifth mask is performed to define the X-lines 302 and X-pads 306 in the X-line metal layer 116. As shown in FIGS. 9A–9C, the fifth etching process removes the unmasked portion of the X-line metal layer 116 to define the X-lines 302 and the X-pads 306 and additionally exposes the first protective layer 114.

Figure 10A:
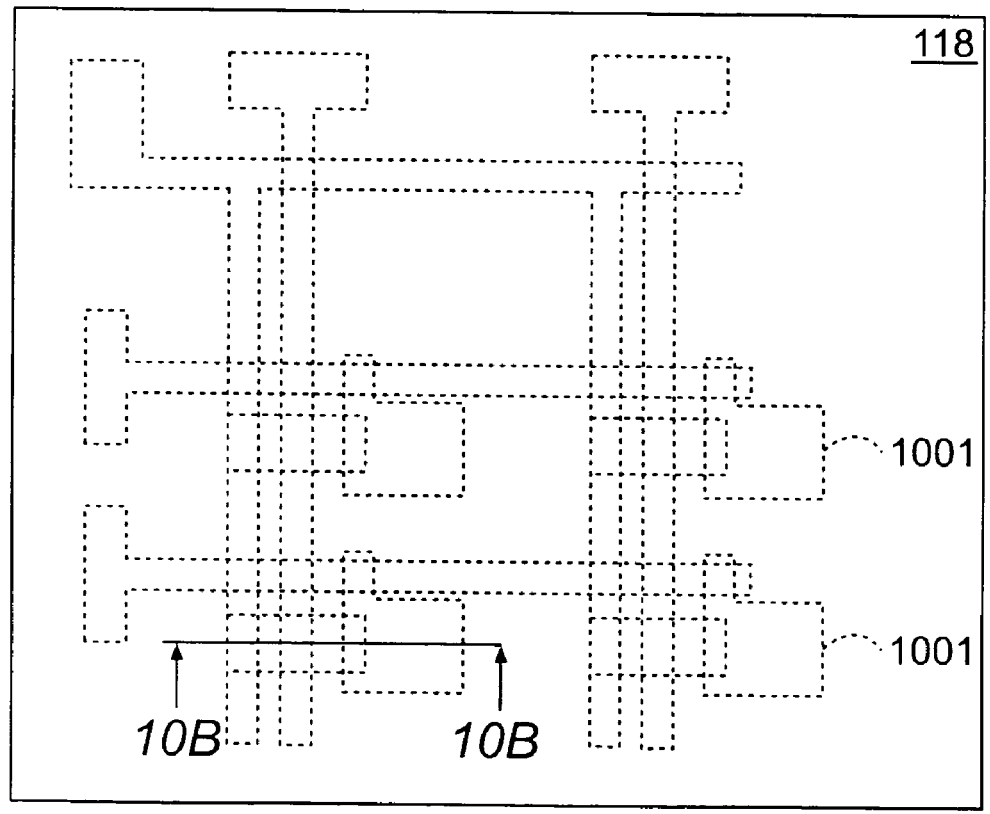
FIG. 10A is a schematic top view of the layer structure after formation of the second protective coating in fabricating the first embodiment.
Figure 10B:
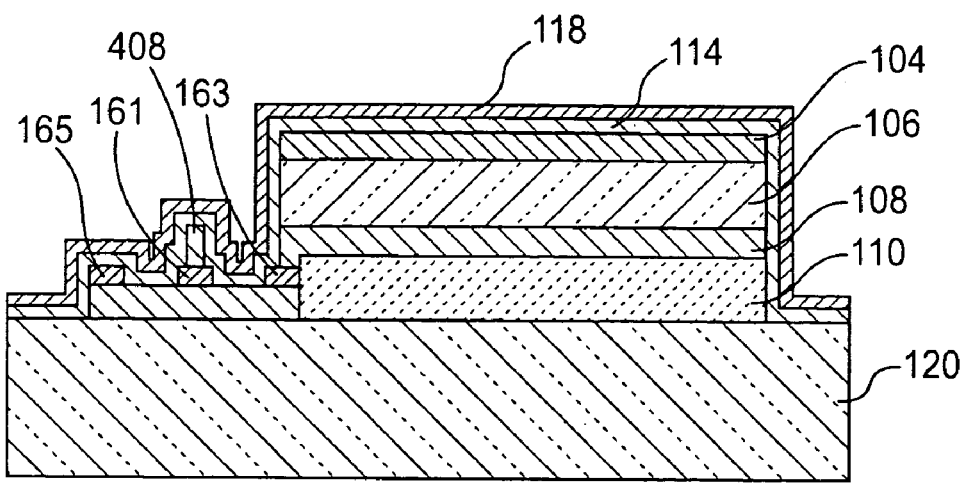
FIG. 10B shows a cross-sectional view of the partially completed piezoelectric cantilever along the line 10B—10B in FIG. 10A.

After the fifth etching process, a second protective layer 118 is deposited on the layer structure 180 by spin coating, as shown in FIGS. 10A and 10B. The second protective layer prevents direct contact between the fingertip and the X-lines 302. The second protective layer 118 is composed of any material that meets the heat resistance, chemical resistance, and insulation requirement. The second protective layer 118 is also flexible enough to allow repeated deformation. In one embodiment, the second protective layer 118 is composed of polyimide and has a thickness of about 2–7 µm.

Figure 11A:
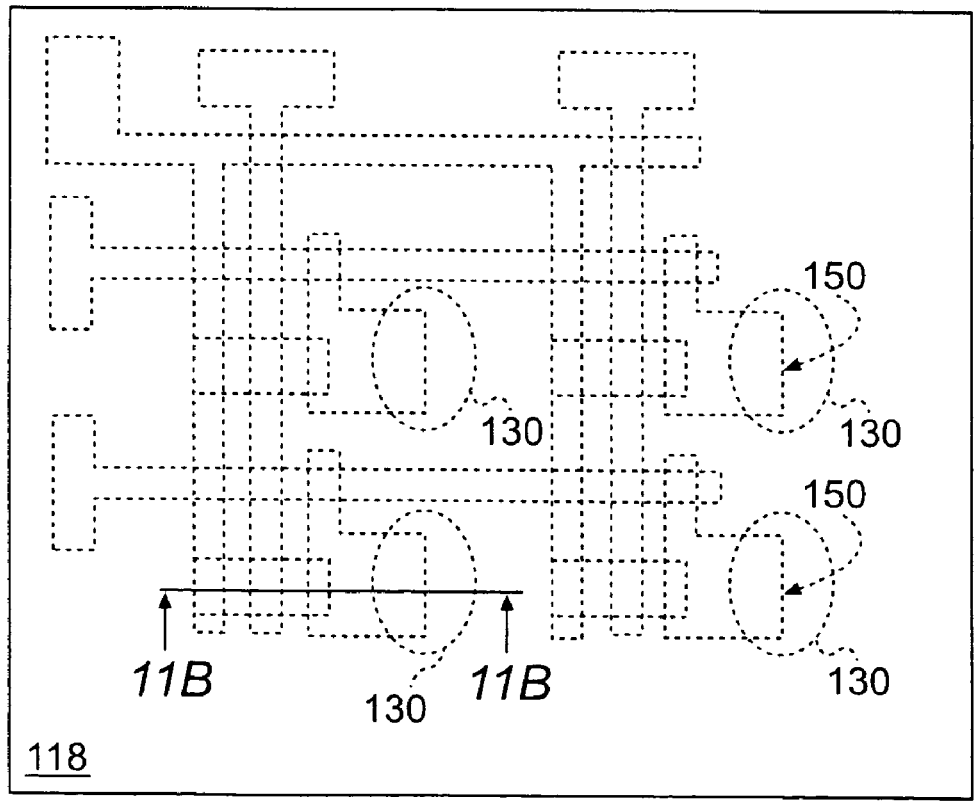
FIG. 11A is a schematic top view of the layer structure after the sixth etching in fabricating the first embodiment.
Figure 11B:
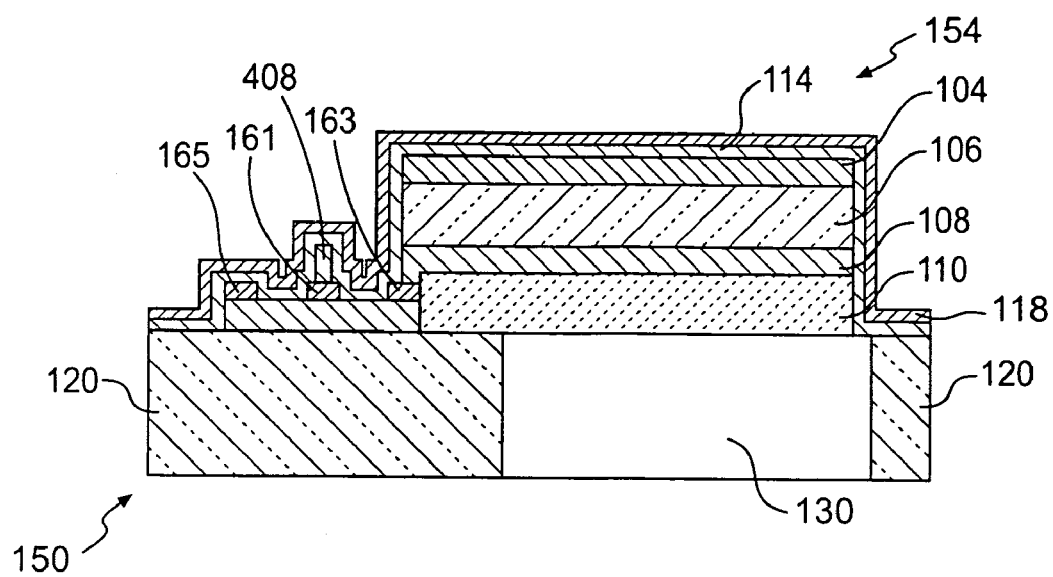
FIG. 11B shows a cross-sectional view of the piezoelectric cantilever along the line 11B—1B in FIG. 11A.

After the second protective layer 118 is deposited, the layer structure 180 is subject to a sixth etching process that uses a sixth mask. The sixth etching process is performed by applying the etchant to the bottom surface of the substrate 120. The sixth etching process forms a cavity 130 that extends through the substrate 120 to the elastic element 110 of each completed piezoelectric cantilever 150, as shown in FIGS. 11A and 11B. Forming the cavity 130 releases the beam portion 154 of each piezoelectric cantilever 150 from the substrate to complete the fabrication of the piezoelectric cantilevers.

Next, a seventh and final etching process that uses a seventh mask is performed. The seventh etching process removes portions of the first protective layer 114 and the second protective layer 118 to expose the X-pads 306, the Y-pads 308, and the reference pad 310, as shown in FIG. 12.

Figure 12:
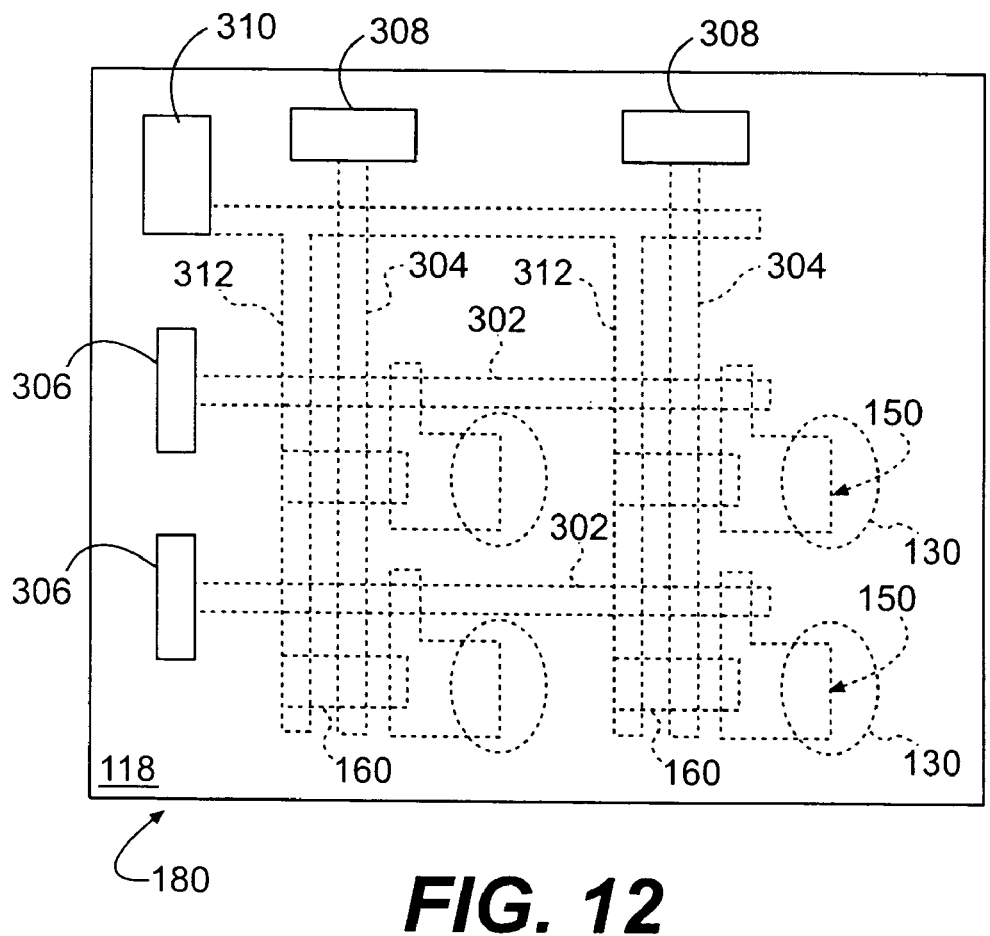
FIG. 12 is a schematic top view of the layer structure after the seventh etching in fabricating the first embodiment.

The method just described fabricates a piezoelectric cantilever pressure sensor array 300 with piezoelectric cantilever pressure sensors 100 in accordance with the first embodiment connected to the X-lines 302, the Y-lines 304, and the reference lines 312, as shown in FIG. 12. As is known in the art, the piezoelectric cantilevers 150, the X-lines 302 and X-pads 306, the Y-lines 304 and Y-pads 308, the reference lines 312 and reference pad 310, and the cavities 130 may differ in size, shape and layout from the example shown in the figures. For example, the shape of the cavities 130 can be round, oval, or rectangular.

Alternatively, the access transistors 160 can be fabricated after the piezoelectric cantilevers 150 have been defined in the layer structure 180 and the cavities 130 have been etched. The drain contacts 163 of the access transistors 160 are connected to the bottom electrodes 108 of the piezoelectric cantilevers 150 by a metallization process. The reference pad 310 and reference lines 312 are fabricated and connected to the gate contact 161 of the access transistor 160 by the same or another metallization process. The fabrication process for access transistors 160 is known in the art. For example, the process is described in detail in the book, "Thin Film Transistors" by C. R. Kagan and P. Andry, Marcel Dekker (New York, 2003), which is hereby incorporated by reference.

FIGS. 13A, 13B, 14A, 14B, 15A–15C, 16A–16C, 17A–17C, 18A, 18B, 19A, 19B, and 20 illustrate the above-mentioned second embodiment of a method of making an array of piezoelectric cantilever pressure sensors that incorporates piezoelectric cantilever pressure sensors 100 in accordance with the second embodiment described above with reference to FIG. 1C. The piezoelectric cantilever sensor array is otherwise similar to the array 300 described above with reference to FIGS. 3A and 3D. This second embodiment of the method fabricates the piezoelectric cantilever pressure sensor array using the layer structure 180 whose fabrication is described above with reference to FIGS. 4A–4F.

This second embodiment begins with the fabrication of the layer structure 180 as described above with reference to FIGS. 4A–4F. The layer structure 180 is then subject to a second etching process that uses a second mask. The second mask is similar to that used in the second etching process described above with reference to FIGS. 5A–5C except that it additionally defines releasing holes 503 in the beam portion 154 of each partially completed piezoelectric cantilever 1301. The releasing holes are used later to facilitate etching part of the cavity under each beam portion.

Figure 13A:
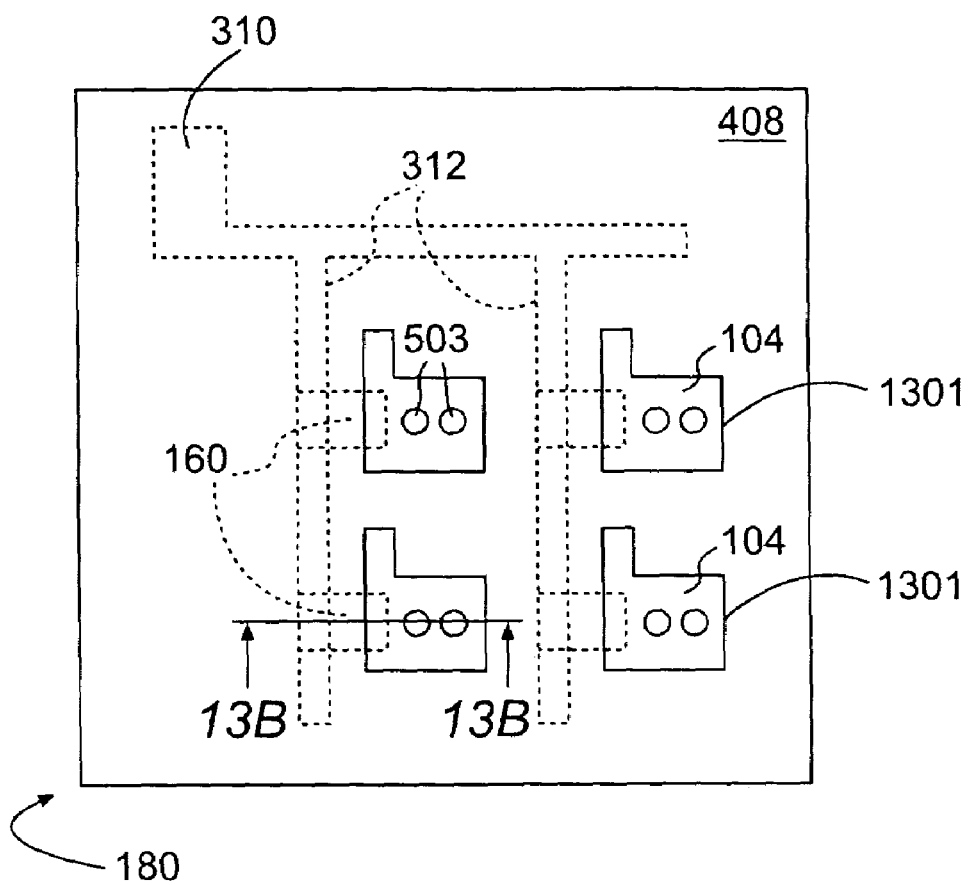
FIG. 13A is a schematic top view of the layer structure in FIG. 4D after the second etching in fabricating the second embodiment.
Figure 13B:
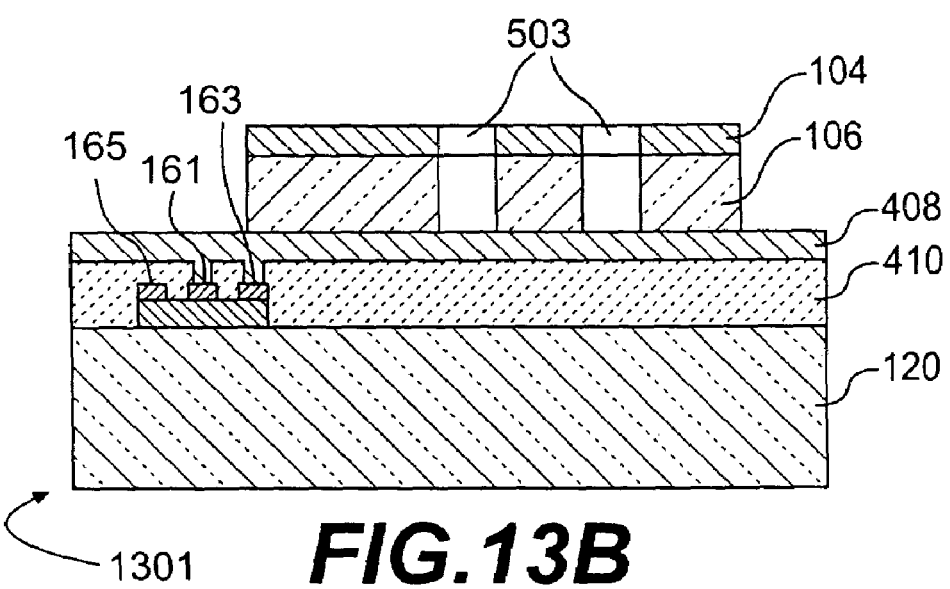
FIG. 13B is a schematic cross-sectional view of the partially completed piezoelectric cantilever along the line 13B—13B in FIG. 13A.

As shown in FIG. 13B, the second etching process removes part of the top electrode layer 404 and the piezoelectric layer 406 to define the top electrode 104 and the piezoelectric element 106 of the partially completed piezoelectric cantilevers 1301 and to define the releasing holes 503 that extend through the top electrode layer and the piezoelectric layer. The second etching process additionally exposes part of the bottom electrode layer 408 for the next etching process.

Figure 14A:
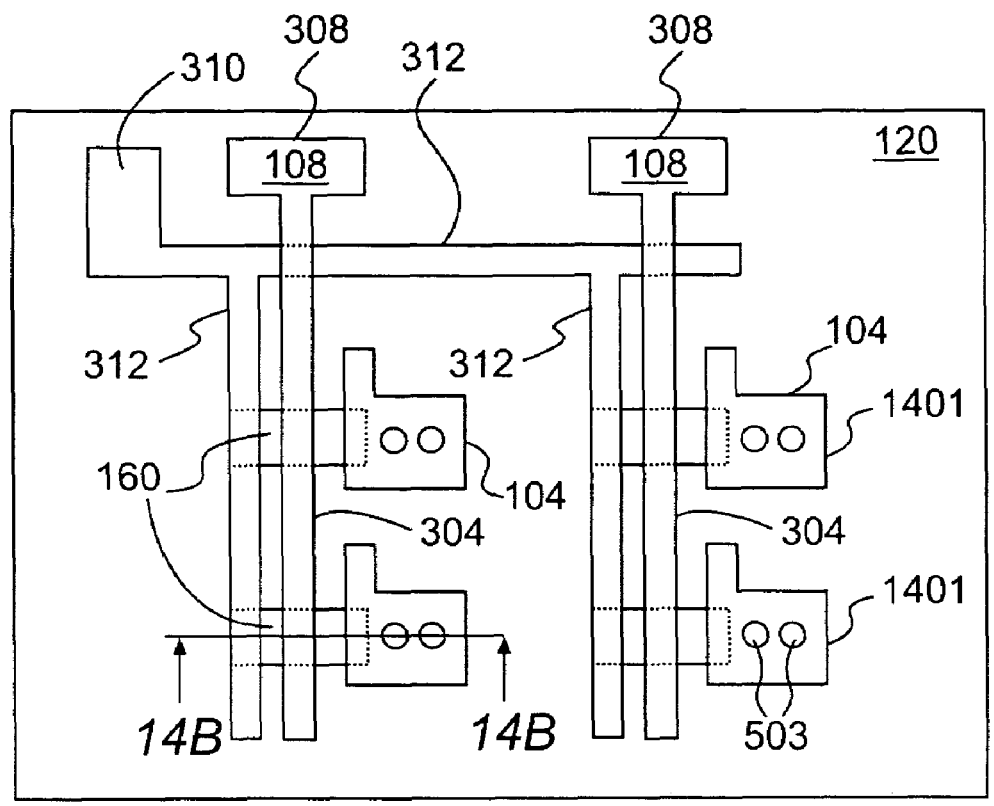
FIG. 14A is a schematic top view of the layer structure after the third etching in fabricating the second embodiment.
Figure 14B:
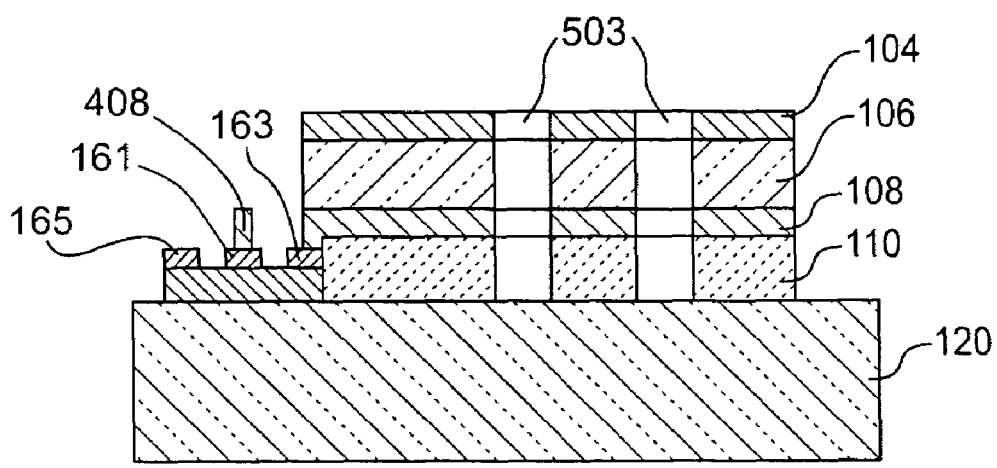
FIG. 14B is a schematic cross-sectional view of the partially completed piezoelectric cantilever along the line 14B—14B in FIG. 14A.

After the second etching process, the layer structure 180 is subject to a third etching process that uses a third mask. As shown in FIGS. 14A and 14B, the third etching process removes the unmasked portion of the bottom electrode layer 408 to define the bottom electrodes 108, the Y-lines 304 and Y-pads 308 and the electrical connection between the bottom electrodes and the drains of the respective access transistors 160. The third etching process additionally removes the unmasked portion of the elastic layer 410 to define the elastic element 110 and to expose the prefabricated reference pad 310 and reference lines 312, which are connected to the source contacts 165 of the access transistors 160. The Y-lines 304 are connected to the gate contacts 161 of the access transistors 160. One of the Y-lines 304 is shown as part of the bottom electrode layer 408 on the gate contact 161 in FIG. 14B. The third etching process forms a partially completed piezoelectric cantilever 1401.

Figure 15A:
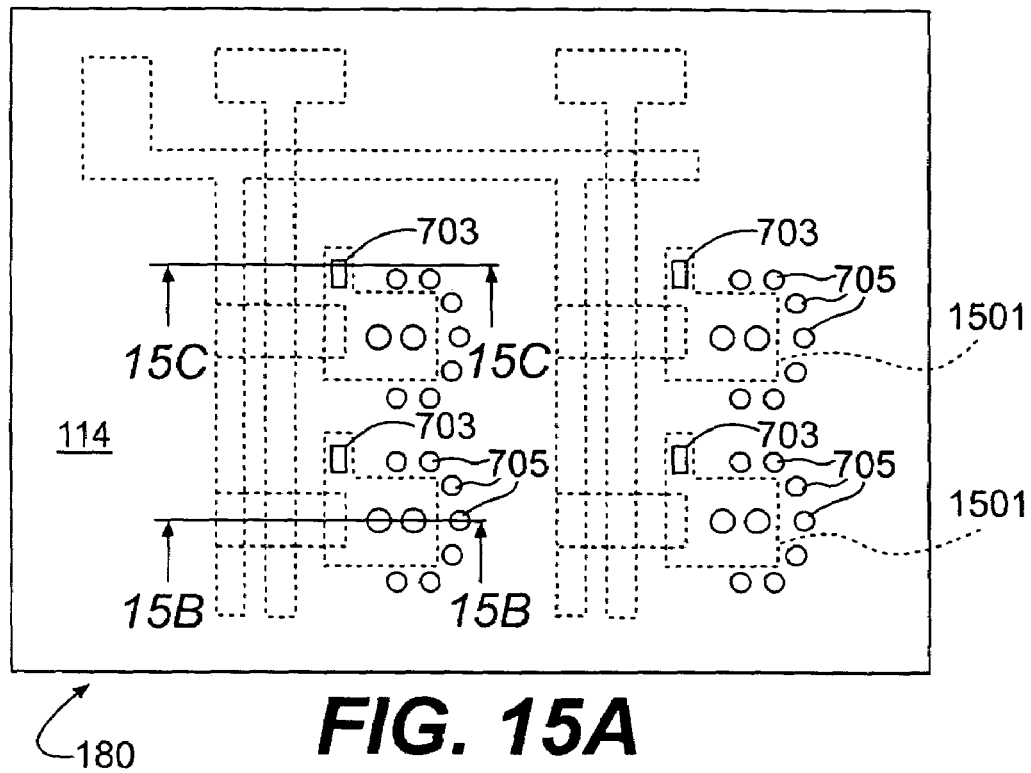
FIG. 15A is a schematic top view of the layer structure after the fourth etching in fabricating the second embodiment.
Figure 15B:
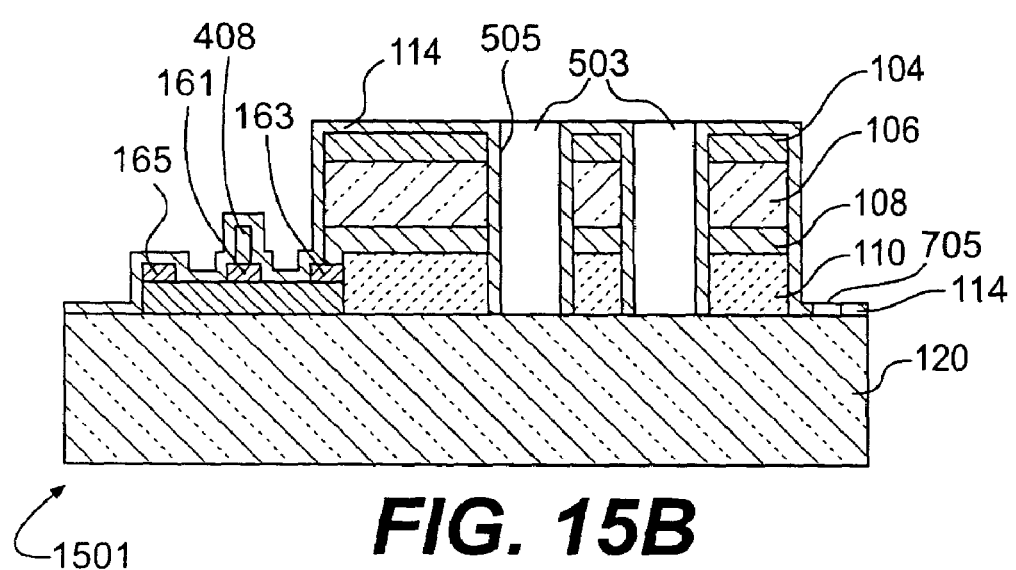
FIGS. 15B and 15C are schematic cross-sectional views of the partially completed piezoelectric cantilever along the lines 15B—15B and 15C—15C in FIG. 15A.

Next, the layer structure 180 is coated with a first protective layer 114, as shown in FIGS. 15A and 15B, followed by a fourth etching process that uses a fourth mask. The protective layer 114 prevents hydrogen or water penetration. The protective layer 114 is composed of aluminum oxide or any other suitable material. The protective layer 114 is deposited by a process such as sputtering, CVD, plasma CVD, PVD or the like.

Figure 15C:
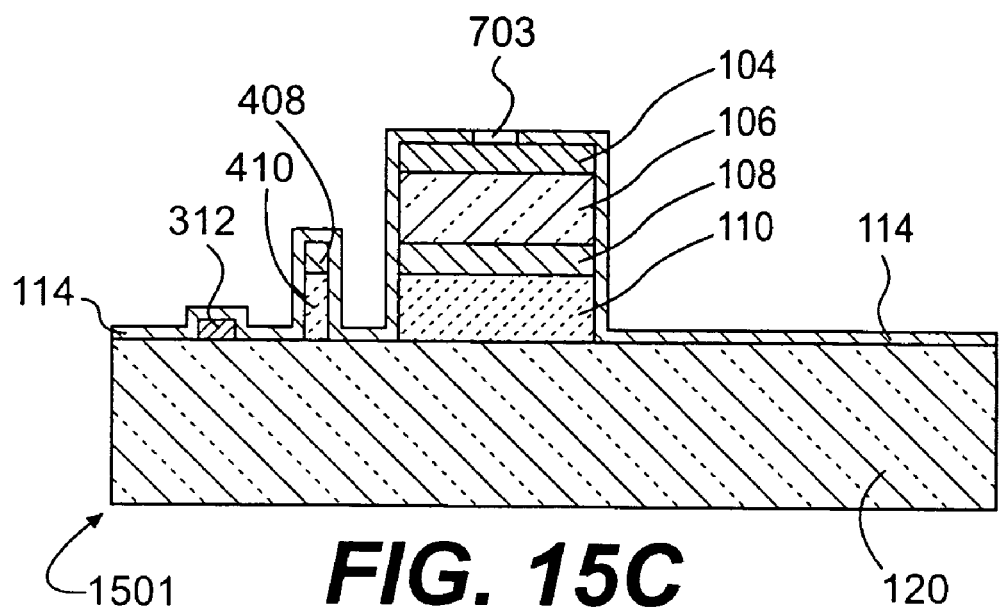

The fourth etching process forms in the protective layer 114 contact openings 703 and additionally forms a second set of releasing holes 705 around each partially completed piezoelectric cantilever 1501. The fourth etching process also re-opens the releasing holes 503 that extend through the beam portion 154 of each partially completed piezoelectric cantilever 1501. As shown in FIGS. 15A–15C, the contact openings 703 expose the top electrode layer 104, while the releasing holes 503 and 705 expose the top surface of the substrate 120. The interior wall 505 of the releasing holes 503 remains covered by the protective coating layer 114 after the fourth etching process.

Figure 16A:
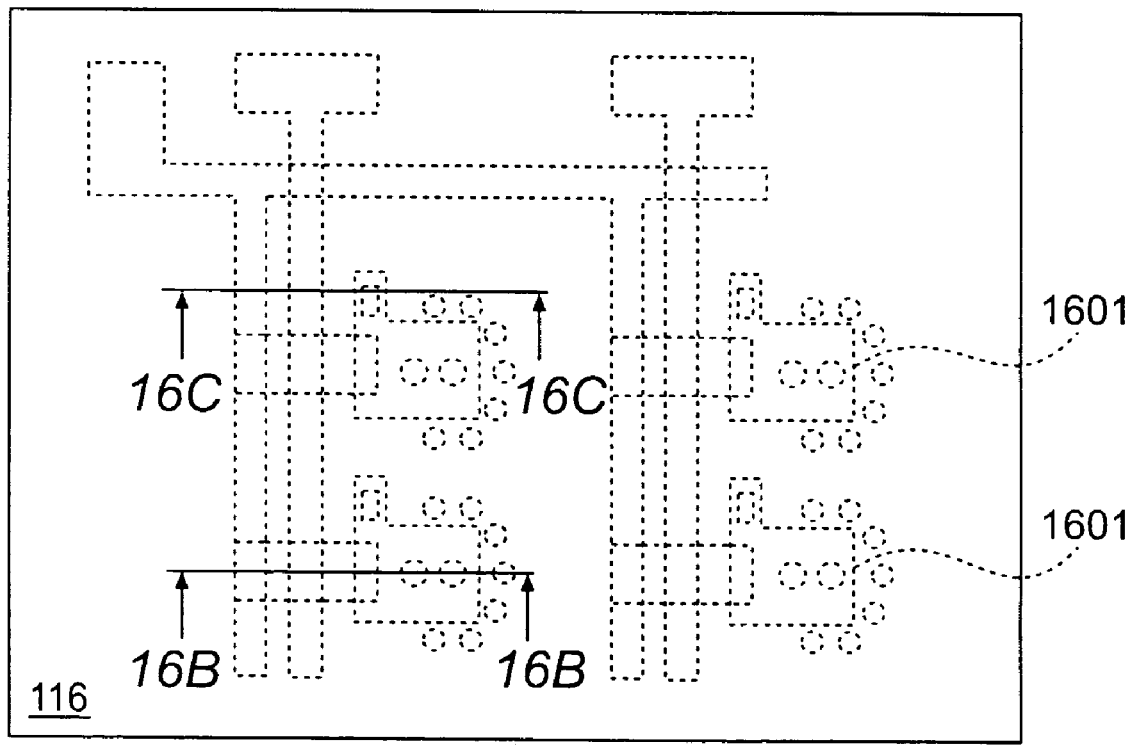
FIG. 16A is a schematic top view of the layer structure after depositing the X-line metal layer in fabricating the second embodiment.
Figure 16B:
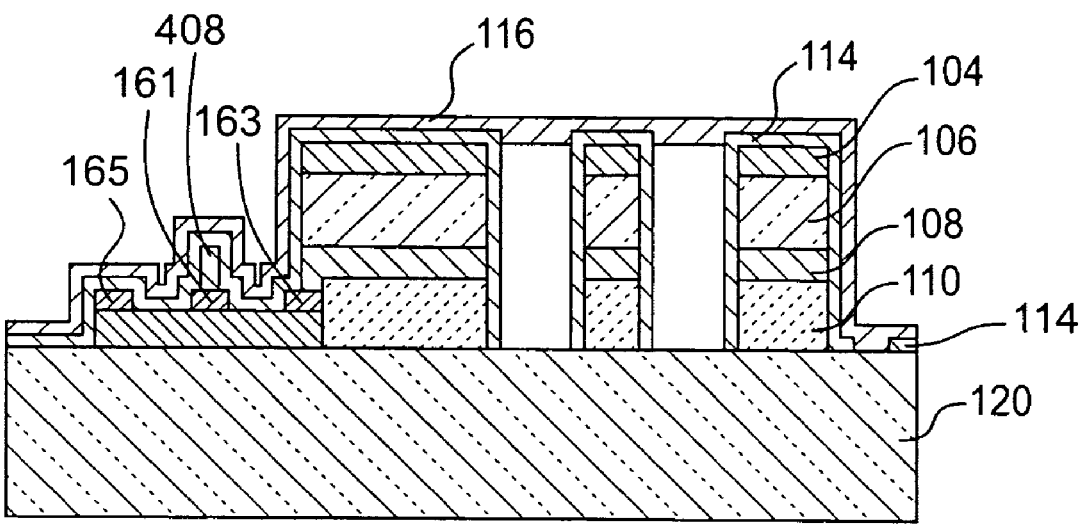
FIGS. 16B and 16C are schematic cross-sectional views of the partially completed piezoelectric cantilever along the lines 16B—16B and 16C—16C in FIG. 16A.
Figure 16C:
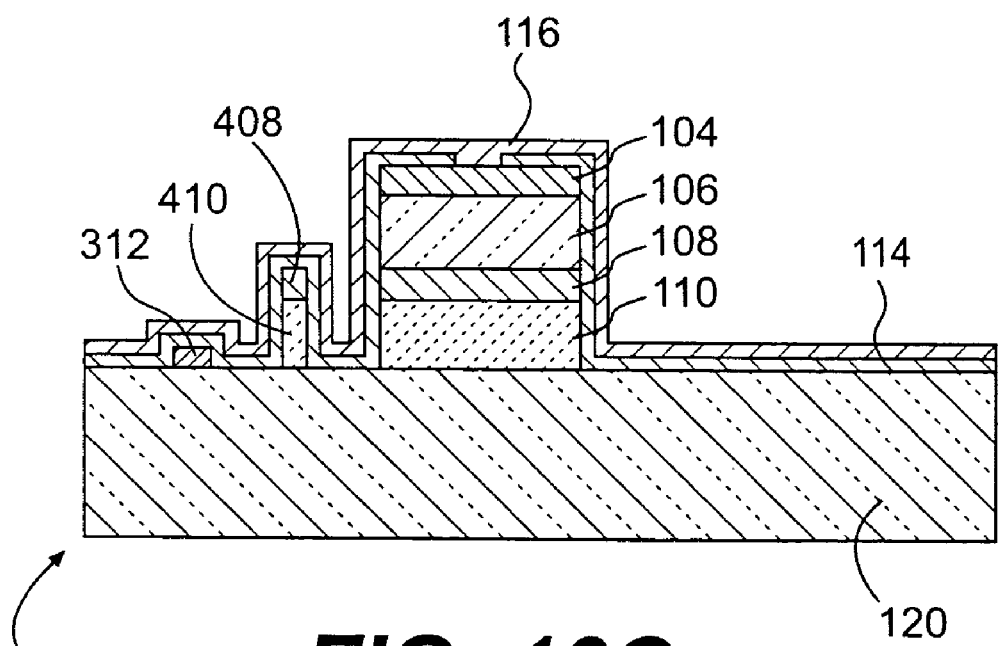

Next, an X-line metal layer 116 is deposited on the first protective layer 114, as shown in FIGS. 16A and 16B. The metal layer 116 is deposited by a process such as sputtering, CVD, plasma CVD, PVD or the like. The X-line metal layer 116 is typically composed of aluminum or an aluminum alloy. As shown in FIG. 16C, the X-line metal layer 116 fills the contact opening 703 in the first protective layer 114 and is thus electrically connected to the top electrode 104 of the partially completed piezoelectric cantilever 1601.

Figure 17A:
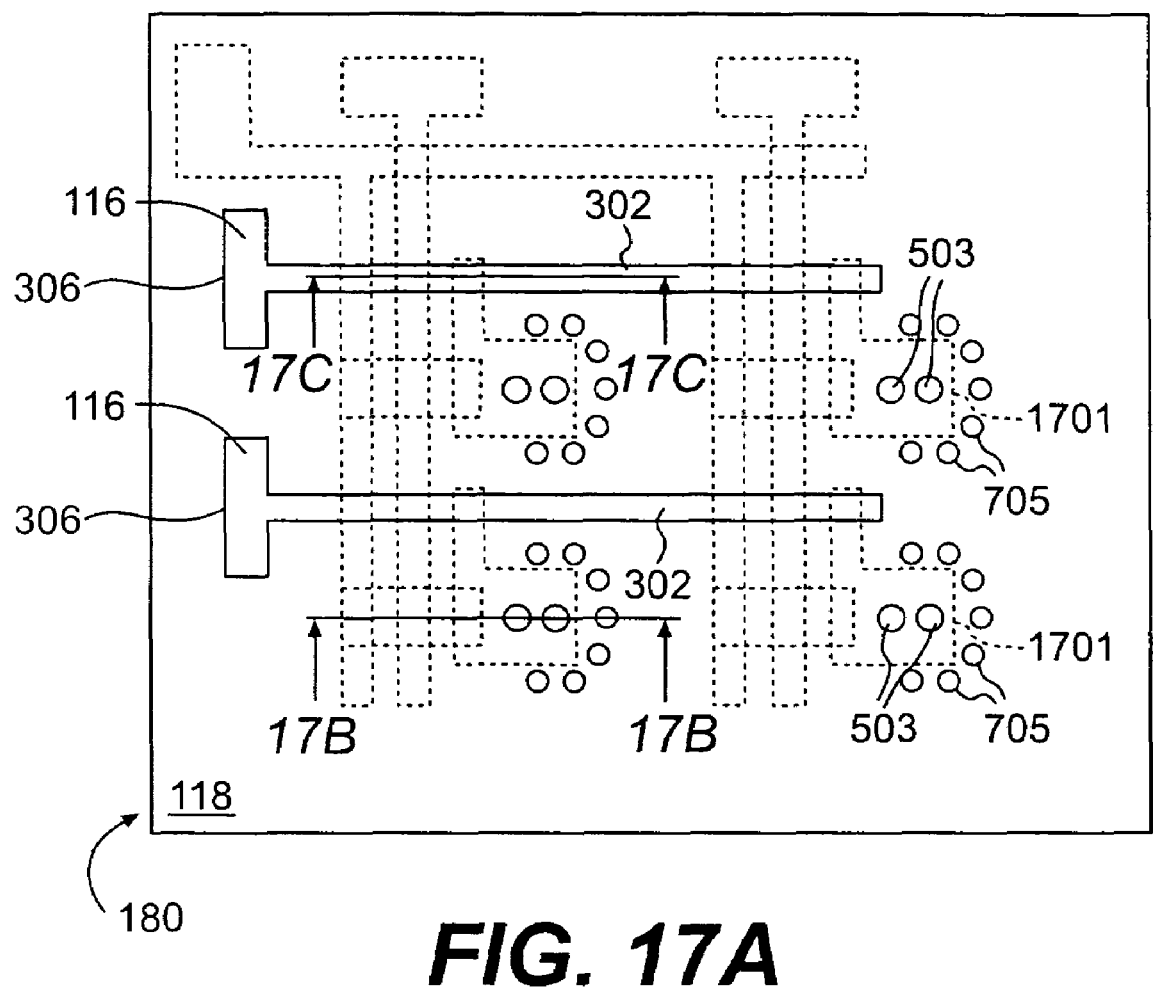
FIG. 17A is a schematic top view of the layer structure after the fifth etching in fabricating the second embodiment.
Figure 17B:
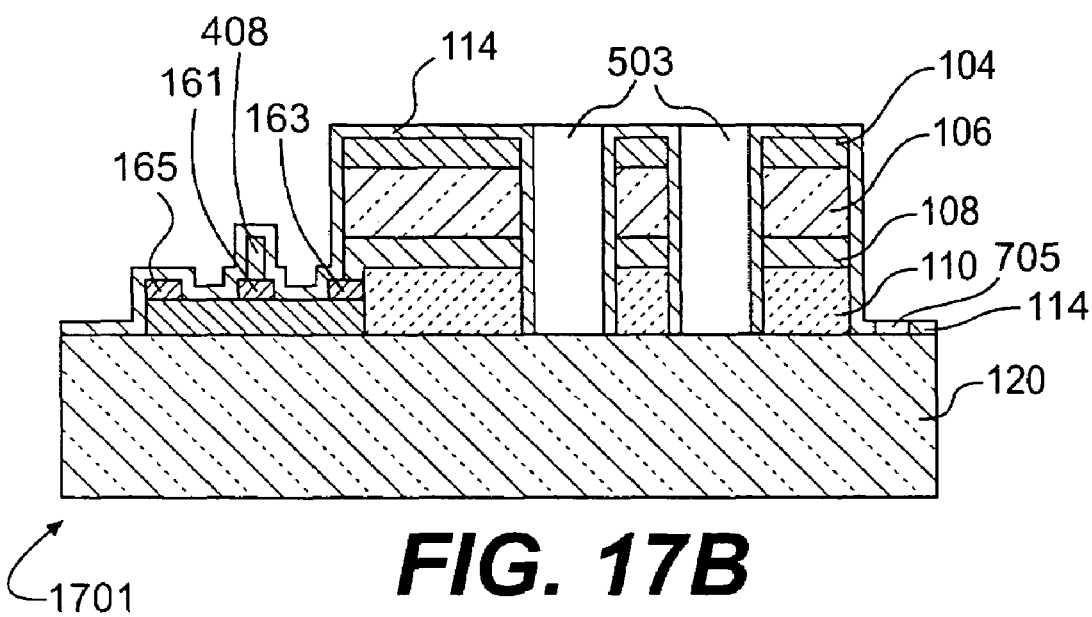
FIGS. 17B and 17C are schematic cross-sectional views of the partially completed piezoelectric cantilever along the lines 17B—17B and 17C—17C in FIG. 17A.
Figure 17C:
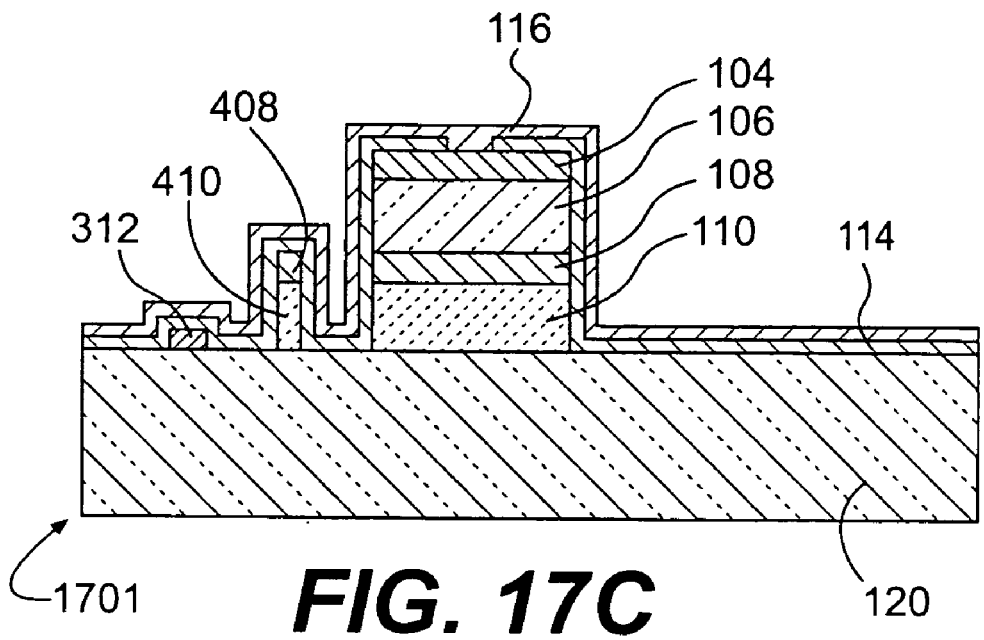

Next, a fifth etching process that uses a fifth mask is performed to define the X-lines 302 and X-pads 306 in the X-line metal layer 116. As shown in FIGS. 17A–17C, the fifth etching process removes the unmasked portion of the X-line metal layer 116 to define the X-lines and X-pads and exposes the first protective layer 114. The fifth etching process additionally re-opens the releasing holes 503 and 705, as shown in FIG. 17B.

Figure 18A:
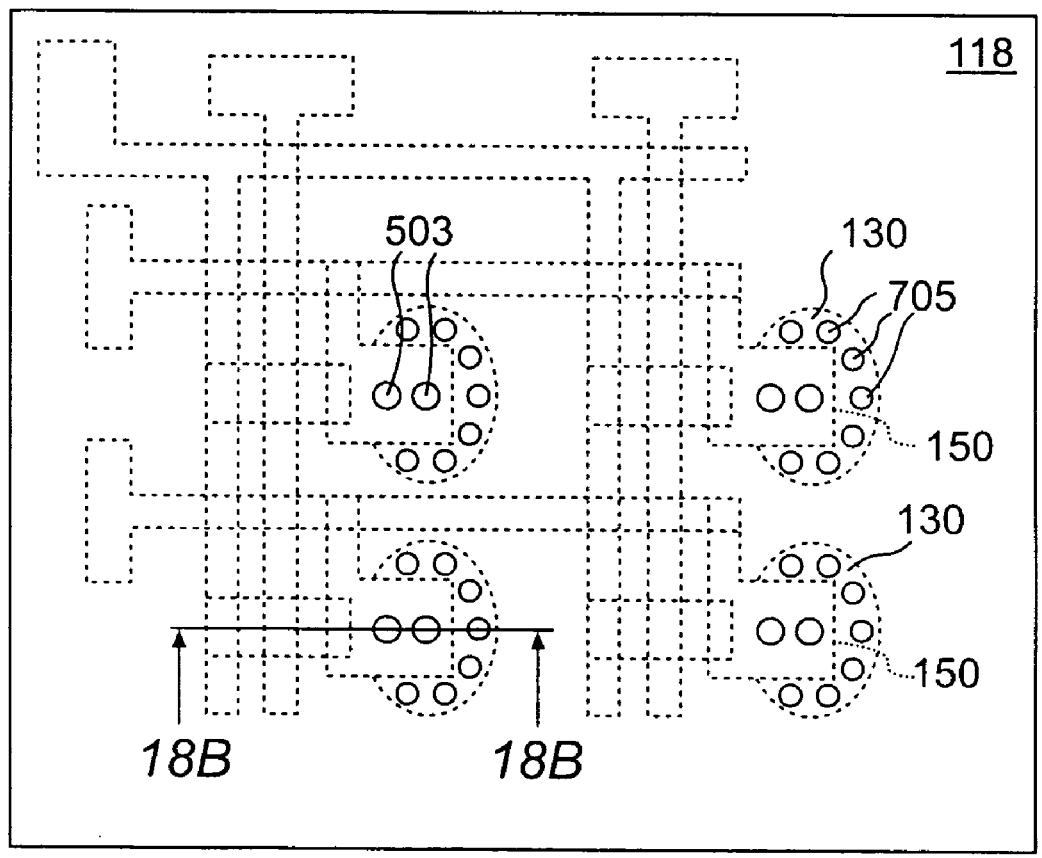
FIG. 18A is a schematic top view of the layer structure after the sixth etching in fabricating the second embodiment.
Figure 18B:
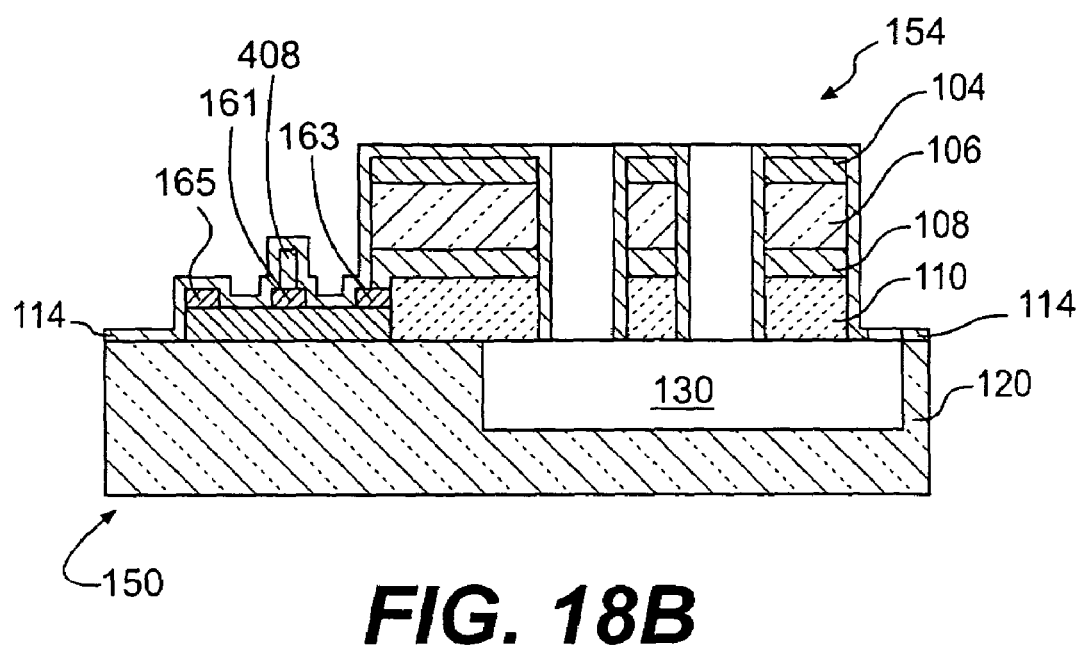
FIG. 18B is a schematic cross-sectional view of the completed piezoelectric cantilever along the line 18B—18B in FIG. 18A.

After the fifth etching process, the layer structure 180 is subject to a sixth etching process that creates a cavity 130 under the beam portion 154 of each piezoelectric cantilever 150, as shown in FIGS. 18A and 18B. The sixth etching process releases the beam portions 154 from the surface of the substrate 120. No mask is needed for this etching process. Etchant flows through the releasing holes 503 and 705 shown in FIG. 18B to the portion of the top surface of the substrate 120 under the elastic element 110 and etches away this portion of the substrate to form the cavity 130. Typically, the sixth etching process etches the cavity 130 to a depth that is larger than the maximum possible deflection of the piezoelectric cantilever 150 under the pressure from a fingertip, but is substantially less than the total thickness of the substrate 120. Consequently, the sixth etching process is substantially shorter in duration than the etching process performed from the bottom surface of the substrate to form the cavity in the first embodiment of the method described above.

Figure 19A:
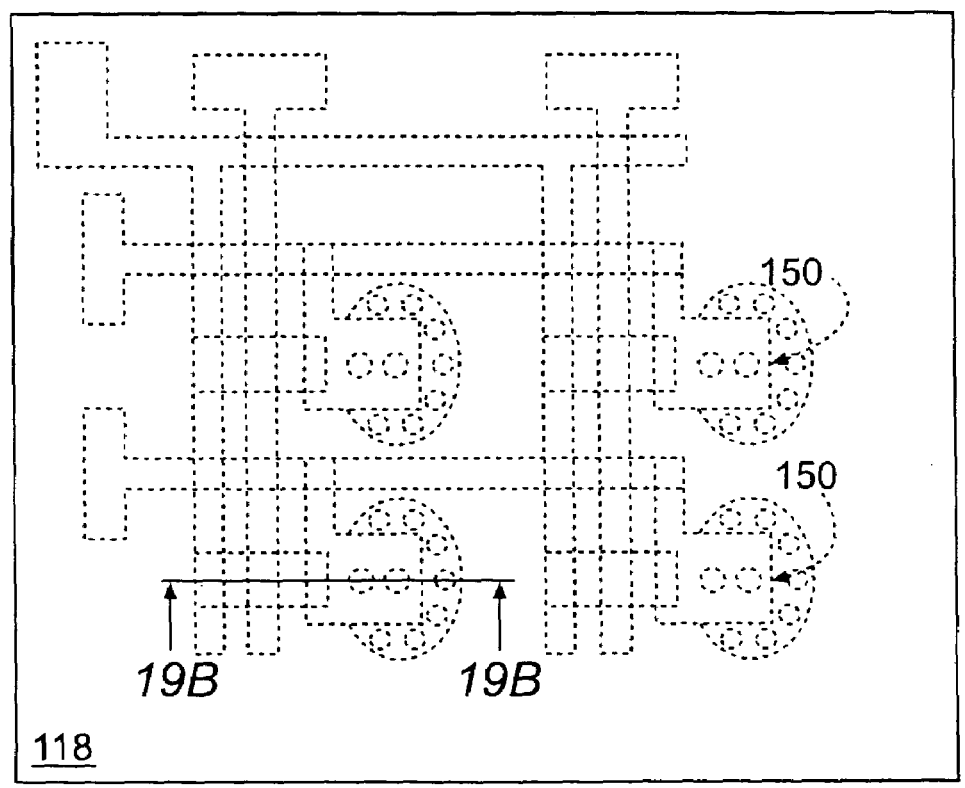
FIG. 19A is a schematic top view of a layer structure after the formation of the second protective coating in fabricating the second embodiment.
Figure 19B:
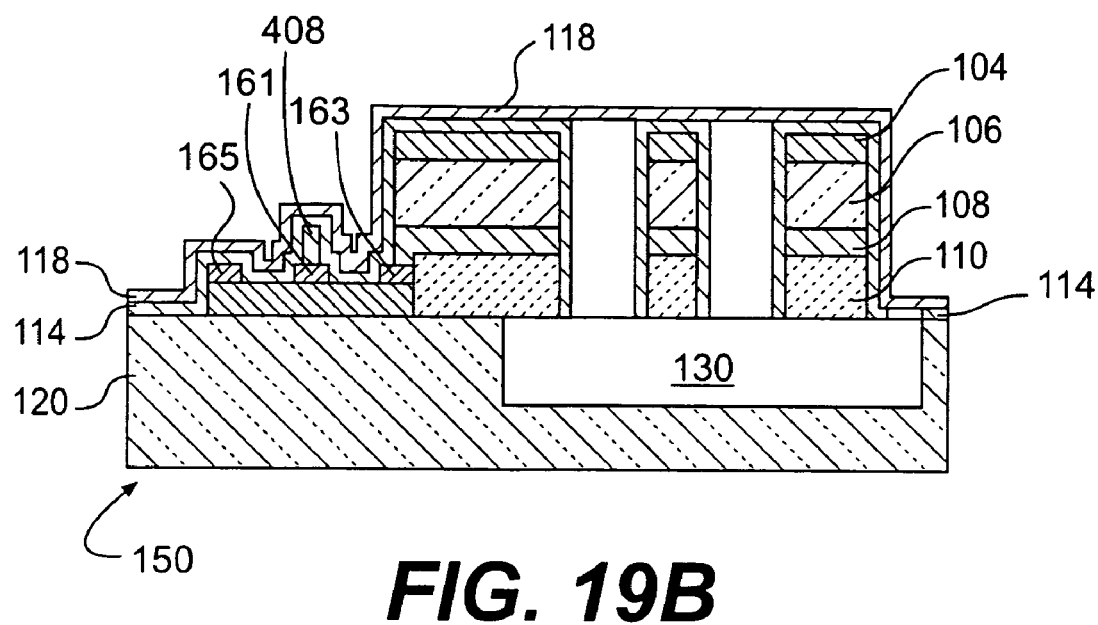
FIG. 19B is a schematic cross-sectional view of the completed piezoelectric cantilever along the line 19B—19B in FIG. 19A.

After the sixth etching process, a second protective layer 118 is deposited on the layer structure 180 by spin coating, as shown in FIGS. 19A and 19B. The second protective layer prevents direct contact between the fingertip and the X-lines 302.

Finally, after the second protective layer 118 has been deposited, a seventh etching process that uses a seventh mask is performed. The seventh etching process removes portions of the first protective layer 114 and the second protective layer 118 to expose the X-pads 306, the Y-pads 308, and the reference pad 310, as shown in FIG. 20.

Figure 20:
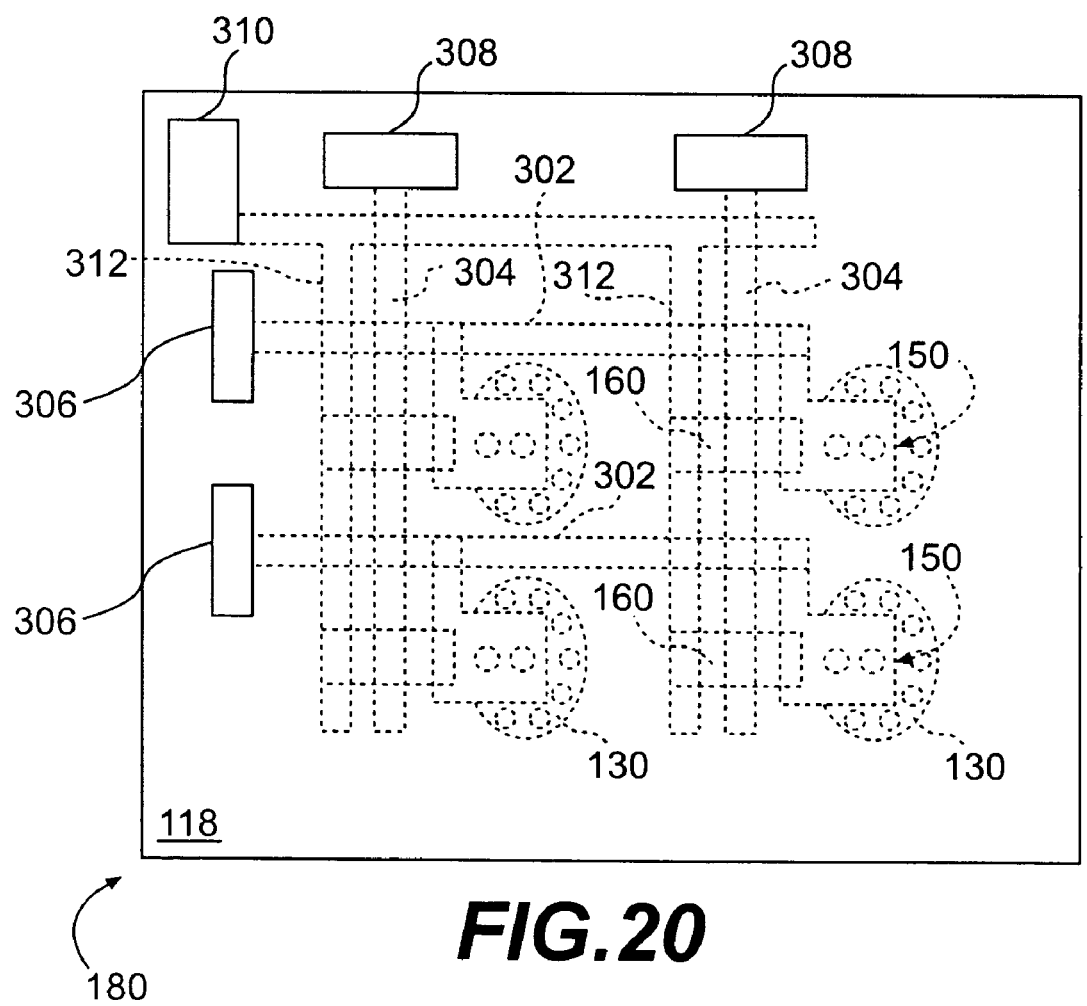
FIG. 20 is a schematic top view of the layer structure after the seventh etching in fabricating the second embodiment.

The method just described fabricates a piezoelectric cantilever pressure sensor array 300 with piezoelectric cantilever pressure sensors 100 in accordance with the second embodiment connected to the X-lines 302, the Y-lines 304, and the reference lines 312, as shown in FIG. 20. As is known in the art, the piezoelectric cantilevers 150, the X-lines 302 and X-pads 306, the Y-lines 304 and Y-pads 308, the reference lines 312 and reference pad 310, and the cavities 130 may differ in size, shape and layout from the example shown in the figures.

FIGS. 21A–21K, 22A–22C, 23A, 23B, 24A–24C, 25A–25C, 26A–26C, 27A, 27B, 28A, 28B and 29 illustrate a third embodiment of a method of making a piezoelectric cantilever sensor array that incorporates piezoelectric cantilever pressure sensors 100 in accordance with the third embodiment described above with reference to FIG. 1D. The piezoelectric cantilever sensor array made by the method is otherwise similar to the array 300 described above with reference to FIGS. 3A and 3D.

Figure 21A:
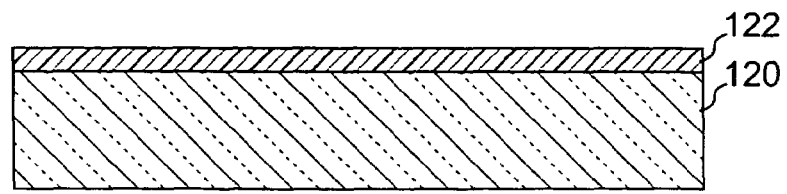
FIGS. 21A–21K are schematic cross-sectional views depicting a second layer structure at different stages of its manufacture in fabricating the third embodiment.
Figure 21B:
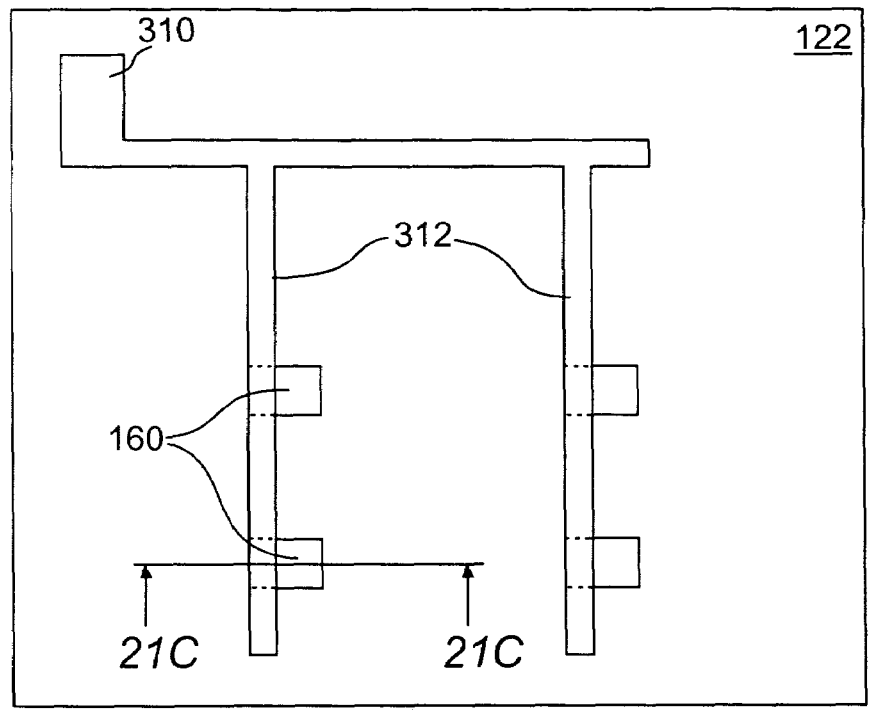
Figure 21C:
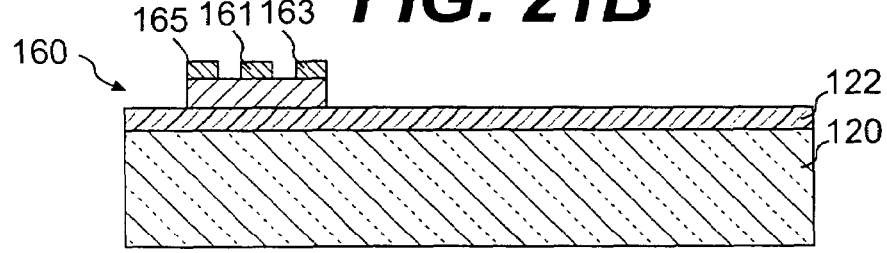
Figure 21D:
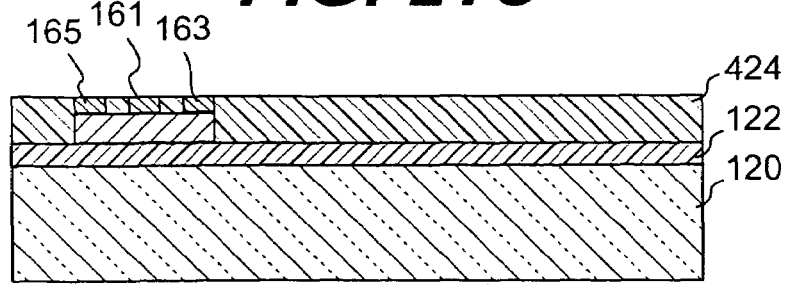
Figure 21E:
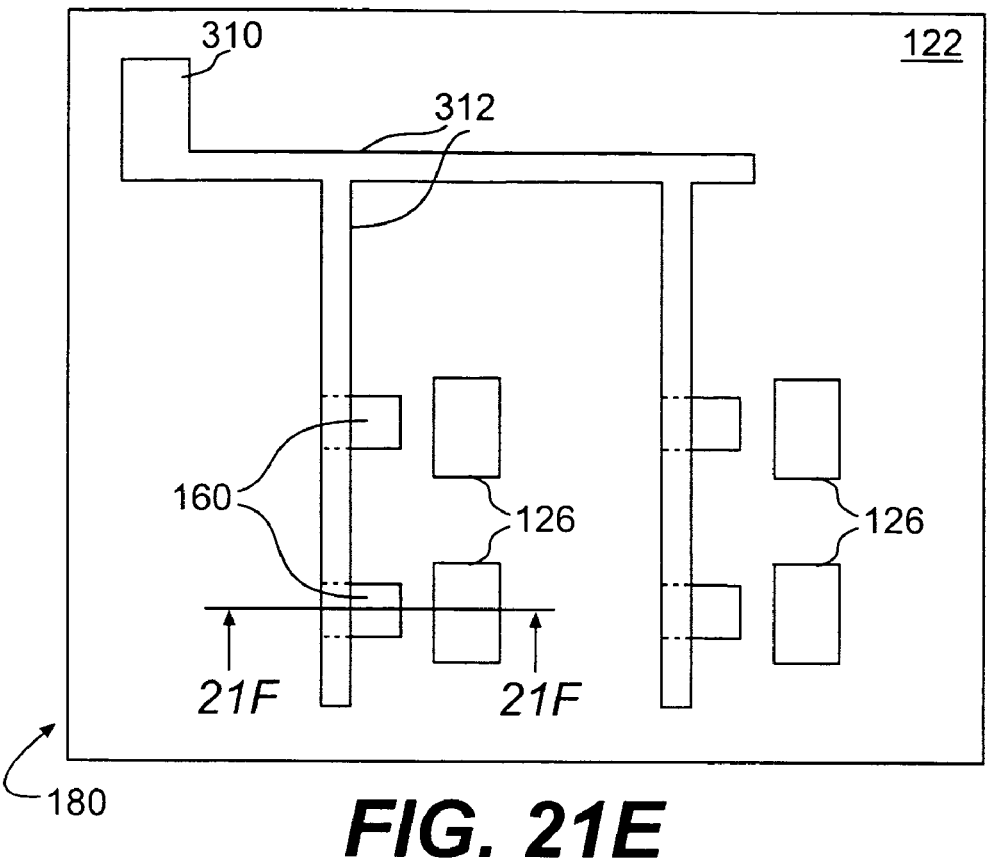
Figure 21F:
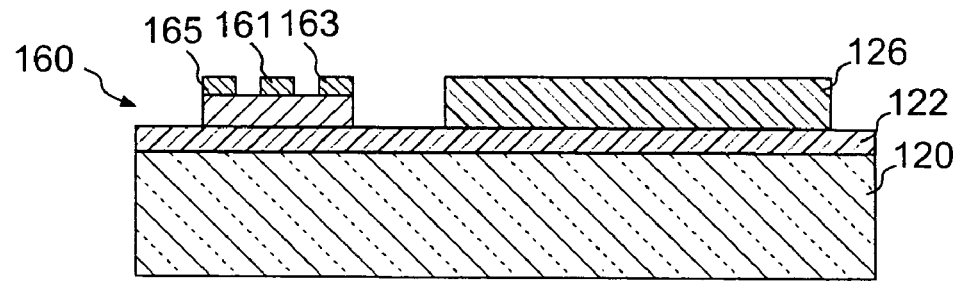
Figure 21G:
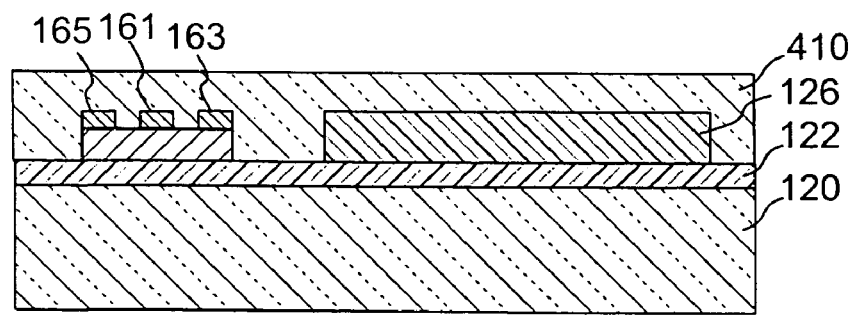
Figure 21H:
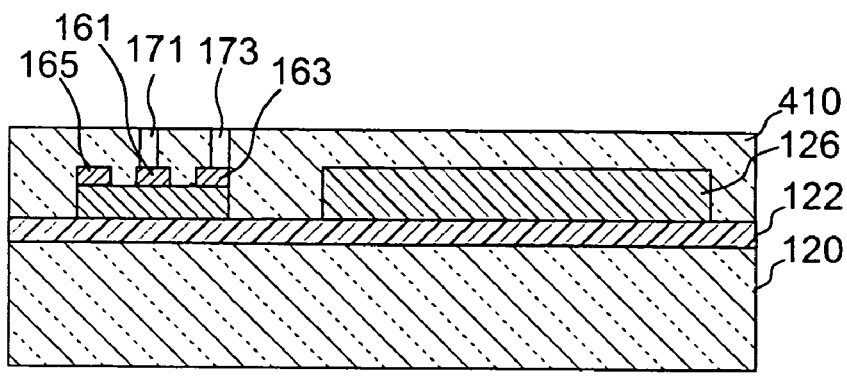
Figure 21I:
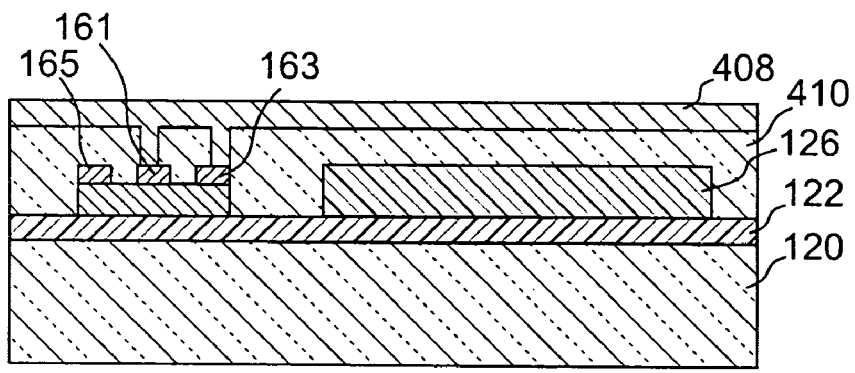
Figure 21J:
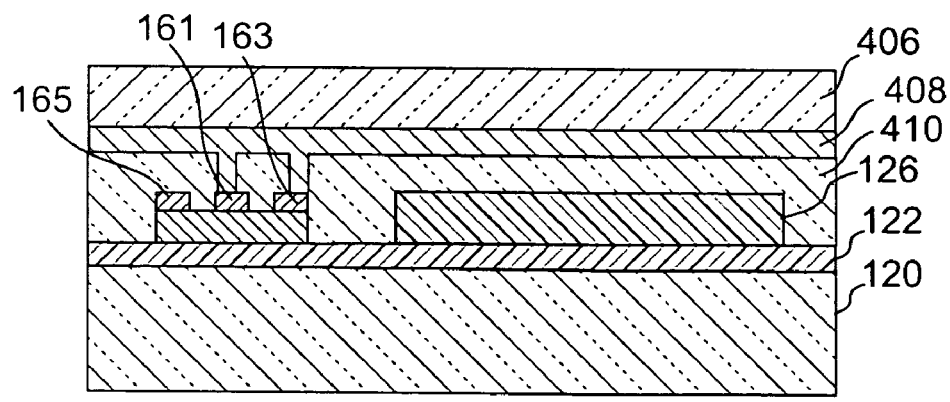
Figure 21K:
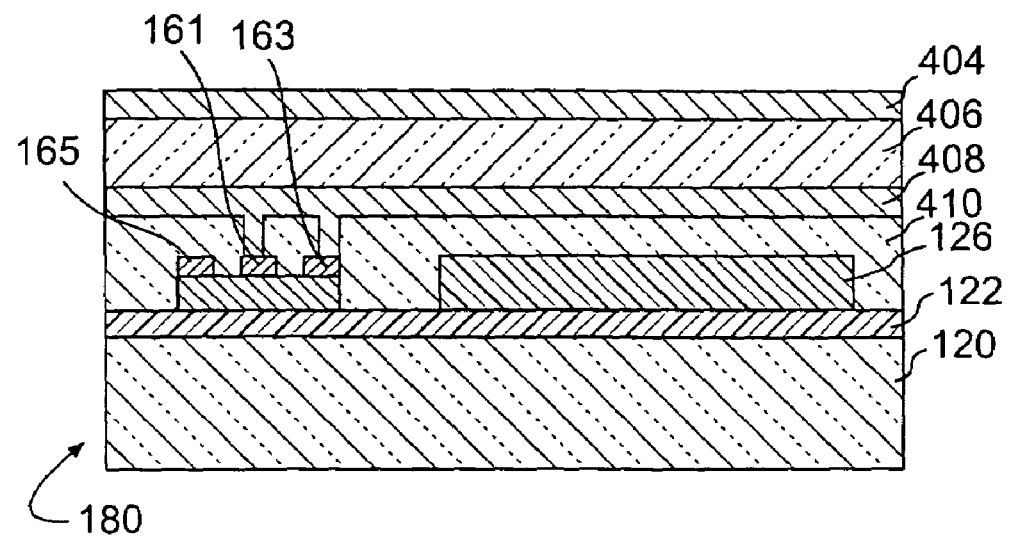

The third embodiment of the method starts with the fabrication of a layer structure 180, as shown in FIGS. 21A–21K. The layer structure 180 is made by depositing the coating layer 122 on the top surface of the substrate 120 (FIG. 21A); mounting prefabricated access transistors 160 on the coating layer 122 and forming on the coating layer 122 the reference pad 310 and reference lines 312 connecting the reference pad 310 to the source contacts 165 of the access transistors 160 (FIGS. 21B and 21C); depositing a sacrificial layer 426 typically of phosphosilicate glass (PSG) on the coating layer 122 (FIG. 21D); etching the sacrificial layer 426 using a first mask to define a sacrificial mesa 126 adjacent each of the access transistors 160 and to expose the access transistors 160, the reference pad 310, the reference lines 312, and the coating layer 122 (FIGS. 21E and 21F); depositing the elastic layer 410 (FIG. 21G); etching the elastic layer 410 using a second mask to create contact holes 171 and 173 extending through the elastic layer 410 to the gate contact 161 and drain contact 163, respectively, of each access transistor 160 (FIG. 21H); depositing a bottom electrode layer 408 on the elastic layer 410 (FIG. 21I); depositing a piezoelectric layer 406 on the bottom electrode layer 408 (FIG. 21J); and depositing a top electrode layer 404 on the piezoelectric layer 406 (FIG. 21K). The coating layer 122, sacrificial layer 124, elastic layer 410, electrode layers 408 and 404, and the piezoelectric layer 406 are deposited by a process such as sputtering, chemical vapor deposition (CVD), plasma CVD, physical vapor deposition (PVD) or the like. The layer structure 180 fabricated as just described is shown in FIG. 21K. As will be described in the following paragraphs, the sacrificial mesas 126 will be etched away to form a cavity under the beam portion 154 of each piezoelectric cantilever 150. Accordingly, the sacrificial mesas 126 typically have dimensions that are slightly larger than the dimensions of the beam portion 154 of the piezoelectric cantilever 150, as shown in FIG. 5B. The thickness of the sacrificial mesas 126 is typically larger than the maximum possible deflection of the beam portion 154 of the piezoelectric cantilever 150. In other words, the cavity created by etching away the sacrificial mesa 126 typically has a depth that accommodates the maximum possible deflection of the beam portion 154 of the piezoelectric cantilever 150.

Figure 22A:
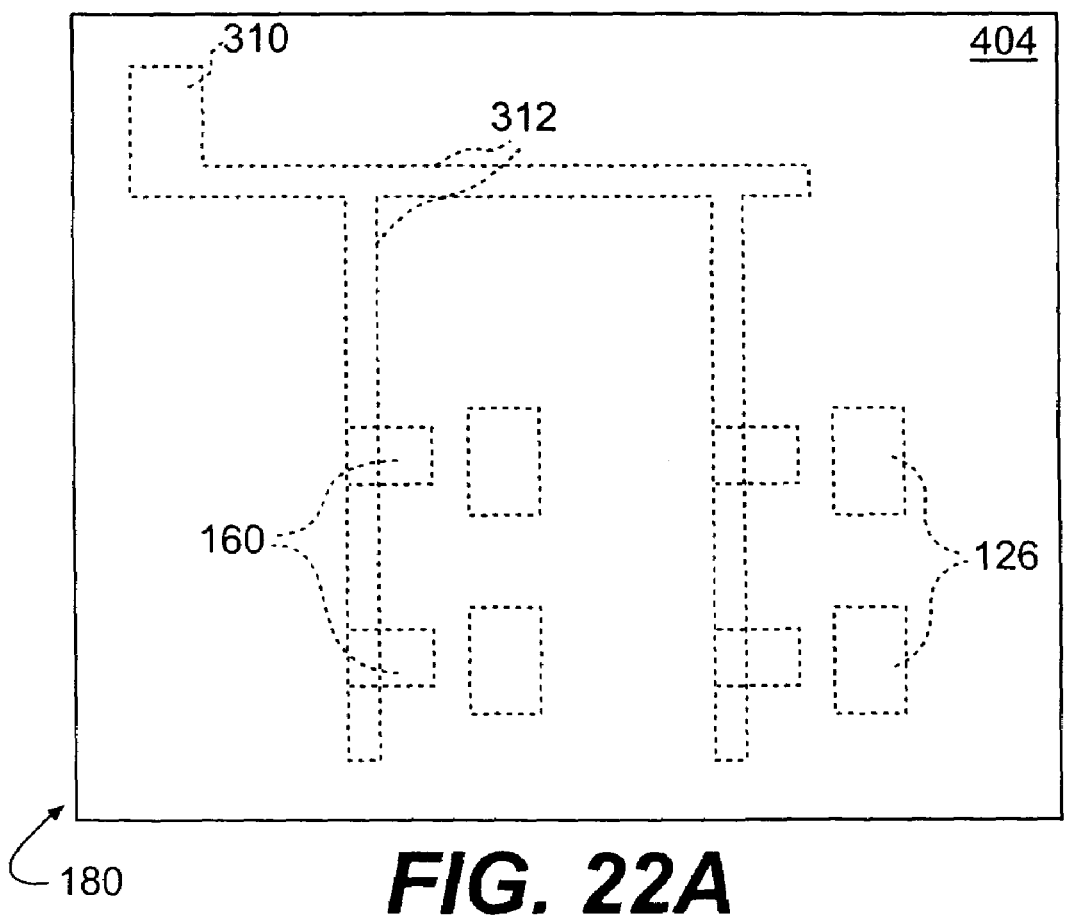
FIGS. 22A and 22B are schematic top views of the layer structure before and after the third etching, respectively, in fabricating the third embodiment.
Figure 22B:
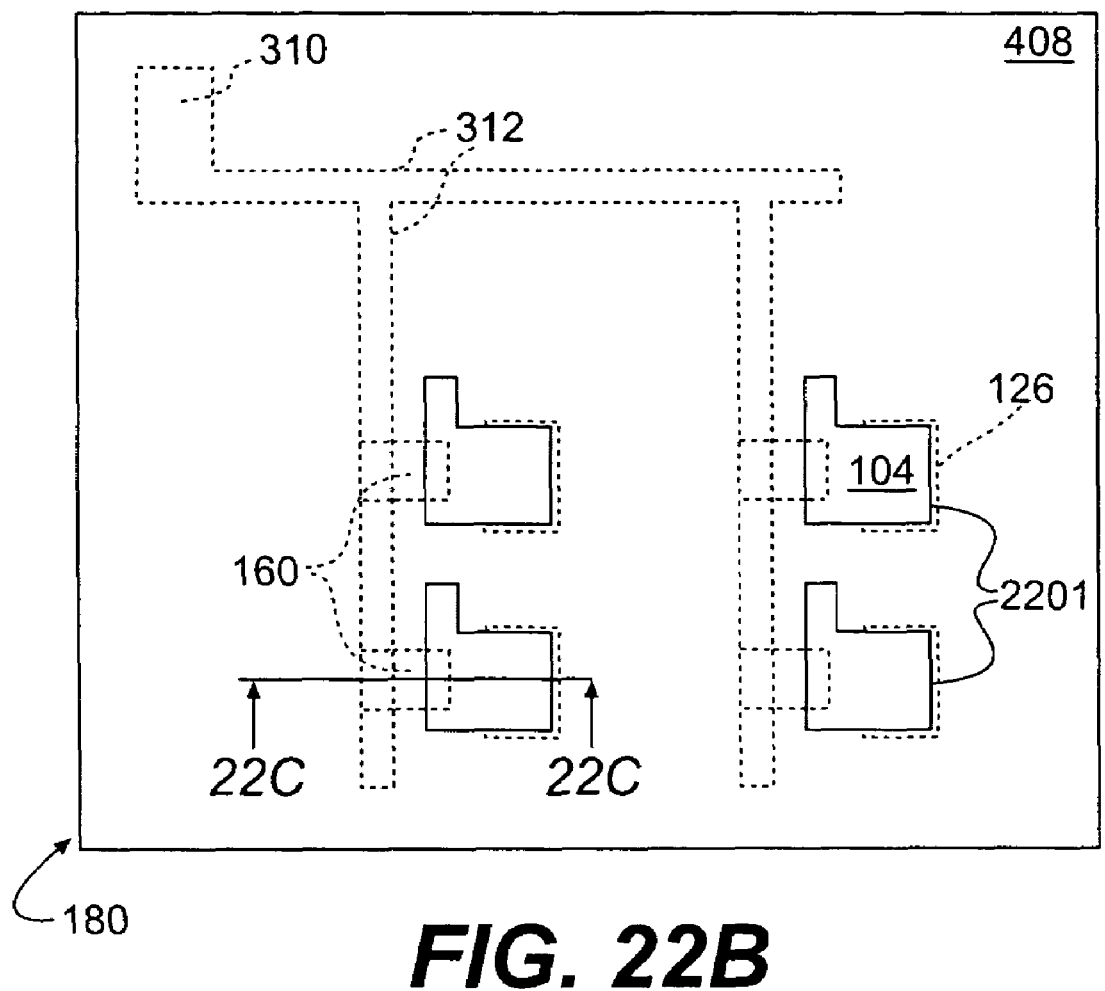
Figure 22C:
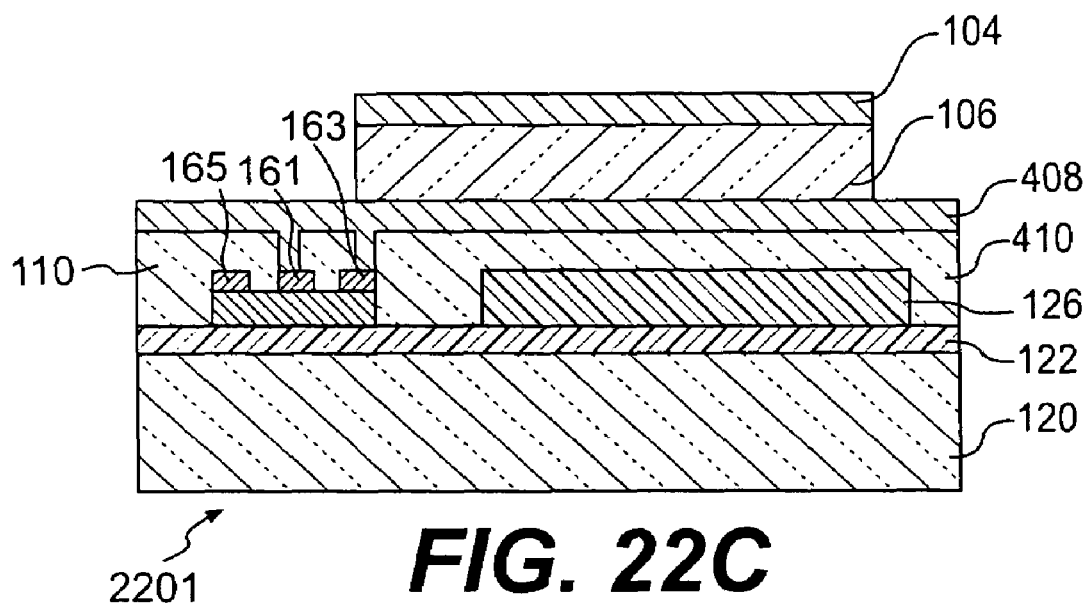
FIG. 22C is a schematic cross-sectional view of the partially completed piezoelectric cantilever along the line 22C—22C in FIG. 22B.

Next, as shown in FIGS. 22A–22C, the layer structure 180 is subject to a third etching process that uses a third mask. The third etching process partially define the piezoelectric cantilevers in the top electrode layer 404 and the piezoelectric layer 406. FIG. 22A shows the layer structure 180 before the second etching process is performed. The locations on the surface of the substrate of the access transistors 160, the reference lines 312, the reference pad 310, and the sacrificial mesas 126 are shown by broken lines. The third etching process defines partially completed piezoelectric cantilevers 2201 in the top electrode layer 404 and the piezoelectric layer 406. As shown in FIGS. 22B and 22C, the third etching process removes part of the top electrode layer 404 and the piezoelectric layer 406 to define the top electrode 104 and the piezoelectric element 106 of the partially completed piezoelectric cantilevers in these layers, and additionally exposes part of the bottom electrode layer 408 for the next etching process.

Figure 23A:
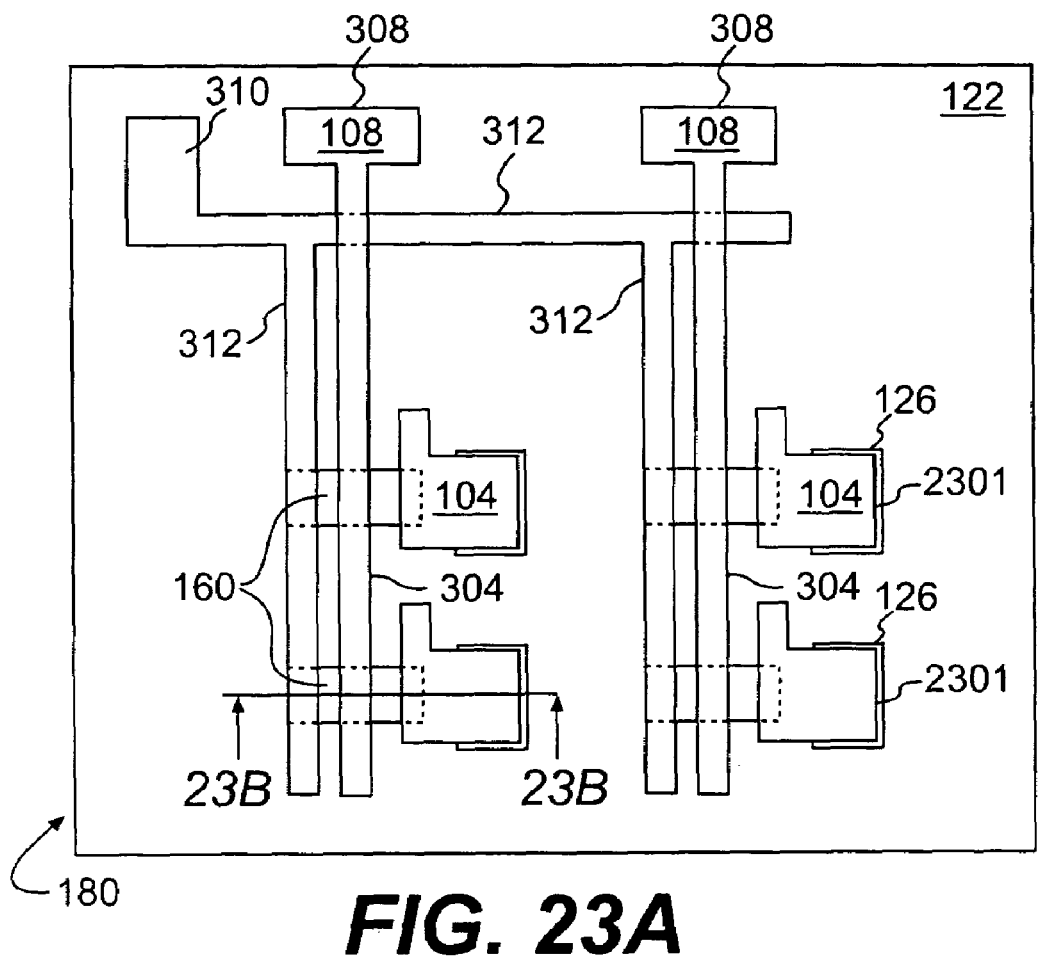
FIG. 23A is a schematic top view of the layer structure after the fourth etching in fabricating the third embodiment.
Figure 23B:
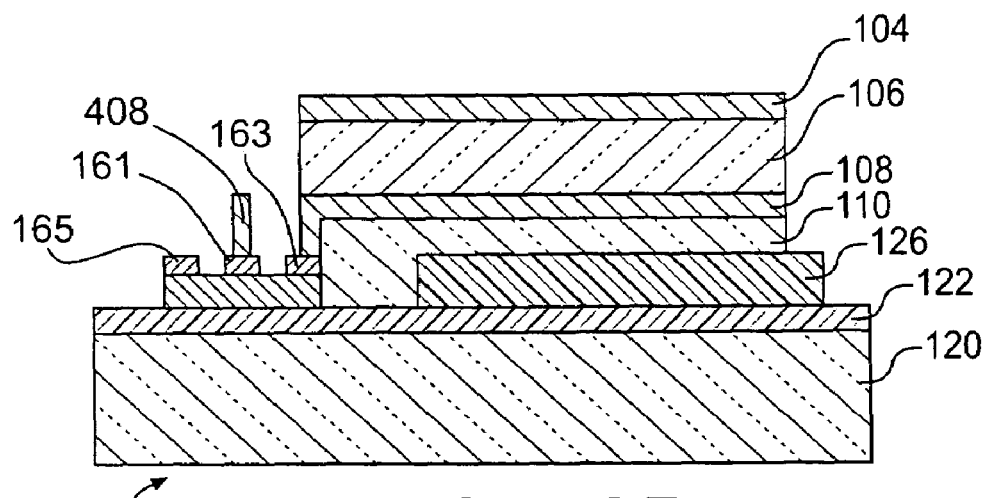
FIG. 23B is a schematic cross-sectional view of the partially completed piezoelectric cantilever along the line 23B—23B in FIG. 23A.

After the third etching process, the layer structure 180 is subject to a fourth etching process that uses a fourth mask. As shown in FIGS. 23A and 23B, the fourth etching process removes the unmasked portion of the bottom electrode layer 408 to define the bottom electrodes 108, the Y-lines 304 and Y-pads 308, and the electrical connection between the bottom electrodes and the drains of the respective access transistors 160. The fourth etching process additionally removes the unmasked portion of the elastic layer 410 to define the elastic element 110 and to expose the access transistors 160, part of the sacrificial mesas 126, the prefabricated reference pad 310 and reference lines 312. The part of the elastic element 110 that later becomes part of the beam portion of the completed piezoelectric cantilever extends over the sacrificial mesa 126. The reference lines are connected to the source contacts 165 of the access transistors 160. The Y-lines 304 are electrically connected to the gate contact 161 of the access transistors 160 in each column. One of the Y-lines is shown as part of the bottom electrode layer 408 on the gate contact 161 in FIG. 23B. The fourth etching process forms partially completed piezoelectric cantilevers 2301.

Figure 24A:
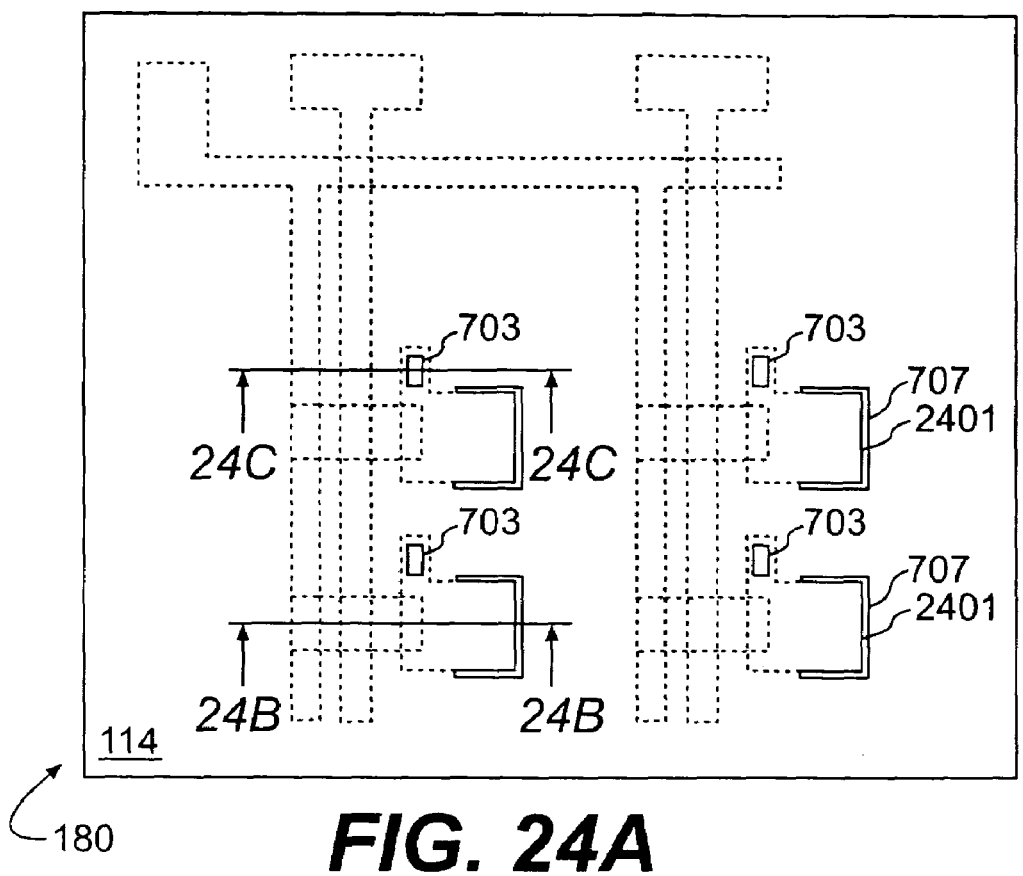
FIG. 24A is a schematic top view of the layer structure after the fifth etching in fabricating the third embodiment.
Figure 24B:
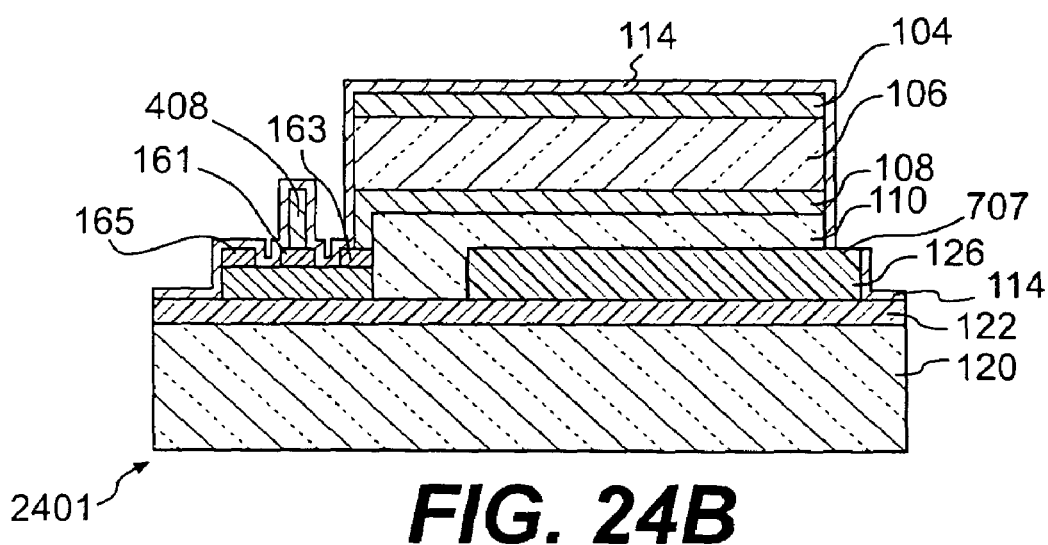
FIGS. 24B and 24C are schematic cross-sectional views of the partially completed piezoelectric cantilever along the lines 24B—24B and 24C—24C in FIG. 24A.
Figure 24C:
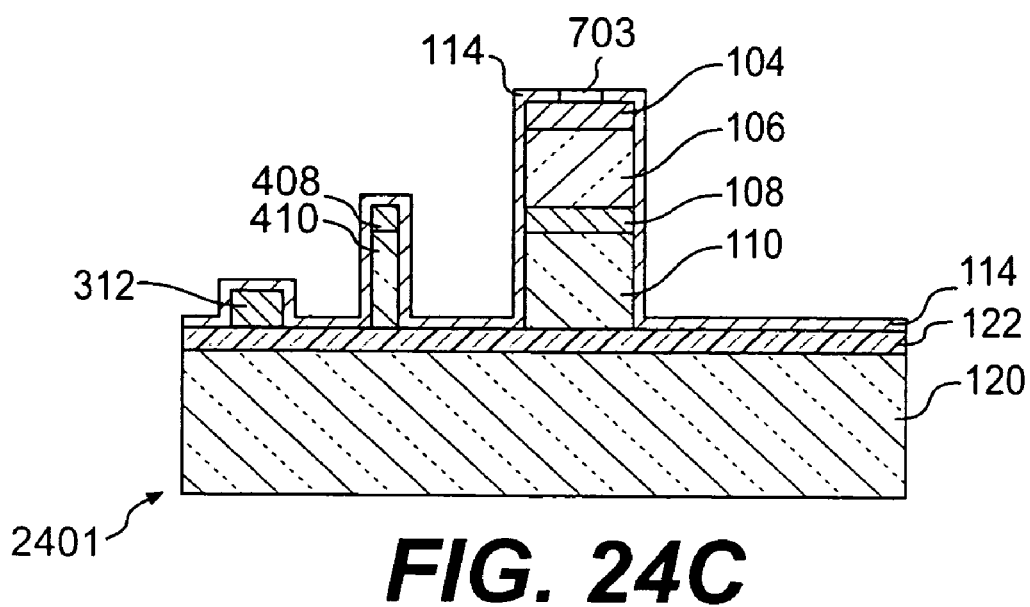

Next, the layer structure 180 is coated with a first protective layer 114, as shown in FIGS. 24A and 24B, followed by a fifth etching process that uses a fifth mask. The protective layer 114 prevents hydrogen or water penetration. The protective layer 114 is composed of aluminum oxide or any other suitable material. The protective layer 114 is deposited by a process such as sputtering, CVD, plasma CVD, PVD or the like. The fifth etching process forms contact openings 703 in the protective layer 114 on each partially completed piezoelectric cantilever 2401. The fifth etching process additionally forms release openings 707 around each partially completed piezoelectric cantilever 2401, as shown in FIG. 24B. As shown in FIGS. 24B and 24C, the release openings 707 expose part of the sacrificial mesas 126 and the contact openings 703 expose the top electrodes 104.

Figure 25A:
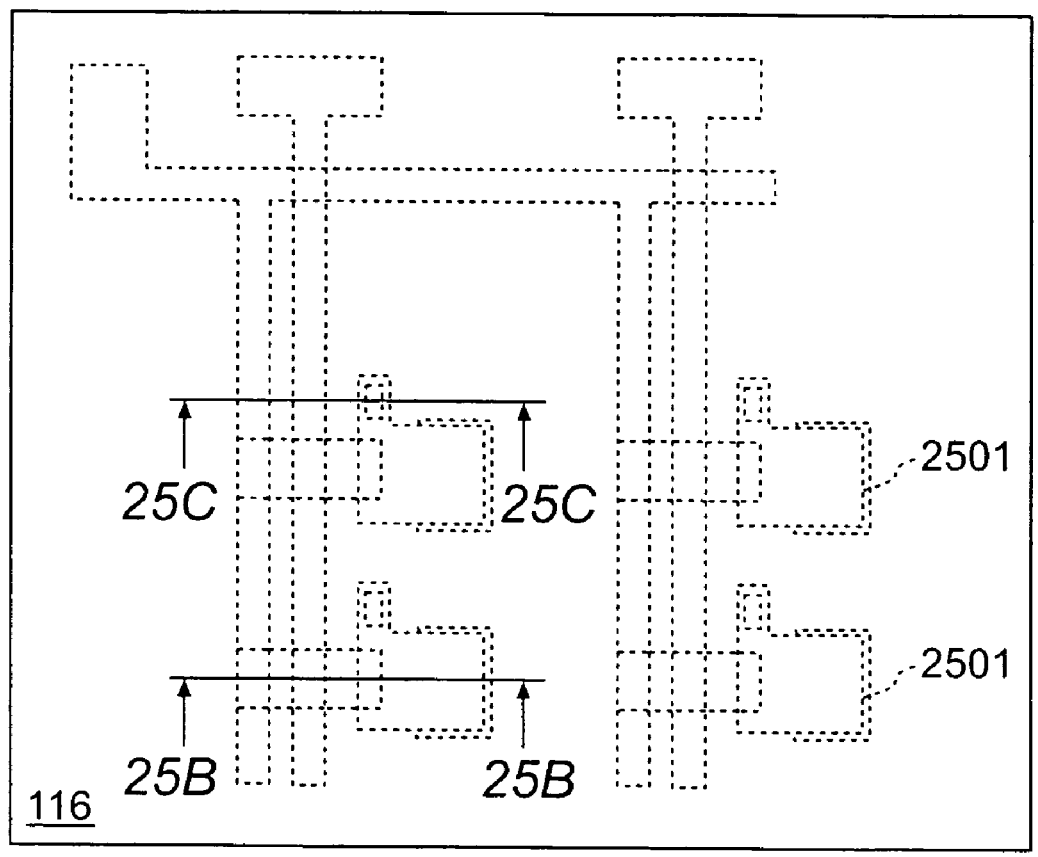
FIG. 25A is a schematic top view of the layer structure after the deposition of the X-line metal layer in fabricating the third embodiment.
Figure 25B:
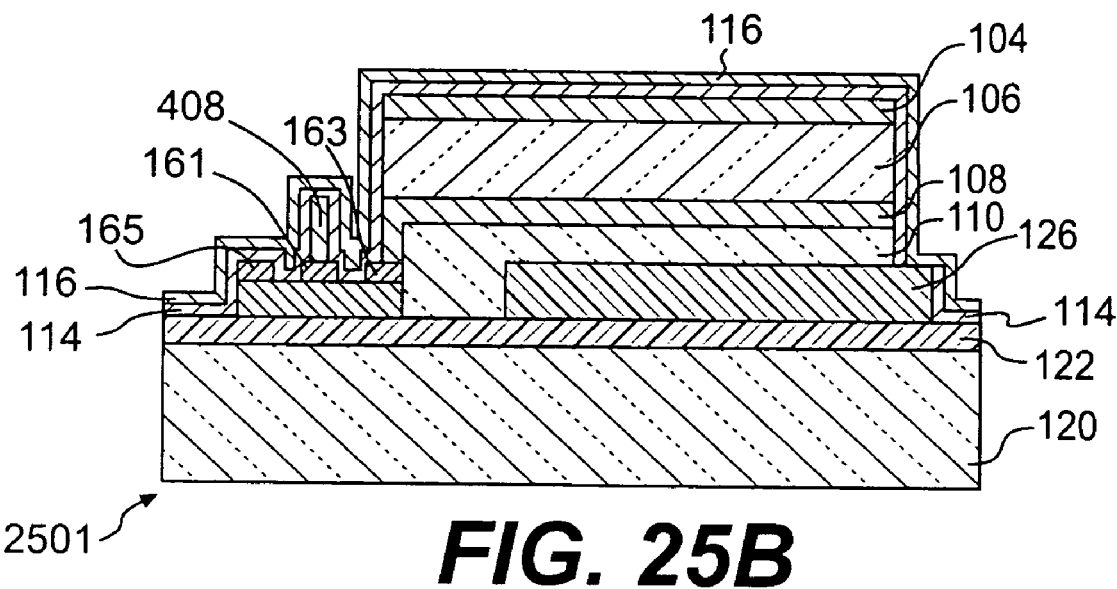
FIGS. 25B and 25C are schematic cross-sectional views of the partially completed piezoelectric cantilever along the lines 25B—25B and 25C—25C in FIG. 25A.
Figure 25C:
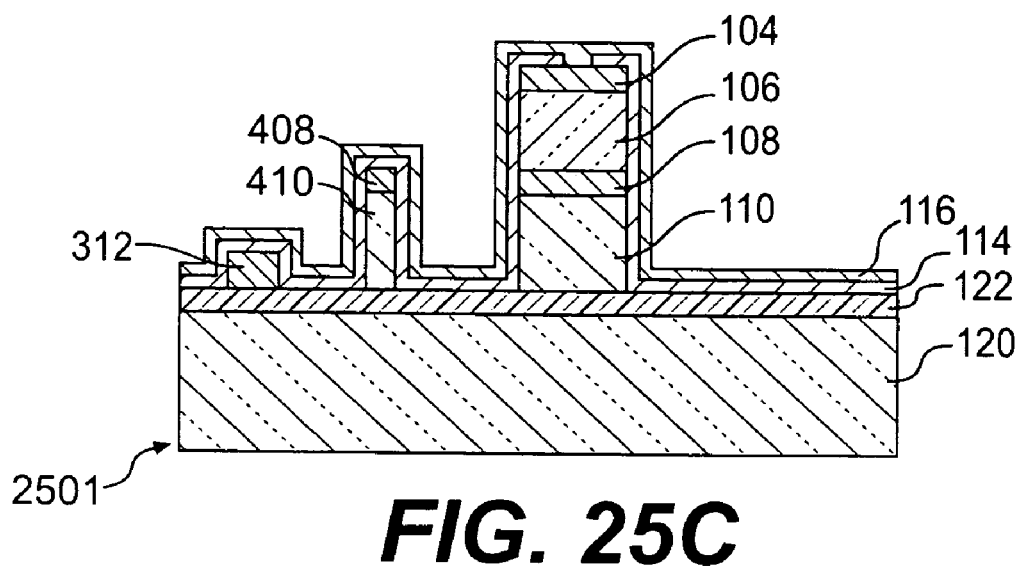

After the fifth etching process, an X-line metal layer 116 is deposited on the first protective layer 114, as shown in FIGS. 25A and 25B. The X-line metal layer is deposited by a process such as sputtering, CVD, plasma CVD, PVD or the like. The X-line metal layer 116 is typically composed of aluminum or an aluminum alloy. As shown in FIG. 25C, the X-line metal layer 116 fills the contact opening 703 in the first protective layer 114 and is thus electrically connected to the top electrode 104 of the partially completed piezoelectric cantilever 2501.

Figure 26A:
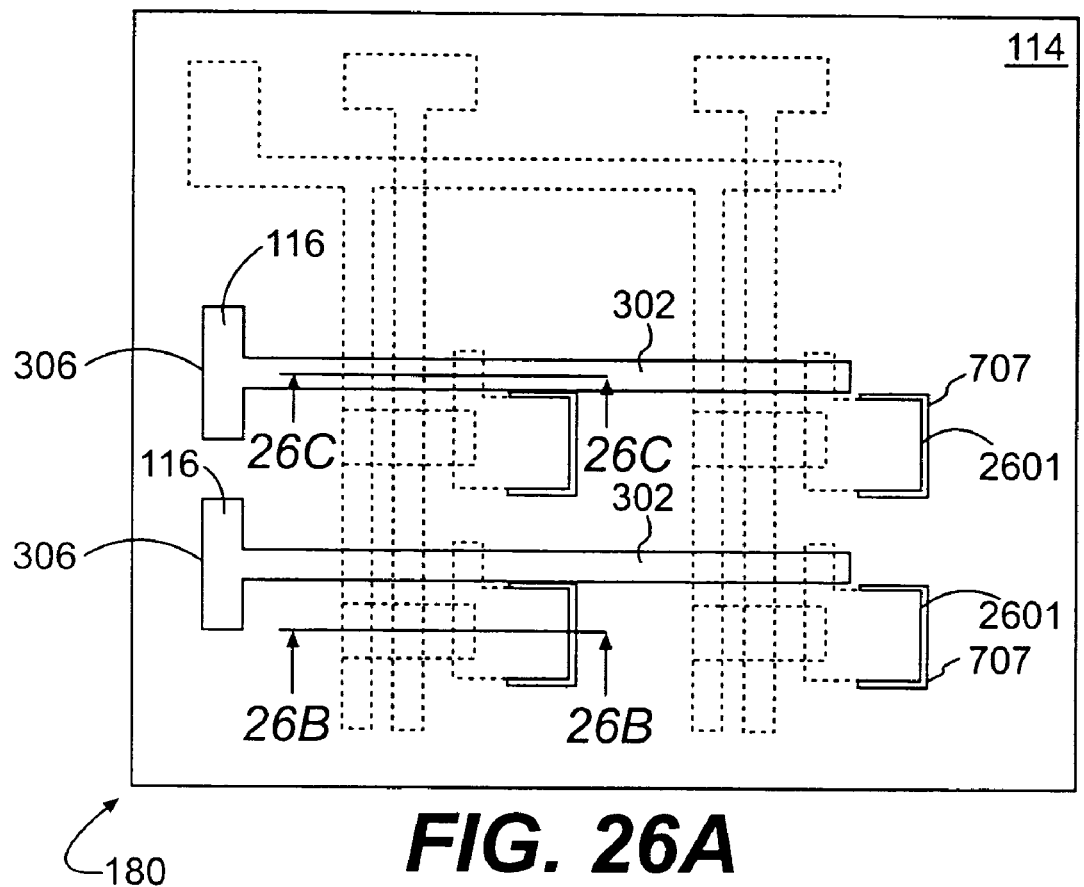
FIG. 26A is a schematic top view of the layer structure after the sixth etching in fabricating the third embodiment.
Figure 26B:
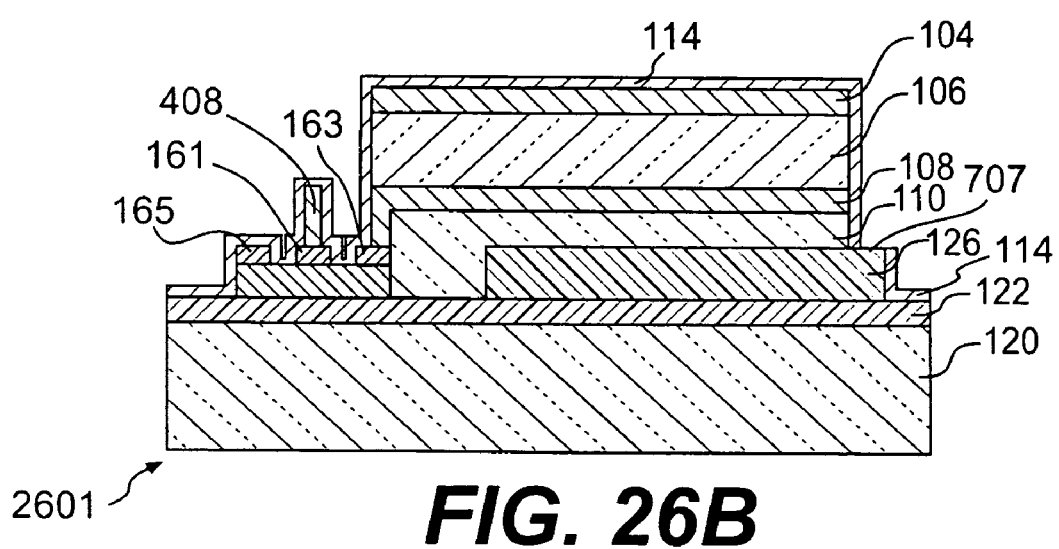
FIGS. 26B and 26C are schematic cross-sectional views of the partially completed piezoelectric cantilever along the lines 26B—26B and 26C—26C in FIG. 26A.
Figure 26C:
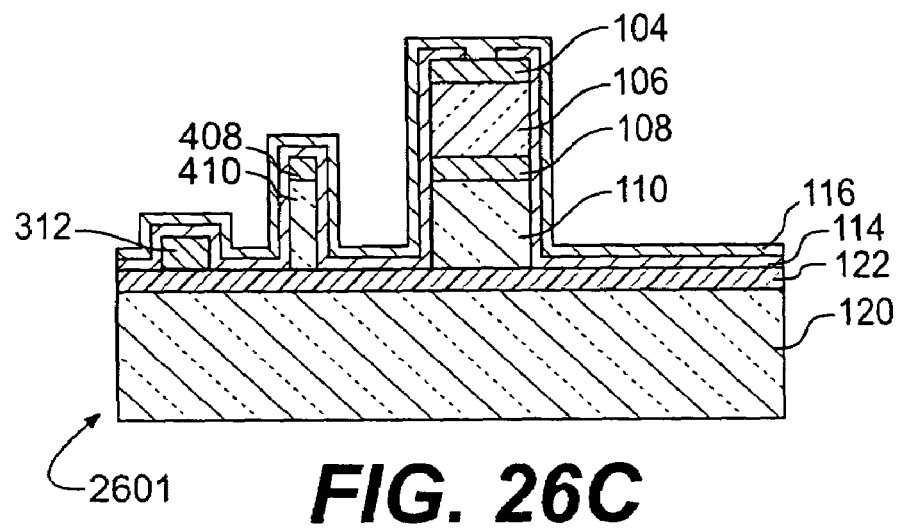

Next, a sixth etching process that uses a sixth mask is performed to define the X-lines 302 and X-pads 306 in the X-line metal layer 116. The sixth etching process additionally reopens the release openings 707. As shown in FIGS. 26A–26C, the sixth etching process removes the unmasked portion of the X-line metal layer 116 to define the X-lines 302 and X-pads 306, and additionally exposes the first protective layer 114 and re-opens the release openings 707 to expose part of the sacrificial mesas 126.

Figure 27A:
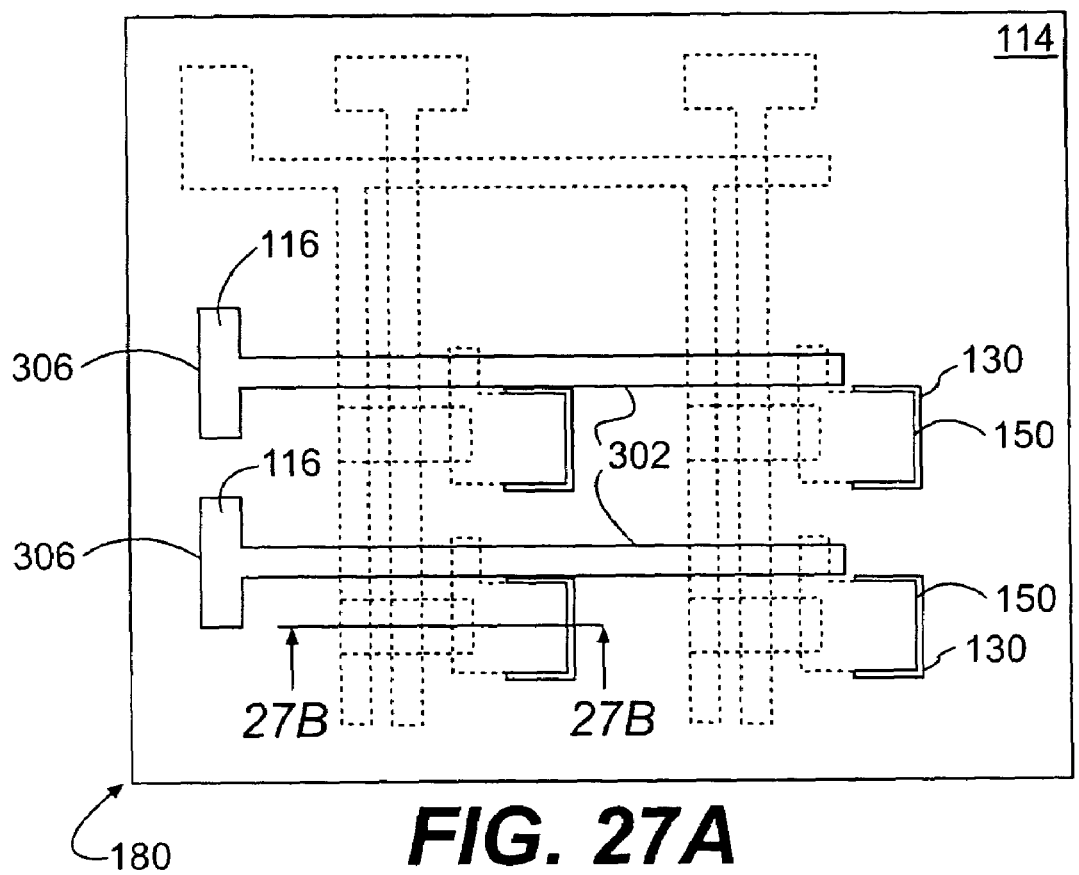
FIG. 27A is a schematic top view of the layer structure after the seventh etching in fabricating the third embodiment.
Figure 27B:
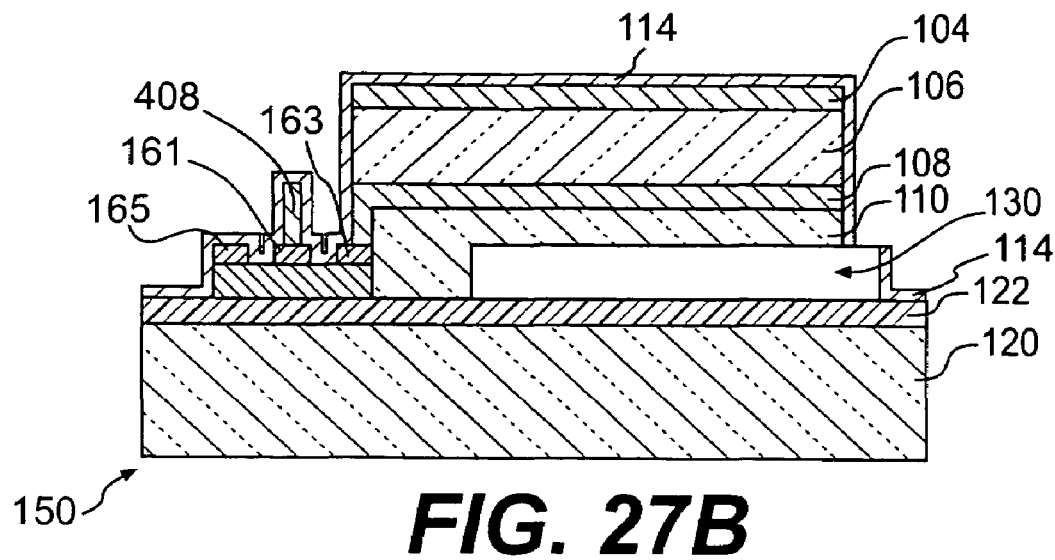
FIG. 27B is a schematic cross-sectional view of a completed piezoelectric cantilever along the line 27B—27B in FIG. 27A.

After the sixth etching process, a seventh etching process is performed to create the cavities 130 by removing the sacrificial mesas 126, as shown in FIGS. 27A and 27B. No mask is used in the seventh etching process. The etchant flows through the release openings 707 and etches away the sacrificial mesa 126 from between the beam portion of each piezoelectric cantilever 150 and the top surface of the protective layer 122. The seventh etching process releases the beam portion 154 from the substrate 120.

Figure 28A:
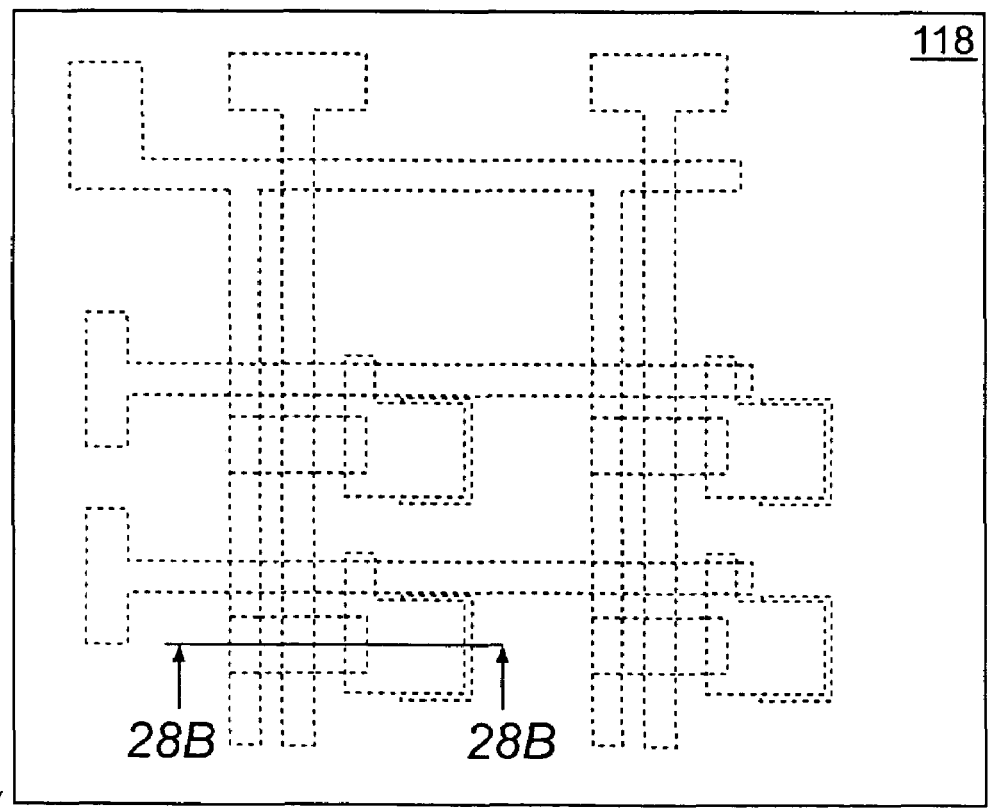
FIG. 28A is schematic top view of the layer structure after the formation of the second protective layer in fabricating the third embodiment.
Figure 28B:
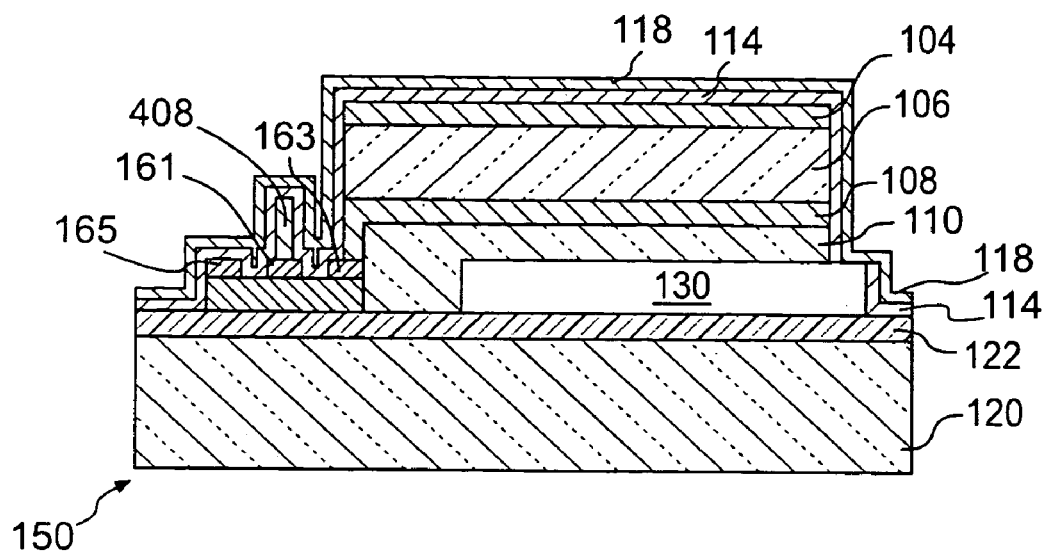
FIG. 28B is a schematic cross-sectional view of the completed piezoelectric cantilever along the line 28B—28B in FIG. 28A.

Next, a second protective layer 118 is deposited on the layer structure 180 by spin coating, as shown in FIGS. 28A and 28B. The second protective layer prevents direct contact between the fingertip and the X-lines 302.

Finally, an eighth and final etching process that uses a seventh mask is performed. The eighth etching process removes portions of the first protective layer 114 and the second protective layer 118 to expose the X-pads 306, the Y-pads 308, and the reference pad 310, as shown in FIG. 29.

Figure 29:
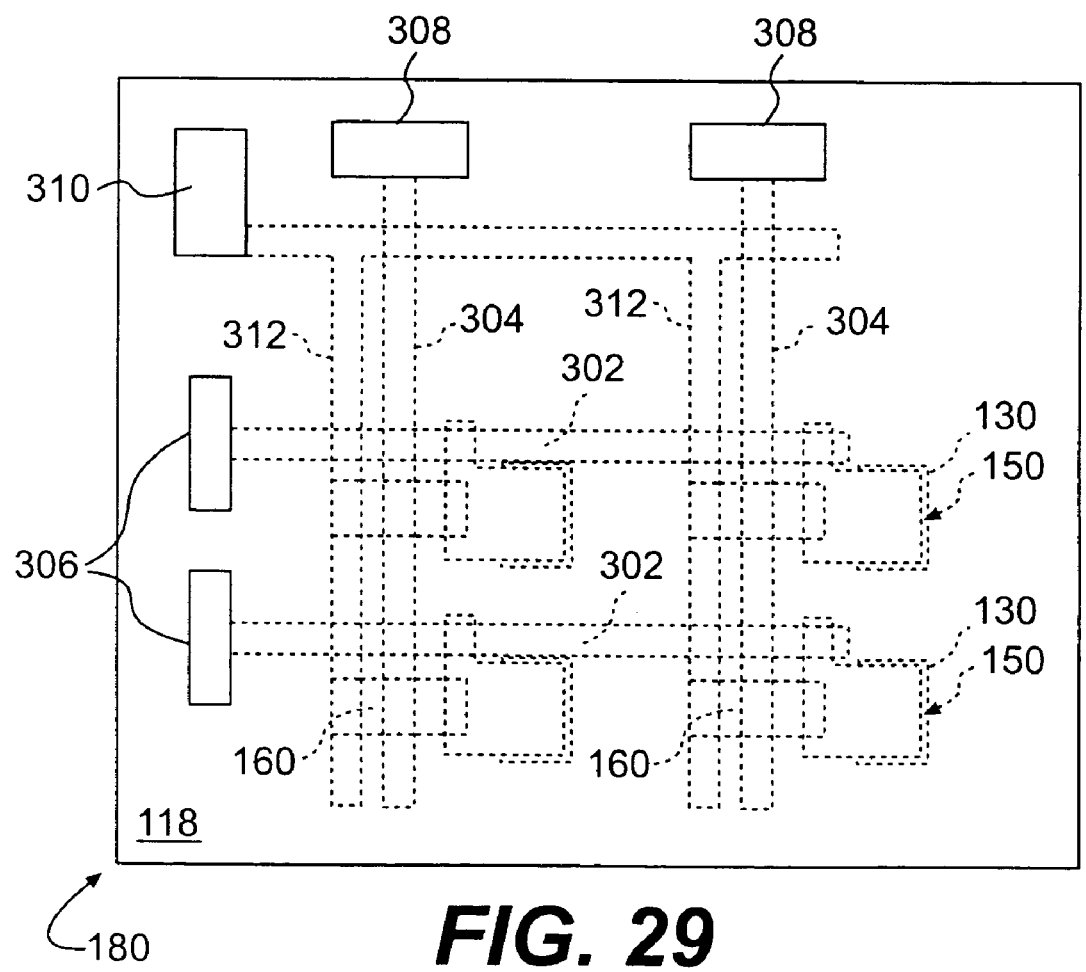
FIG. 29 is a schematic top view of the layer structure after the eighth etching in fabricating the third embodiment.

The third embodiment of the method just described fabricates a piezoelectric cantilever pressure sensor array 300 with piezoelectric cantilever pressure sensors 100 in accordance with the third embodiment connected to the X-lines 302, the Y-lines 304, and the reference lines 312, as shown in FIG. 29. As is known in the art, the piezoelectric cantilevers 150, the X-lines 302 and X-pads 306, the Y-lines 304 and Y-pads 308, the reference lines 312 and reference pad 310, and the cavities 130 may differ in size, shape and layout from the example shown in the figures.

Figure 30:
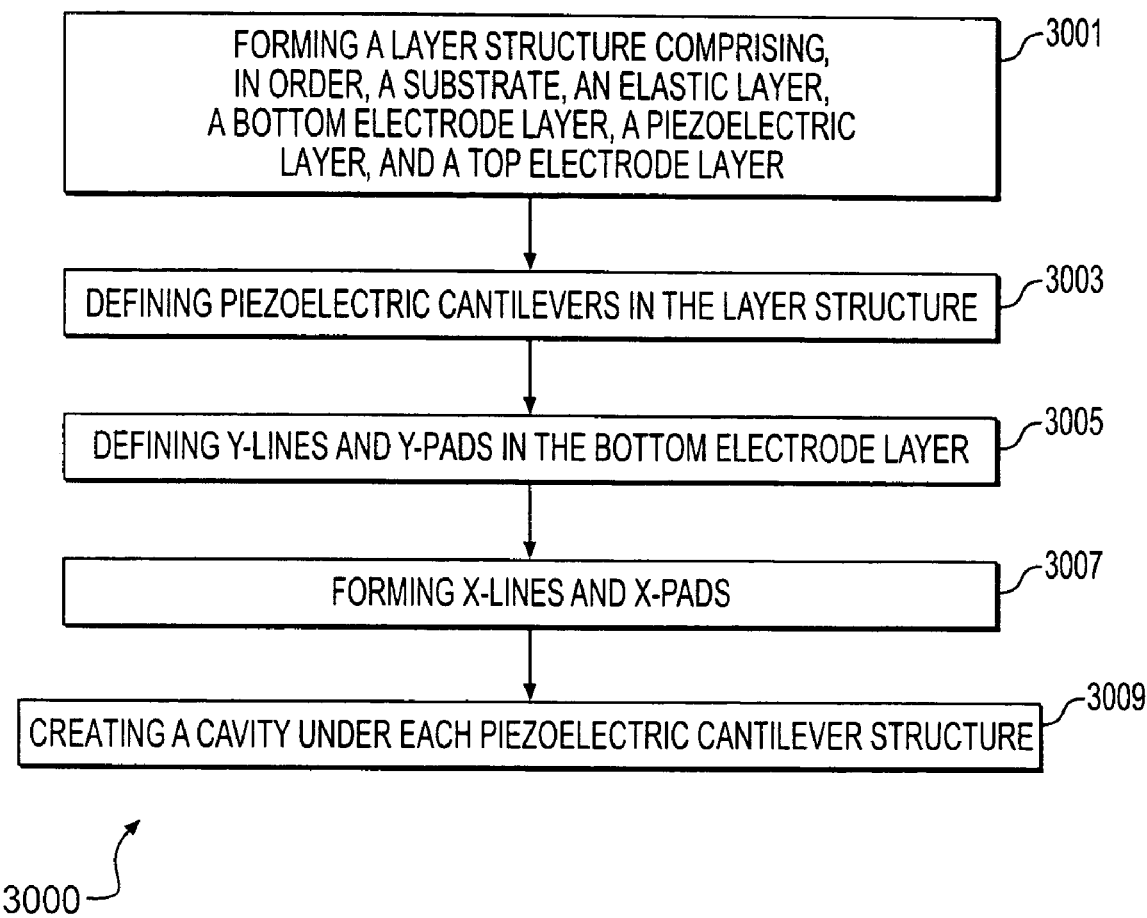
FIG. 30 is a flow-chart of a process for manufacturing a piezoelectric cantilever pressure sensor array.

FIG. 30 shows a method 3000 for manufacturing the piezoelectric cantilever pressure sensor array 300. In the method 3000, there is formed (3001) a layer structure having, in order, a substrate, an elastic layer, a bottom electrode layer, a piezoelectric layer, and a top electrode layer, piezoelectric cantilevers are defined (3003) in the layer structure, Y-lines and Y-pads are defined (3005) in the bottom electrode layer, X-lines and X-pads are formed (3007), and a cavity is created (3009) under each piezoelectric cantilever.

In an embodiment, the layer structure additionally has a prefabricated access transistor adjacent each piezoelectric cantilever. Defining the piezoelectric cantilever forming an electrical connection between the bottom electrode of the piezoelectric cantilever and the drain of the access transistor.

In an embodiment, the cavity is created by etching the substrate from the bottom surface thereof. In another embodiment, the cavity is created by etching the substrate from the top surface thereof. In a third embodiment, the layer structure additionally has a sacrificial mesa and the piezoelectric cantilever partially overlaps the sacrificial mesa. In this embodiment, the cavity is created by removing the sacrificial mesa from under the piezoelectric cantilever.

In yet another embodiment, the process of forming X-lines and X-pads includes forming a first protective coating, creating contact openings in the first protective coating, depositing an X-line metal layer on the first protective coating, and defining the X-lines and X-pads in the X-line metal layer. In another embodiment, the layer structure is covered by a flexible protective layer.

Although preferred embodiments and their advantages have been described in detail, various changes, substitutions and alterations can be made herein without departing from the scope of the invention defined by the appended claims and their equivalents.

I claim:

1. A piezoelectric cantilever pressure sensor array, comprising:
   a substrate;
   a readout circuit, and
   piezoelectric cantilever pressure sensors electrically connected to the readout circuit, each piezoelectric cantilever pressure sensor comprising an elongate piezoelectric cantilever mounted at one end on the substrate and extending over a cavity, the piezoelectric cantilever comprising:
a first electrode;
a second electrode; and
a piezoelectric element between the first electrode and the second electrode and electrically connected thereto.

2. The piezoelectric cantilever sensor array of claim 1, wherein each piezoelectric cantilever pressure sensor additionally comprises an access transistor.

3. The piezoelectric cantilever sensor array of claim 2, wherein:
the access transistor comprises a source contact, a gate contact and a drain contact;
the drain contact is connected to the first electrode;
the source contact is connected to receive a reference voltage; and
the gate contact is connected to receive an activation signal.

4. The piezoelectric cantilever sensor array of claim 1, wherein the wherein the piezoelectric cantilever additionally comprises an elastic element between the piezoelectric layer and the substrate.

5. The piezoelectric cantilever sensor array of claim 4, wherein:
the elastic element comprises one of silicon and silicon nitride; and
the piezoelectric element comprises one of PZT, PMN-PZT, PZN-PZT, AlN and ZnO.

6. The piezoelectric cantilever sensor array of claim 5, wherein the piezoelectric element comprises PZT with a zirconate to titanate molar ration of about 0.4 to about 0.6.

7. The piezoelectric cantilever sensor array of claim 4, wherein:
the substrate has a top surface on which the piezoelectric cantilever pressure sensors are located; and
the cavity is located between the elastic element and the top surface of the substrate.

8. The piezoelectric cantilever sensor array of claim 4, wherein the elastic element is shaped to define a pedestal.

9. The piezoelectric cantilever sensor array of claim 1, wherein:
the piezoelectric element is a first piezoelectric element; and
the piezoelectric cantilever additionally comprises:
a third electrode; and
a second piezoelectric element between the second and the third electrodes and electrically connected thereto.

10. The piezoelectric cantilever sensor array of claim 1, wherein the substrate comprises glass.

11. The piezoelectric cantilever sensor array of claim 1, additionally comprising a protective layer covering the piezoelectric cantilever pressure sensors.

12. The piezoelectric cantilever sensor array of claim 1, wherein:
the substrate has a top surface and a bottom surface opposite thereto; and
the cavity extends through the substrate between the top surface and the bottom surface.

13. The piezoelectric cantilever sensor array of claim 1, wherein:
the substrate has a top surface on which the piezoelectric cantilever is located; and
the cavity extends into the substrate from the top surface.

14. The piezoelectric cantilever sensor array of claim 1, wherein:
the substrate has a top surface on which the piezoelectric cantilever is located; and
the cavity is located between the piezoelectric cantilever and the top surface of the substrate.

15. The piezoelectric cantilever pressure sensor of claim 14, wherein:
the piezoelectric cantilever additionally comprises an elastic element between the
piezoelectric element and the substrate; and
the cavity is located between the elastic element and the top surface of the substrate.

16. The piezoelectric cantilever sensor array of claim 1, wherein at least one of the first electrode and the second electrode comprises a metal selected from gold, silver, platinum, palladium, copper, aluminum, and alloys thereof.

17. The piezoelectric cantilever sensor array of claim 1, wherein at least one of the first electrode and the second electrode comprises a layer of platinum and a layer of titanium or titanium oxide.

18. The piezoelectric cantilever sensor array of claim 1, wherein at least one of the first electrode and the second electrode comprises a layer of platinum and a layer of titanium or titanium oxide.

19. A piezoelectric cantilever pressure sensor array comprising:
a substrate;
a readout circuit,
piezoelectric cantilever pressure sensors electrically connected to the readout circuit, each piezoelectric cantilever pressure sensor comprising an access transistor and an elongate piezoelectric cantilever mounted at one end on the substrate and extending over a cavity,
wherein the piezoelectric cantilever comprising a first electrode, a second electrode, and a piezoelectric element between the first electrode and the second electrode and electrically connected thereto, and wherein the access transistor comprises a source contact, a gate contact and a drain contact; the drain contact is connected to the first electrode; the source contact is connected to receive a reference voltage; and the gate contact is connected to receive an activation signal;
first conductive lines each extending between the readout circuit and the second electrodes of ones of the piezoelectric cantilever pressure sensors arrayed in a first direction; and,
second lines each extending between the readout circuit and the gates of the access transistors electrically connected to ones of the piezoelectric cantilever pressure sensors arrayed in a second direction, orthogonal to the first direction.

20. The piezoelectric cantilever sensor array of claim 19, additionally comprising reference lines electrically connected to the sources of the access transistors electrically connected to the piezoelectric cantilever pressure sensors.

* * * * *

UNITED STATES PATENT AND TRADEMARK OFFICE
CERTIFICATE OF CORRECTION

PATENT NO. : 7,032,454 B2
APPLICATION NO. : 10/792891
DATED : April 25, 2006
INVENTOR(S) : Amano It is certified that error appears in the above-identified patent and that said Letters Patent is hereby corrected as shown below:

On the Title page, in field (56), under "Other Publications", in column 1, line 1, delete "et. Al.," and insert -- et al., --, therefor.

On the Title page, in field (56), under "Other Publications", in column 2, line 5, after "Sensors"" insert -- , --.

On the face page, in field (56), under "Other Publications", in column 2, line 12, delete "Senosrs" and insert -- Sensors --, therefor.

In column 17, line 23, in Claim 4, after "wherein the" delete "wherein the".

In column 17, line 34, in Claim 6, delete "ration" and insert -- ratio --, therefor.

Signed and Sealed this

Twelfth Day of September, 2006

JON W. DUDAS
*Director of the United States Patent and Trademark Office*